(12) United States Patent
Kuno et al.

(10) Patent No.: US 7,272,301 B2
(45) Date of Patent: Sep. 18, 2007

(54) REPRODUCTION APPARATUS, REPRODUCTION METHOD, RECORDING APPARATUS, RECORDING METHOD, AV DATA SWITCHING METHOD, OUTPUT APPARATUS, AND INPUT APPARATUS

(75) Inventors: Yoshiki Kuno, Osaka (JP); Yoshitaka Yaguchi, Osaka (JP); Kenichiro Yamauchi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 821 days.

(21) Appl. No.: 10/466,589

(22) PCT Filed: Jan. 16, 2002

(86) PCT No.: PCT/JP02/00228

§ 371 (c)(1),
(2), (4) Date: Dec. 12, 2003

(87) PCT Pub. No.: WO02/058384

PCT Pub. Date: Jul. 25, 2002

(65) Prior Publication Data

US 2004/0109671 A1 Jun. 10, 2004

(30) Foreign Application Priority Data

Jan. 19, 2001 (JP) ............................. 2001-012430
Jan. 22, 2001 (JP) ............................. 2001-013025

(51) Int. Cl.
*H04N 7/26* (2006.01)
*H04N 7/64* (2006.01)

(52) U.S. Cl. ..................................... 386/111; 386/113
(58) Field of Classification Search ................ 386/111, 386/109, 68, 124; 375/240, 394
See application file for complete search history.

(56) References Cited

U.S. PATENT DOCUMENTS 5,596,581 A * 1/1997 Saeijs et al. ................. 370/394

(Continued)

FOREIGN PATENT DOCUMENTS

EP 0840517 A2 5/1998

(Continued)

OTHER PUBLICATIONS

International Search Report for PCT Application PCT/JP02/00228 mailed May 21, 2002.

*Primary Examiner*—Thai Q. Tran
*Assistant Examiner*—Anner Holder
(74) *Attorney, Agent, or Firm*—RatnerPrestia

(57) ABSTRACT

In jumping reproduction, when an MPEG transport stream processed by the jumping reproduction is decoded and displayed, many noises occur in the video and the audio corresponding to the vicinity of the jumping.

Provided are: a hard disk section 208 of reading and reproducing AV data recorded as an MPEG transport stream in a recording medium; and an AV transfer control block 211 of controlling the hard disk section 208 in such a manner that during the reproduction of the AV data, when the reproduction is performed with skipping a predetermined portion of the AV data, before the skipping of the predetermined portion, transport packets are outputted up to the last one among those constituting a frame, and that after the skipping of the predetermined portion, transport packets are outputted starting from the beginning transport packet of the next I frame.

12 Claims, 26 Drawing Sheets

U.S. PATENT DOCUMENTS

| | | | |
|---|---|---|---|
| 5,987,212 A * | 11/1999 | Kim et al. | 386/68 |
| 6,463,208 B1 * | 10/2002 | Kim | 386/124 |
| 6,556,590 B1 * | 4/2003 | Saeijs et al. | 370/504 |
| 6,909,743 B1 * | 6/2005 | Ward et al. | 375/240.01 |

FOREIGN PATENT DOCUMENTS

| | | |
|---|---|---|
| JP | 8-125966 | 5/1996 |
| JP | 8-289247 | 11/1996 |
| JP | 9-214877 | 8/1997 |
| JP | 10-191258 | 7/1998 |
| JP | 10-200854 | 7/1998 |
| JP | 2000-134169 | 5/2000 |
| JP | 2000-251391 | 9/2000 |

* cited by examiner

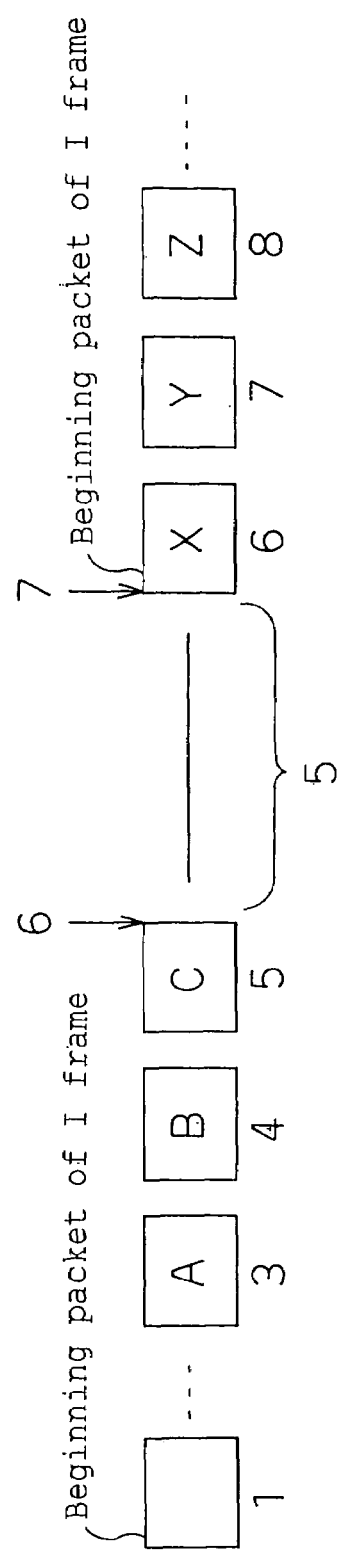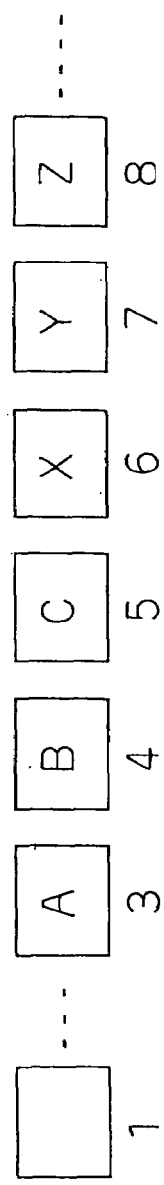
Fig. 5 (a)
Fig. 5 (b)

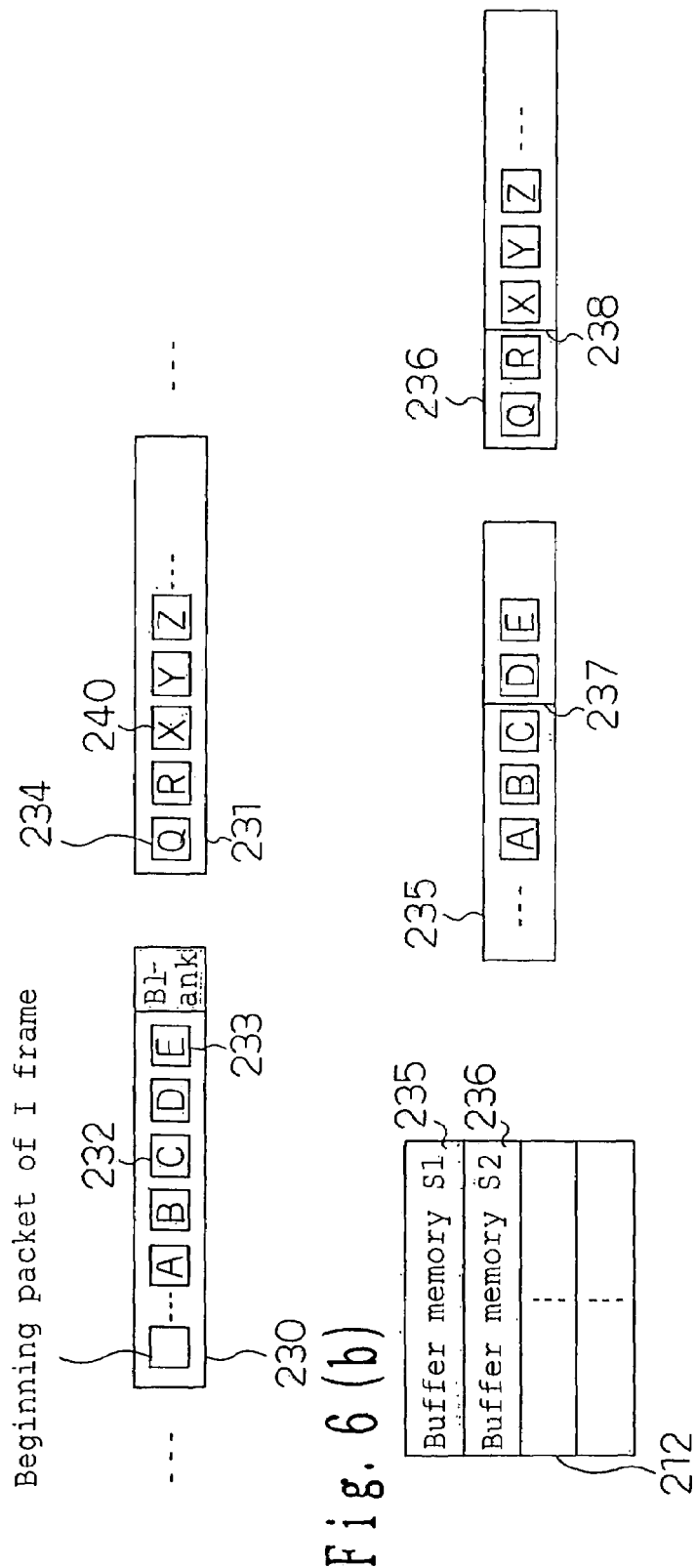

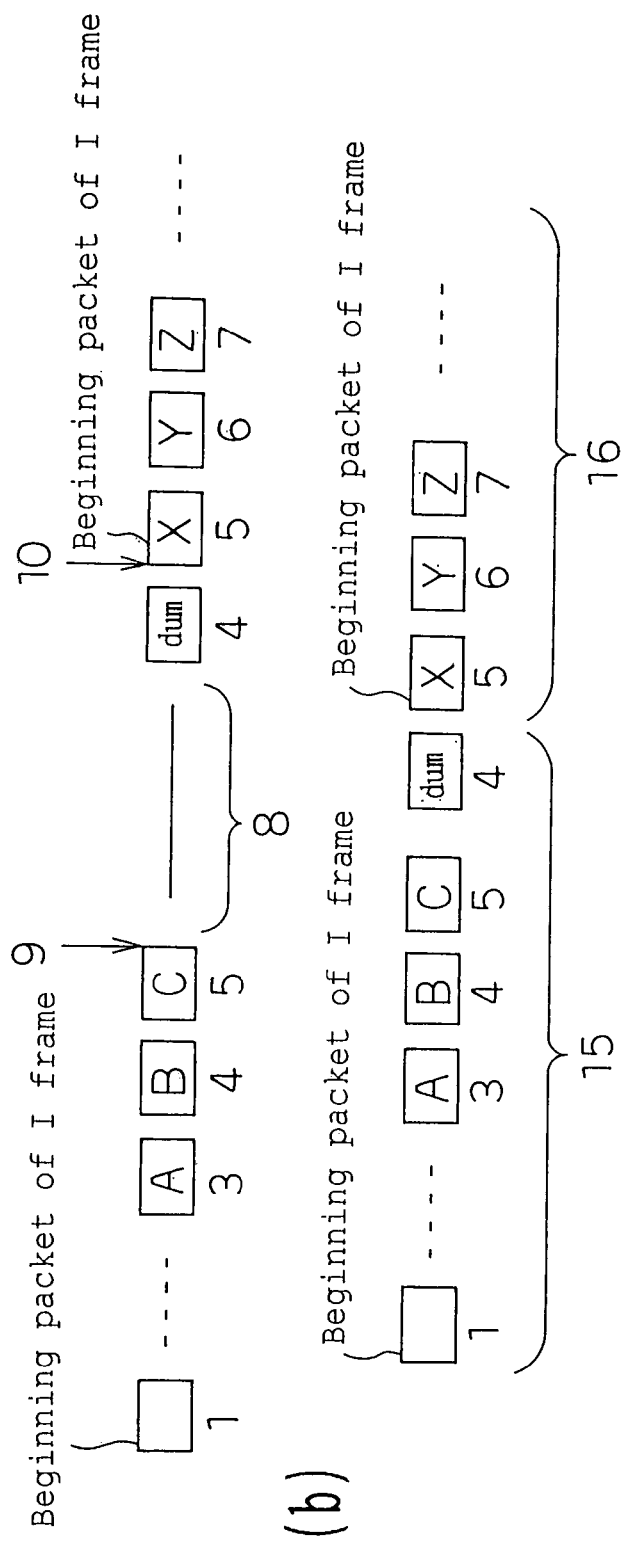

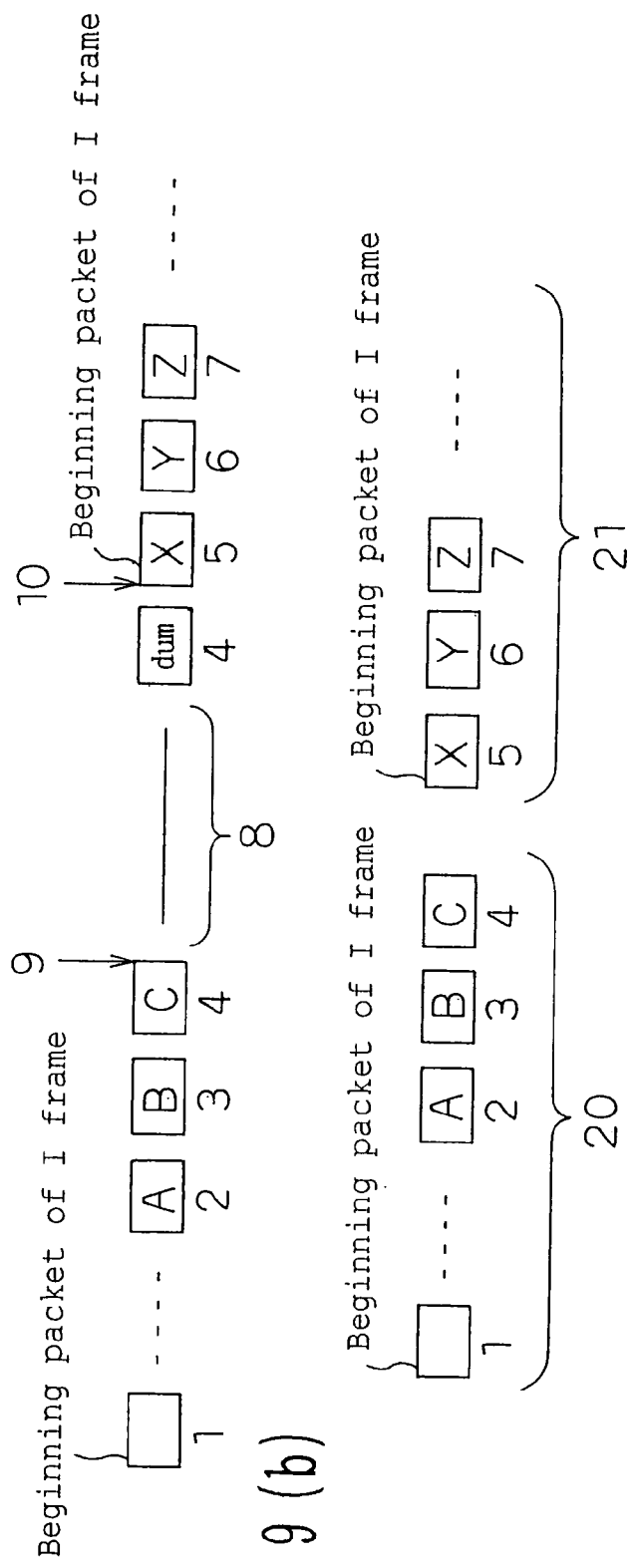

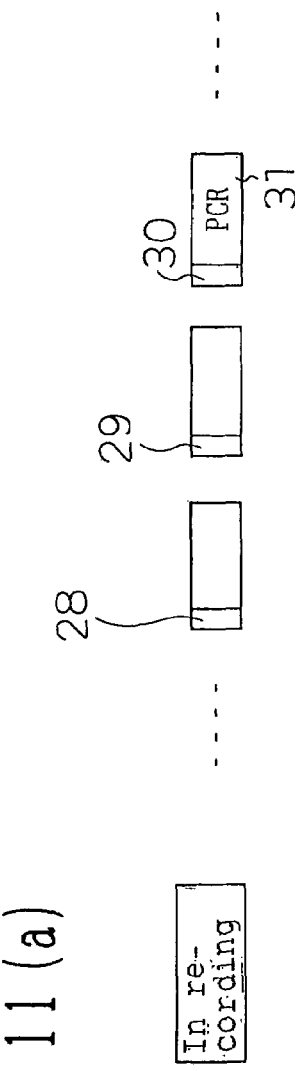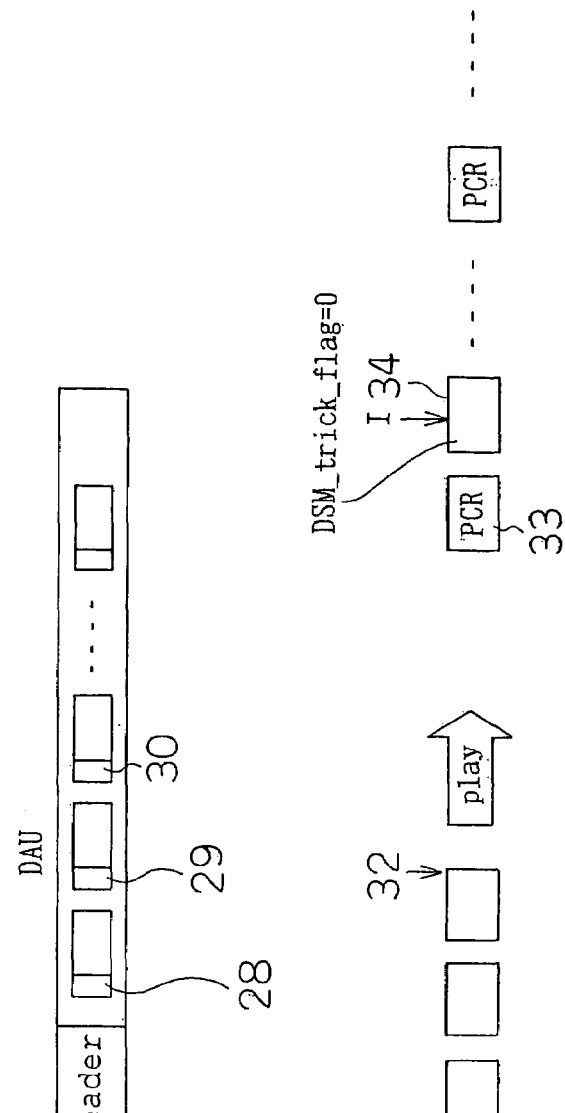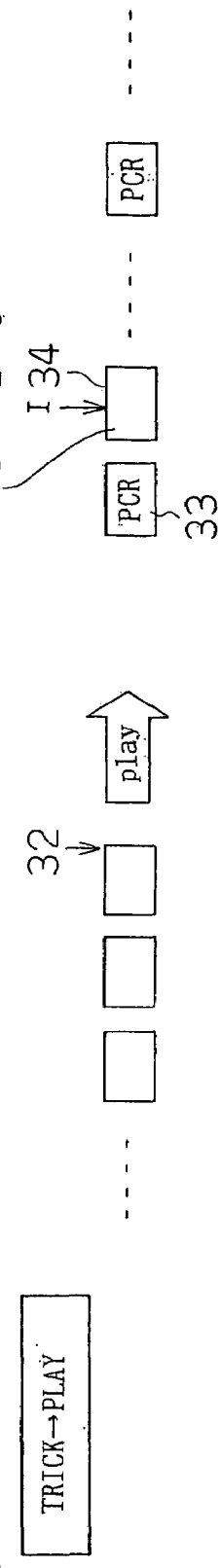
Fig. 11(a)
Fig. 11(b)
Fig. 11(c)

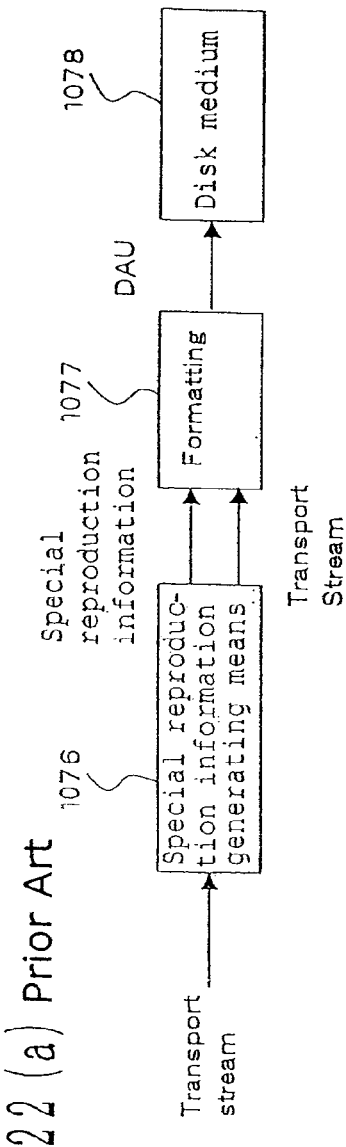
Fig. 22 (a) Prior Art
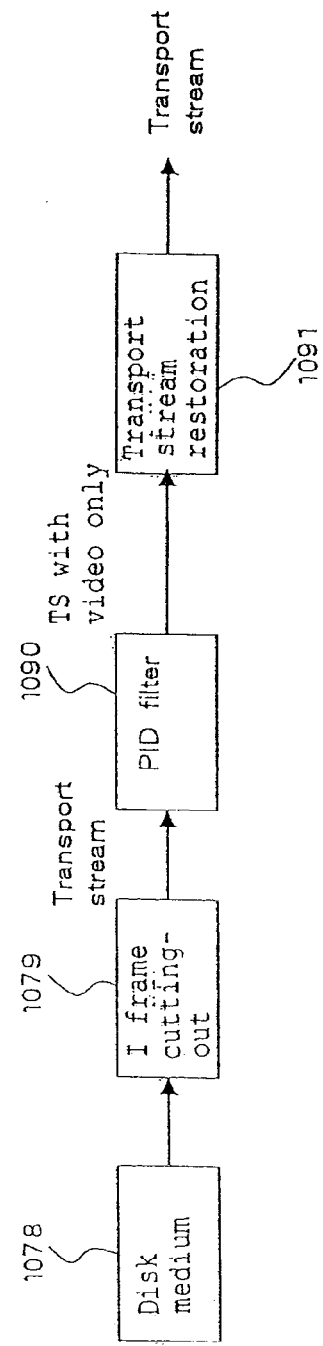
Fig. 22 (b) Prior Art

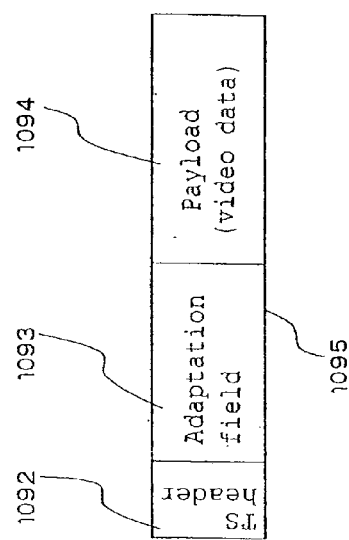
Fig. 23 (a) Prior Art
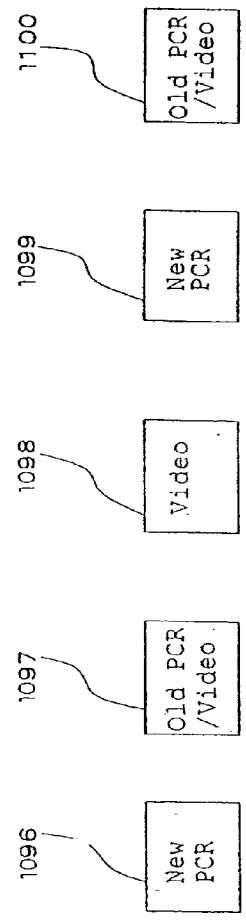
Fig. 23 (b) Prior Art

Fig. 24 (a) Prior Art

| CH=101   Video PID=0x100 | CH=191   Video PID=0x300 |

Fig. 24 (b) Prior Art

Edit and join

| Stream A   Video PID=0x100 | Stream B   Video PID=0x102 |

Copied from D-VHS (A)   Copied from D-VHS (B)

Fig. 24 (c) Prior Art

Object A                    Object B

| CH=101   Video PID=0x100 | CH=102   Video PID=0x100 |

Fig. 24 (d) Prior Art

| CH=2   Video PID=0x100 | CH=4   Video PID=0x100 |

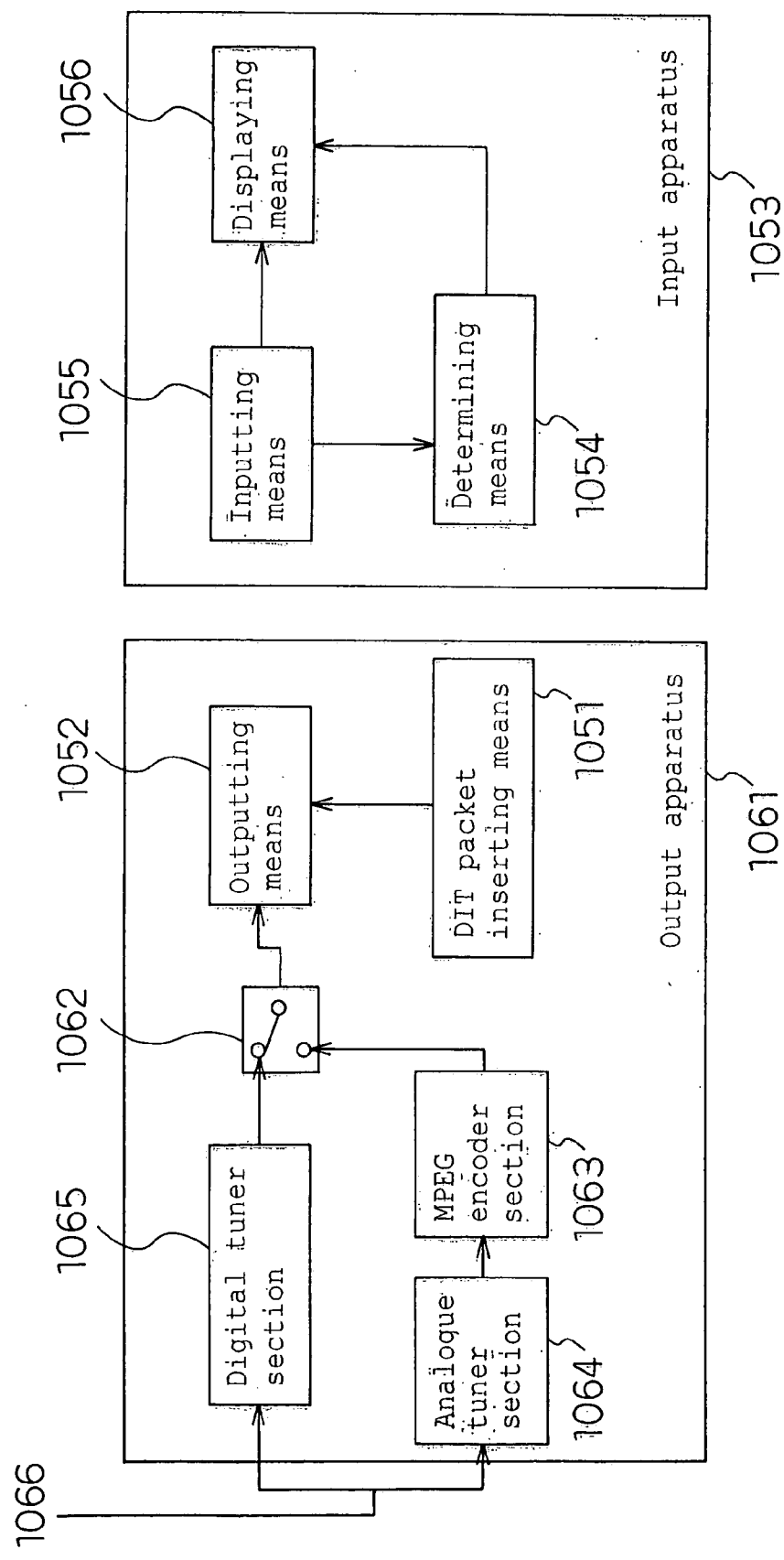

REPRODUCTION APPARATUS, REPRODUCTION METHOD, RECORDING APPARATUS, RECORDING METHOD, AV DATA SWITCHING METHOD, OUTPUT APPARATUS, AND INPUT APPARATUS

THIS APPLICATION IS A U.S. NATIONAL PHASE APPLICATION OF PCT INTERNATIONAL APPLICATION PCT/JP02/00228.

TECHNICAL FIELD

The present invention relates to a reproduction apparatus, a reproduction method, a recording apparatus, and a recording method of reproducing AV data recorded in a recording medium and of recording AV data into a recording medium, and further relates to an AV switching method of switching AV data, a reproduction method, an output apparatus of outputting AV data, and an input apparatus of inputting AV data.

BACKGROUND ART

With the recent spread and progress of personal computers, recording and reproduction apparatuses such as hard disk drives have been widely used as external storage apparatuses because of their large capacity and high speed. In order to meet recent increases in the size of computer software and the size of data to be processed, the speed and the capacity have been further improved in these recording and reproduction apparatuses serving as external storage apparatuses.

By virtue of their high speed and large capacity and by using digital technology, such recording and reproduction apparatuses having processed computer data are now used also as digital AV devices or recording and reproducing audiovisual data (referred to as AV data, hereafter).

As a first prior art, described below is a reproduction apparatus capable of performing jumping reproduction.

FIG. 12 shows a reproduction apparatus 102 capable of performing jumping reproduction.

The jumping reproduction indicates that, for example, AV data recorded in a recording medium is reproduced for 15 minutes starting from the beginning of the data, that the AV data from the point at 15 minutes to the point at 25 minutes relative to the beginning of the data is not reproduced, and that the AV data starting from the point at 25 minutes relative to the beginning of the data is reproduced immediately after the reproduction of the data of the 15 minutes starting from the beginning of the data. That is, the term indicates that AV data is reproduced with a predetermined part thereof being skipped.

Another example of the jumping reproduction is as follows. In one example a broadcasted program is recorded into a recording medium starting from the beginning of the program. During this recording, a button (pause button) is pushed which temporarily stops the recording apparatus at the time when AV data has been recorded for 15 minutes starting from the beginning of the program, whereby the recording of the AV data is stopped temporarily. The recording of the AV data is then restarted at the time when the AV data at 25 minutes relative to the beginning of the program is received.

When the AV data recorded in the recording medium as described above is reproduced, the AV data is reproduced for 15 minutes starting from the beginning of the program, and immediately after that, the AV data starting from the point at 25 minutes relative to the beginning of the program is reproduced. Such a case that the AV data, the recording of which is stopped temporarily during the recording is reproduced is also referred to as jumping reproduction.

The reproduction apparatus 102 comprises an HDD 2, stream controlling means 103, an IEEE1394 I/F 4, and a byte counter 101.

The HDD 2 is a hard disk drive of reading and reproducing AV data recorded in a hard disk medium.

The byte counter 101 is a counter of performing the byte counting of the position of AV data outputted as an MPEG transport stream by the stream controlling means 103.

The stream controlling means 103 is means of restoring the time interval of the transport packets of the AV data reproduced by the HDD 2, into the original time interval during the recording, and then outputting the data.

The IEEE1394 I/F 4 is means of providing an MPEG transport stream outputted from the stream controlling means 103, to an IEEE1394 bus which is not shown.

Described below is the operation of the reproduction apparatus 102.

At the start of reproduction, the stream controlling means 103 notifies the start of reproduction to the byte counter 101.

On receiving the notice of the start of reproduction, the byte counter 101 counts reproduction position information as the number of bytes counted from the beginning.

On receiving a reproduction command from the stream controlling means 103, the HDD 2 reads AV data from a location of the hard disk medium corresponding to an LBA (logical block address) specified by the stream controlling means 103, and thereby outputs the data to the stream controlling means 103.

On receiving the AV data from the HDD 2, the stream controlling means 103 restores the time interval of the transport packets of the AV data, and then outputs the data to the IEEE1394 I/F 4.

The IEEE1394 I/F 4 provides the MPEG transport stream outputted from the stream controlling means 103, to the IEEE1394 bus.

On the other hand, after receiving the notice of the start of reproduction from the stream controlling means 103, the byte counter 101 continues the byte counting of the position of the AV data outputted from the stream controlling means 103 to the IEEE1394 I/F 4.

The present value of the byte counter 101 is assumed to be m bytes (m is a positive integer). That is, the AV data in the amount of m bytes has been reproduced already since the start of the reproduction of the AV data.

At that time, it is assumed that the count value of the byte counter 101 is changed from m to n, and hence that an operation command instructing the reproduction apparatus 102 to perform jumping reproduction is received from a remote controller or the like of the reproduction apparatus 102. Then, the byte counter 101 notifies that the count value has been changed from m to n.

In response to this, the stream controlling means 103 outputs a transport packet of the time immediately before the notice from the byte counter 101, to the IEEE1394 I/F 4, then reads the AV data corresponding to the n bytes counted from the start of reproduction, from the HDD 2, and then outputs the beginning transport packet of this AV data corresponding to the n bytes counted from the start of reproduction, to the IEEE1394 I/F 4 immediately after the output of the preceding transport packet.

As such, when the value of the byte counter 101 is changed discretely, the stream controlling means 103 performs jumping reproduction.

In the reproduction of AV data such as a motion picture, the jumping reproduction permits, for example, uninteresting portions to be skipped, and hence interesting portions to be solely watched.

As a second prior art, described below is a reproduction apparatus capable of transiting from special reproduction to normal reproduction.

The reproduction apparatus performs the special reproduction and the normal reproduction of AV data recorded as an MPEG transport stream in a hard disk medium. When the reproduction apparatus transits from special reproduction to normal reproduction, a PCR packet is not always outputted at the start. When video data is outputted before the first PCR packet is outputted, missing of the video data occurs. When the value of PCR is changed from the value of PCR of special reproduction to the value of PCR of normal reproduction, a shock is temporarily occurred in the PLL-control-system which is synchronized with PCR and outputted video and audio is disturbed.

As a third prior art, described below is a method of performing special reproduction in the case that AV data is recorded as an MPEG transport stream in a disk medium or a tape medium.

Described first is special reproduction in a D-VHS.

FIG. 21 shows block diagrams illustrating special reproduction by a D-VHS. FIG. 21(a) is a block diagram showing the case that the D-VHS records an MPEG transport stream into a tape medium 1073. FIG. 12(b) is a block diagram showing the case that the D-VHS performs the special reproduction of the AV data recorded in the tape medium 1073.

Described first is a special reproduction scheme in the D-VHS.

FIG. 21(a) is a block diagram of the recording in the D-VHS.

A transport decoder 1070 of the D-VHS separates an MPEG transport stream to be recorded, and thereby outputs a PES stream.

A PES decoder 1071 receives the PES stream outputted from the transport decoder 1070, and thereby converts the PES stream into an elementary stream.

An I-frame extraction 1072 receives the elementary stream outputted from the PES decoder 1071, and thereby extracts an I frame to be used in the special reproduction.

Further, the I-frame extraction 1072 eliminates the AC components of the extracted I frame, and thereby reduces the amount of data.

The data of the I frame which has been outputted from the I-frame extraction 1072 and the amount of data of which has been reduced is recorded into a special reproduction data region provided in a tape medium 1073.

FIG. 21(b) is a block diagram of the reproduction in the D-VHS.

The data recorded in the tape medium 1073 is read from the tape medium 1073, and then outputted to an I-frame extraction 1074.

From the received data, the I-frame extraction 1074 extracts data read from the special reproduction data region of the tape medium 1073. That is, I frame to be used for special reproduction is extracted. Then, the extracted I frame is outputted as an elementary stream.

A transport stream restoration 1075 receives the elementary stream to be used for special reproduction from the I-frame extraction 1074, then adds a PES header to the elementary stream so as to generate a PES stream, and then generates a transport stream from the PES stream. In the generation of the transport stream, a PAT, a PMT, and an SIT are added. Further added is a special reproduction PCR. The MPEG transport stream generated as described above is decoded and displayed, for example, in a television receiver, whereby special reproduction is performed.

Described next is a special reproduction scheme in a hard disk drive capable of recording and reproducing AV data.

FIG. 22(a) is a block diagram of the recording.

An IEEE1394 interface (not shown) of the hard disk drive capable of recording and reproducing AV data receives AV data transmitted from an IEEE1394 bus or the like.

The IEEE1394 interface outputs the received AV data as an MPEG transport stream to a special reproduction information generating means 1076.

The special reproduction information generating means 1076 analyzes the MPEG transport stream outputted from the IEEE1394 interface, and thereby generates special reproduction information. The special reproduction information comprises the type of picture, position information, and size information. The type of picture is information indicating that a frame is an I, B, or P frame. The picture position information indicates the position where the I, P, or B frame begins, and specifies, for example, the byte where the I, P, or B frame begins relative to the beginning of the AV data. The size information indicates the byte size of the data of the I, P, or B frame.

A formatting 1077 receives the special reproduction information and the MPEG transport stream, and thereby converts the data into a recording format. That is, the formatting 1077 converts the data into a format used when the data is stored into a disk access unit which is a minimum unit for continuous access to a disk medium 1078. The format of the disk access unit comprises a header section and a data section. The MPEG transport stream is stored in the data section, while the header section stores: the special reproduction information such as the type of picture, the position information, and the size information; chain information of specifying the preceding and the following disk access units; and the like.

As such, the data is converted into the format of disk access unit, and then recorded into the disk medium 1078.

FIG. 22(b) is a block diagram of the reproduction.

On the basis of the special reproduction information stored in the header section of each disk access unit out of data read from the disk medium 1078, an I frame cutting-out 1079 cuts out the I frame to be used for special reproduction from the MPEG transport stream stored in the data section of the disk access unit.

The I frame cutting-out 1079 then outputs the cutout I frame as an MPEG transport stream.

Using the PID of the transport packet of the MPEG transport stream received from the I frame cutting-out 1079, a PID filter 1090 eliminates packets other than video packets, and thereby outputs a transport stream composed solely of video data.

The transport packet outputted from the PID filter 1090 and composed solely of video data is then provided with a PAT, a PMT, and an SIT for special reproduction. Further a special reproduction PCR is added. Continuity counter in the header section of each transport stream is rewritten such as to be successive, whereby a complete transport stream for special reproduction is restored.

The restored transport stream is converted into an isochronous packet by an IEEE1394 interface (not shown) and then transmitted to an IEEE1394 bus.

The MPEG transport stream transmitted as described above is decoded by an AV device such as an STB (set-top box), and then displayed, whereby special reproduction is performed.

As a fourth prior art, described below is a method of switching AV data.

FIG. 24(a) shows an example of an MPEG transport stream outputted from an STB which receives an MPEG transport stream broadcasted in a broadcasting wave from a broadcasting station.

In the example of FIG. 24(a), during the time when the STB selects a channel 101 and outputs an MPEG transport stream of the channel 101, another channel 191 is newly selected.

The PID of the video packet of the MEPG transport stream outputted from the STB when the channel 101 is selected is 0x100. In contrast, after the channel 191 is newly selected, the PID of the video packet of the MPEG transport stream outputted from the STB is changed into 0x300. It should be noted that a video packet indicates a transport packet containing video data among the transport packets in the MPEG transport stream. The PID of a video packet is registered in the PMT, and hence the PID of the video packet is obtained by referring to the PMT.

In an AV device such as a television receiver which receives, decodes, and displays the MPEG transport stream outputted from the STB, when the PID of the video packet of the received MPEG transport stream changes, the AV device determines that the channel has been changed, and thereby mutes intentionally the voice and the video for a predetermined time so as to manifest the channel change. In data broadcasting, at the channel change, a browser for the data broadcasting is restarted, whereby the data of the content is renewed immediately. An example of such a browser for data broadcasting is a BML browser corresponding to the BML language.

As such, in an AV device such as a television receiver which decodes and displays an MPEG transport stream, when a change occurs in general in at least one of the PID of a transport packet containing an PMT, the PID of a transport packet containing video, and the PID of a transport packet containing a PCR, the AV device determines that the channel has been changed, and thereby mutes intentionally the voice and the video for a predetermined time so as to manifest the channel change. Besides, at the channel change, a BML browser is restarted, whereby the data of the content is renewed immediately.

Accordingly, when the channel is changed in the STB, the television receiver which receives and decodes the MPEG transport stream outputted from the STB mutes temporarily the television screen. This permits the user to recognize easily the channel change. Further, the restart of the BML browser permits immediate renewal of the data of the content of the data broadcasting.

Nevertheless, in the first prior art, in the timing of receiving the operation command for jumping reproduction, the reproduction apparatus 102 of FIG. 12 stops the reproduction of the MPEG transport stream, and then reproduces the MPEG transport stream at the destination of jumping.

Thus, such a case can occur that the reproduction apparatus 102 stops the reproduction and the output at the time when the transport packets of a frame are outputted midway before the jumping, and that after the jumping, the reproduction apparatus 102 restarts the reproduction and the output at a transport packet in the midway of a frame. Thus, when the MPEG transport stream outputted from the reproduction apparatus 102 is decoded and displayed, a block noise which is specific to MPEG occurs in the jumping reproduction portion.

Further, in the case that after a temporary stop during AV data recording, the recording of the AV data is restarted so that the AV data is recorded in a recording medium, the AV data is interrupted temporarily during the recording at a transport packet in the midway of the transport packets constituting a frame. Then, the recording is restarted at a transport packet in the midway of another frame. Accordingly, when such AV data is reproduced from the recording medium, at the point of the recording interruption, the reproduction is interrupted at a transport packet in the midway of a frame, and then restarted at a transport packet in the midway of another frame.

Accordingly, in each of the above-mentioned cases, a block noise which is specific to MPEG occurs frequently in the jumping reproduction.

That is, there is the problem that in jumping reproduction, when the MPEG transport stream under the jumping reproduction is decoded and displayed, many noises occur in the video and the audio corresponding to the vicinity of the jumping.

In the second prior art, there is the problem that when the reproduction apparatus transits from special reproduction to normal reproduction, missing video data occurs and outputted video and audio is disturbed.

In the third prior art, in the AV data recorded in the D-VHS and the hard disk, such a case can occur that the PID of the transport packet containing a PCR is identical to the PID of the transport packet containing video data.

FIG. 23(a) shows a transport packet 1095 in such a case. A TS header 1092 is a section of the header of the transport packet other than the section of an adaptation field 1093. A PID is described in this section.

The adaptation field 1093 is added to the header of the transport packet 1095 when necessary. A PCR is described in this section.

Video data is stored in a payload 1094.

As such, the transport packet 1095 contains the video data and the PCR simultaneously.

When the PID filter 1090 of the hard disk drive of FIG. 22 is intended to eliminate PCR packets and thereby collect solely video packets using the PIDs of the transport packets, in case that the transport packets are as shown in FIG. 23(a), the PCR packet and the video packet have the same PID and hence are undistinguishable.

Accordingly, when the transport stream restoration 1091 of FIG. 22 adds a special reproduction PCR, the outputted MPEG transport stream is as shown in FIG. 23(b). That is, a new PCR 1096 is a transport packet containing the PCR newly added for special reproduction, while an old PCR/video 1097 is a transport packet containing the PCR and the video data which have originally been added. This causes a mixed state between the PCR newly added for special reproduction and the PCR having originally been added, and hence constitutes an inappropriate MPEG transport stream.

That is, there is the problem that when the PID of the transport packet containing a PCR is identical to the PID of the transport packet containing video data in an MPEG transport stream to be processed by special reproduction, and when an MPEG transport stream for special reproduction is generated from the transport stream, an appropriate MPEG transport stream is not generated.

In the fourth prior art, in case that the AV data recorded as an MPEG transport stream in the recording and reproduction apparatus such as a hard disk and a D-VHS is composed of data generated by editing and joining plural pieces of AV data, the PID of the video packet can change at the joint portion.

FIG. 24(b) shows an MPEG transport stream obtained when such AV data is reproduced by the recording and reproduction apparatus. The MPEG transport stream shown in FIG. 24(b) is generated by editing and joining a stream A and a stream B which are two distinct MPEG transport streams.

The PID of the video packet of the stream A is 0x100, while the PID of the video packet of the stream B is 0x102. The PID of the video packet changes at the portion joining the stream A with the stream B.

Accordingly, when an AV device such as a television receiver decodes and displays the MPEG transport stream shown in FIG. 24(b), even when the user having edited the MPEG transport stream intends that the video and the audio would be displayed continuously as illustrated in FIG. 24(b), the AV device such as a television receiver determines as if the channel was changed at the portion joining the stream A with the stream B, and thereby mutes temporarily the video and the audio displayed through the television screen.

FIG. 24(c) shows a reproduction stream for the case that recording contents are recorded on and reproduced from a disk on an object basis and that the contents are reproduced with switching the object. That is, this stream is an MPEG transport stream for the case that the reproduction is performed across two objects, that is, for the case that the reproduction is performed across an object A and an object B.

However, in the MPEG transport stream of FIG. 24(c) the PID of the video packet dose not change at the joint portion.

Accordingly, when an AV device such as a television receiver decodes and displays the MPEG transport stream shown in FIG. 24(c), the PID of the video packet dose not change, whereby the video and the audio are not muted at the joint portion. Thus, the change of the object is not clear for the person watching the television screen. That is, when the reproduction is performed with switching the object, such an inconsistency occurs that the muting is performed when the video packets have distinct PIDs but that the muting is not performed when the video packets have the same PID.

Further, in case that data broadcasting or the like is reproduced with switching the object, there is the problem that when the PIDs are the same, the browser for the data broadcasting is not restarted, and that the renewal of the browser screen thereby delays.

Further, when analogue broadcasting such as terrestrial broadcasting is received by a terrestrial tuner, and when the analogue signal is inputted to an STB, the STB converts the analogue signal temporarily into an MPEG transport stream, and then outputs the stream to an AV device such as a television receiver which decodes and displays the MPEG transport stream.

In this case, when the STB converts the analogue signal into the MPEG transport stream, a certain PID is assigned to the PID of the video packet.

Accordingly, even when the reception channel is changed in the terrestrial tuner, the PID does not change in the video packet of the MPEG transport stream outputted from the STB.

FIG. 24(d) shows an example of the MPEG transport stream outputted from the STB when the channel is changed in the terrestrial tuner.

The PID of the video packet when a channel 2 is received in the terrestrial tuber does not change even after the channel is changed to a channel 4 in the terrestrial tuber.

Accordingly, despite that the channel 2 has actually been changed into the channel 4, the AV device such as a television receiver which decodes and displays the MPEG transport stream does not determine that the channel has been changed, and thereby does not mute the video and the audio displayed on the television screen.

As a summary of the above-mentioned technical problems in the fourth prior art, first, there is the problem that in case that an edited MPEG transport stream is reproduced, when the portion joining two MPEG transport streams is decoded and displayed, the video and the audio are actually muted despite that the person having edited the stream intends not to mute the video and the audio.

Further, there is the problem that when reproduction is performed with switching the object, such a case can occur that muting cannot be performed at the switching of the object even when the muting is desired.

Furthermore, there is the problem that when data broadcasting is reproduced with switching the object, such a case can occur that the browser for the data broadcasting is not restarted at the switching of the object, and that the renewal of the screen thereby delays.

Furthermore, there is the problem that in case that an analogue signal received by an analogue tuner is converted into an MPEG transport stream and then the converted MPEG transport stream is decoded and displayed, even when the channel is changed in the analogue tuner, the displayed video and audio are not muted.

DISCLOSURE OF INVENTION

In view of the above-mentioned problems, an object of the invention is to provide a reproduction apparatus and a reproduction method in which when an MPEG transport stream processed by the jumping reproduction is decoded and displayed, no noise occurs in the video and the audio in the vicinity of the jumping.

Still further, in view of the above-mentioned problems, an object of the invention is to provide a recording apparatus, a reproduction apparatus, a recording method, and a reproduction method in which when the reproduction apparatus transits from special reproduction to normal reproduction, missing video data does not occur and outputted video and audio is not disturbed.

Further, in view of the above-mentioned problems, an object of the invention is to provide a recording apparatus, a reproduction apparatus, a recording method, and a reproduction method which permit rapid transition from special reproduction to normal reproduction at a low price.

Further, in view of the above-mentioned problems, an object of the invention is to provide a recording apparatus, a reproduction apparatus, a recording method, and a reproduction method which permit rapid transition from special reproduction to normal reproduction without a heavy load on the hardware and the software.

Further, in view the above-mentioned problems, an object of the invention is to provide a recording method and a reproduction method in which in an MPEG transport stream processed by special reproduction, even when the PID of a transport packet containing an PCR and the PID of a transport packet containing video data are the same, the MPEG transport stream for special reproduction is reproduced appropriately.

Further, in view of the above-mentioned problems, an object of the invention is to provide an AV data switching method, an output apparatus, and an input apparatus in which when an edited MPEG transport stream is reproduced and when the portion joining two MPEG transport streams is decoded and displayed, in case that the person having edited the stream intends not to mute the video and the audio, the video and the audio are, in accordance with the person's intention, not muted.

Further, in view of the above-mentioned problems, an object of the invention is to provide an AV data switching method, an output apparatus, and an input apparatus in which when reproduction is performed with switching the object, the video and the audio are explicitly muted at the switching point between the two objects.

Further, in view of the above-mentioned problems, an object of the invention is to provide an output apparatus and an input apparatus in which when reproduction is performed with switching the object, a browser for data broadcasting is restarted always at the time of switching the object so that the screen is renewed immediately.

Further, in view of the above-mentioned problems, an object of the invention is to provide an AV data switching method, an output apparatus, and an input apparatus in which in case that an analogue signal received by an analogue tuner is converted into an MPEG transport stream and then the converted MPEG transport stream is decoded and displayed, when the channel is changed in the analogue tuner, the displayed video and audio are muted in response to the channel change.

A first aspect of the present invention is a reproduction apparatus comprising:

reading means of reading AV data recorded in a recording medium as a compression encoded stream processed by inter-frame compression and intra-frame compression; and controlling means of controlling said reading means in such a manner that during the reproduction of said AV data by said reading means, when the reproduction is performed with skipping a predetermined portion of said AV data, after the skipping of said predetermined portion, said reading means outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

A second aspect of the present invention is a reproduction apparatus comprising:

reading means of reading AV data recorded in a recording medium as a compression encoded stream processed by inter-frame compression and intra-frame compression; and controlling means of controlling said reading means in such a manner that during the reproduction of said AV data by said reading means, when the reproduction is performed with skipping a predetermined portion of said AV data, before the skipping of said predetermined portion, said reading means outputs transport packets until the last one among those constituting a frame of the video data presently outputted by said reading means, and that after the skipping of said predetermined portion, said reading means outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

A third aspect of the present invention is a reproduction apparatus according to the first or the second aspect of the present invention, wherein:

said intra-frame compressed frame is an I frame.

A fourth aspect of the present invention is a reproduction apparatus according to the first or the second aspect of the present invention, wherein said "having a different value" indicates that the value of the continuity counter of said dummy packet is smaller by unity than the value of the continuity counter of said transport packet located at the beginning of the next I frame.

A fifth aspect of the present invention is a reproduction apparatus according to the first or the second aspect of the present invention, wherein said dummy packet indicates a transport packet a payload of which is filled with a padding value of an elementary stream.

A sixth aspect of the present invention is a reproduction apparatus according to the first or the second aspect of the present invention, wherein:

said dummy packet indicates a transport in a payload of which a PES header is embedded; and the embedded PES header has invalid data.

A seventh aspect of the present invention is a reproduction apparatus according to the first or the second aspect of the present invention, wherein said dummy packet indicates a transport packet a header of which is filled with invalid data.

An eighth aspect of the present invention is a reproduction apparatus according to the first or the second aspect of the present invention, wherein: a transport packet a payload of which is filled with a padding value of an elementary stream is referred to as a first transport packet; a transport packet in a payload of which a PES header is embedded and in which the embedded PES header has invalid data is referred to as a second transport packet; and a transport packet a header of which is filled with invalid data is referred to as a third transport packet; and wherein said dummy packet corresponds to at least two or more of said first transport packet, said second transport packet, and said third transport packet.

A ninth aspect of the present invention is a reproduction apparatus according to the first or the second aspect of the present invention, wherein after the skipping of said predetermined portion, said reading means sets the value of a continuity counter of said transport packet of the compression encoded stream located at the beginning of the next intra-frame compressed frame, to be different from the value of a continuity counter of a transport packet of the compression encoded stream located at the last of a frame outputted immediately before the output of the transport packet.

A tenth aspect of the present invention is a reproduction apparatus according to the ninth aspect of the present invention, wherein:

said "setting the value to be a different value" indicates that said reading means sets the value of the continuity counter of said transport packet of the compression encoded stream located at the beginning of the next intra-frame compressed frame, to be a value generated by adding unity to the value of the continuity counter of the transport packet of the compression encoded stream located at the last of the frame outputted immediately before the output of the transport packet; and as for the frames of the video data after said transport packet of the compression encoded stream located at the beginning of the next intra-frame compressed frame, said reproducing means rewrites the values of the continuity counters in such a manner that the values of the continuity counters of the transport packets of the compression encoded stream become successive.

An eleventh aspect of the present invention is a reproduction method comprising:

a reading step of reading AV data recorded in a recording medium as a compression encoded stream processed by inter-frame compression and intra-frame compression; and a controlling step of controlling said reading means in such a manner that during the reproduction of said AV data by said reading means, when the reproduction is performed with skipping a predetermined portion of said AV data, after the skipping of said predetermined portion, said reading means outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

A twelfth aspect of the present invention is a reproduction method comprising:

a reading step of reading AV data recorded in a recording medium as a compression encoded stream processed by inter-frame compression and intra-frame compression; and a controlling step of controlling said reading means in such a manner that during the reproduction of said AV data by said reading means, when the reproduction is performed with skipping a predetermined portion of said AV data, before the skipping of said predetermined portion, said reading means outputs transport packets until the last one among those constituting a frame of the video data presently outputted by said reading means, and that after the skipping of said predetermined portion, said reading means outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

A fourteenth aspect of the present invention is a reproduction apparatus comprising:

reading means of reading AV data and a time stamp from a recording medium that records said AV data which is recorded as an MPEG transport stream in the recording medium and in which the value of said time stamp added to the transport packet of the MPEG transport stream is set on the basis of a PCR provided in said MPEG transport stream; and PCR packet generating means in which during the reproduction of said AV data by said reading means, at a transition from special reproduction to normal reproduction, a PCR the value of which is set to be the value of a time stamp added to any transport packet among said reproduced transport packets located before an I frame located at the beginning among the I frames to be processed by normal reproduction is added to any transport packet located before said I frame located at the beginning; wherein after the transition from special reproduction to normal reproduction, the transport packets are outputted starting from any one located before said I frame located at the beginning.

A fifteenth aspect of the present invention is a recording apparatus comprising:

writing means of writing AV data as an MPEG transport stream into a recording medium; and difference calculating means of calculating the difference between the value of a time stamp which is added to a transport packet with PCR at the time of write into said recording medium and the value of the PCR of the transport packet; wherein said writing means writes said difference into said recording medium.

A sixteenth aspect of the present invention is a recording apparatus according to the fifteenth aspect of the present invention, wherein the number of transport packets in which said difference is calculated is one in each disk access unit which is a minimum unit of successive AV data access.

A seventeenth aspect of the present invention is a recording apparatus according to the fifteenth aspect of the present invention, wherein said writing means writes said difference in such a manner that at least one said difference corresponds to each disk access unit which is a minimum unit of successive AV data access.

An eighteenth aspect of the present invention is a recording apparatus according to the seventeenth aspect of the present invention, wherein said "at least one said difference corresponds to each disk access unit" indicates that said difference is written into a header section of said disk access unit.

A nineteenth aspect of the present invention is a reproduction apparatus comprising:

reading means of reading said AV data and said difference from the recording medium in which the AV data is recorded by the recording apparatus according to the fifteenth aspect of the present invention; and PCR packet generating means in which during the reproduction of said AV data by said reading means, at a transition from special reproduction to normal reproduction, the value of a PCR corresponding to any transport packet located before the I frame located at the beginning is calculated, using said difference, from a time stamp added to any transport packet among said reproduced transport packets located before an I frame located at the beginning among the I frames to be processed by normal reproduction, and in which the PCR is added to any transport packet located before said I frame located at the beginning; wherein after the transition from special reproduction to normal reproduction, the transport packets are outputted starting from any one located before said I frame located at the beginning.

A twentieth aspect of the present invention is a reproduction apparatus according to the nineteenth aspect of the present invention, wherein:

said difference is recorded such as to correspond to each disk access unit which is a minimum unit of successive AV data access in said recording medium; and said PCR packet generating means calculates the value of said PCR by using said difference corresponding to said disk access unit in which said preceding transport packet has been recorded.

A twenty-first aspect of the present invention is a reproduction apparatus according to the twentieth aspect of the present invention, wherein said "recorded such as to correspond" indicates that said difference is recorded into a header section of said disk access unit.

A twenty-third aspect of the present invention is a reproduction method comprising:

a reading step of reading AV data and a time stamp from a recording medium that records said AV data which is recorded as an MPEG transport stream in the recording medium and in which the value of said time stamp added to the transport packet of the MPEG transport stream is set on the basis of a PCR provided in said MPEG transport stream; and a PCR packet generating step in which during the reproduction of said AV data in said reading step, at a transition from special reproduction to normal reproduction, a PCR the value of which is set to be the value of a time stamp added to any transport packet among said reproduced transport packets located before an I frame located at the beginning among the I frames to be processed by normal reproduction is added to any transport packet located before said I frame located at the beginning; wherein after the transition from special reproduction to normal reproduction, the transport packets are outputted starting from any one located before said I frame located at the beginning.

A twenty-fourth aspect of the present invention is a recording method comprising:

a writing step of writing AV data as an MPEG transport stream into a recording medium; and a difference calculating step of calculating the difference between the value of a time stamp which is added to a transport packet with PCR at the time of writing into said recording medium and the value of the PCR of the transport packet; wherein in said writing step, said difference is written into said recording medium.

A twenty-fifth aspect of the present invention is a reproduction method comprising:

a reading step of reading said AV data and said difference from the recording medium in which the AV data is recorded by the recording method according to claim 24; and a PCR packet generating step in which during the reproduction of said AV data in said reading step, at a transition from special reproduction to normal reproduction, the value of a PCR corresponding to any transport packet located before the I frame located at the beginning is calculated, using said difference, from a time stamp added to any transport packet among said reproduced transport packets located before an I frame located at the beginning among the I frames to be processed by normal reproduction, and in which the PCR is added to any transport packet located before said I frame located at the beginning; wherein after the transition from special reproduction to normal reproduction, the transport packets are outputted starting from any one located before said I frame located at the beginning.

A twenty-sixth aspect of the present invention is a reproduction apparatus comprising:

special-reproducing means of performing the special reproduction of AV data recorded in a recording medium;

PCR masking means in which when said special-reproducing means performs the special reproduction of said AV data where the PID of a transport packet containing a PCR is the same as that of a transport packet containing video data, said PCR of said transport packet containing a PCR is masked; and special reproduction PCR generating means of generating a transport packet containing a special reproduction PCR which has the same PID as that of said transport packet containing video data.

A twenty-seventh aspect of the present invention is a reproduction method comprising:

a special-reproducing step of performing the special reproduction of AV data recorded in a recording medium;

a PCR masking step in which when, in said special-reproducing step, the special reproduction is performed on said AV data where the PID of a transport packet containing a PCR is the same as that of a transport packet containing video data, said PCR of said transport packet containing a PCR is masked; and a special reproduction PCR generating step of generating a transport packet containing a special reproduction PCR which has the same PID as that of said transport packet containing video data.

A thirty-second aspect of the present invention is an output apparatus comprising:

outputting means of outputting AV data as an MPEG transport stream;

DIT packet inserting means of inserting a transport packet containing a DIT provided with a flag indicating whether the displaying of said AV data is to be muted or not, when said AV data outputted is switched; and object managing means of recording and managing the AV data on an object basis; wherein when said object managing means performs reproduction with switching an object, said DIT packet inserting means sets said flag such that the displaying of said AV data is muted when said object is switched.

A thirty-sixth aspect of the present invention is an output apparatus comprising:

outputting means of outputting a data broadcasting stream as an MPEG transport stream; and DIT packet inserting means of inserting a transport packet containing a DIT provided with a flag indicating whether a browser for the data broadcasting is to be restarted or not, when said data broadcasting stream is switched.

A thirty-seventh aspect of the present invention is an output apparatus according to the thirty-sixth aspect of the present invention, comprising object managing means of recording and managing AV data on an object basis, wherein when said object managing means performs reproduction with switching an object, said DIT packet inserting means sets said flag such that said browser for the data broadcasting is restarted when said object is switched.

A thirty-eighth aspect of the present invention is an output apparatus according to the thirty-sixth aspect of the present invention, wherein said DIT packet inserting means sets said flag such that said browser for the data broadcasting is restarted when a reception channel is switched.

A thirty-ninth aspect of the present invention is an input apparatus comprising:

inputting means of inputting the stream data outputted from the output apparatus according to the thirty-sixth invention of the present invention; and determining means of determining whether said browser for the data broadcasting is to be restarted or not, on the basis of said flag provided in said DIT packet.

A fortieth aspect of the present invention is an input apparatus according to the thirty-ninth aspect of the present invention, comprising displaying means in which in the displaying of said data broadcasting stream having been inputted, said browser for the data broadcasting is restarted on the basis of said determination.

The present invention may be a program of causing a computer to serve as all or part of:

reading means of reading AV data recorded in a recording medium as a compression encoded stream processed by inter-frame compression and intra-frame compression; and controlling means of controlling said reading means in such a manner that during the reproduction of said AV data by said reading means, when the reproduction is performed with skipping a predetermined portion of said AV data, after the skipping of said predetermined portion, said reading means outputs a dummy packet and then outputs transport packets starting from one located at the beginning of the next intra-frame compressed frame among the frames of the video data following the skipping of said predetermined portion; in the reproduction apparatus according to the first invention of the present invention.

Further, the present invention may be a computer processable medium carrying the program according to the above-mentioned invention.

The present invention may be a program of causing a computer to serve as all or part of:

reading means of reading AV data recorded in a recording medium as a compression encoded stream processed by inter-frame compression and intra-frame compression; and controlling means of controlling said reading means in such a manner that during the reproduction of said AV data by said reading means, when the reproduction is performed with skipping a predetermined portion of said AV data, before the skipping of said predetermined portion, said reading means outputs transport packets up to the last one among those constituting a frame of the video data presently outputted by said reading means, and that after the skipping of said predetermined portion, said reading means outputs a dummy packet and then outputs transport packets starting from one located at the beginning of the next intra-frame compressed frame among the frames of the video data following the skipping of said predetermined portion; in the reproduction apparatus according to the second invention of the present invention.

Further, the present invention may be a computer processable medium carrying the program according to the above-mentioned invention.

The present invention may be a program of causing a computer to serve as all or part of:

reading means of reading AV data and a time stamp from a recording medium that records said AV data which is recorded as an MPEG transport stream in the recording medium and in which the value of said time stamp added to the transport packet of the MPEG transport stream is set on the basis of a PCR provided in said MPEG transport stream; and PCR packet generating means in which during the reproduction of said AV data by said reading means, at a transition from special reproduction to normal reproduction, a PCR the value of which is set to be the value of a time stamp added to any transport packet among said reproduced transport packets located before an I frame located at the beginning among the I frames to be processed by normal reproduction is added to any transport packet located before said I frame located at the beginning; in the reproduction apparatus according to the fourteenth invention of the present invention.

Further, the present invention may be a computer processable medium carrying the program according to the above-mentioned invention.

The present invention may be a program of causing a computer to serve as all or part of:

writing means of writing AV data as an MPEG transport stream into a recording medium; and difference calculating means of calculating the difference between the value of a time stamp which is added to a transport packet with PCR at the time of write into said recording medium and the value of the PCR of the transport packet; in the recording apparatus according to the fifteenth invention of the present invention.

Further, the present invention may be a computer processable medium carrying the program according to the above-mentioned invention.

The present invention may be a program of causing a computer to serve as all or part of:

reading means of reading said AV data and said difference from the recording medium in which the AV data is recorded by the recording apparatus according to the fifteenth invention of the present invention; and PCR packet generating means in which during the reproduction of said AV data by said reading means, at a transition from special reproduction to normal reproduction, the value of a PCR corresponding to any transport packet located before the I frame located at the beginning is calculated, using said difference, from a time stamp added to any transport packet among said reproduced transport packets located before an I frame located at the beginning among the I frames to be processed by normal reproduction, and in which the PCR is added to any transport packet located before said I frame located at the beginning; in the reproduction apparatus according to the nineteenth invention of the present invention.

Further, the present invention may be a computer processable medium carrying the program according to the above-mentioned invention.

The present invention may be a program of causing a computer to serve as all or part of:

special-reproducing means of performing the special reproduction of AV data recorded in a recording medium;

PCR masking means in which when said special-reproducing means performs the special reproduction of said AV data where the PID of a transport packet containing a PCR is the same as that of a transport packet containing video data, said PCR of said transport packet containing a PCR is masked; and special reproduction PCR generating means of generating a transport packet containing a special reproduction PCR which has the same PID as that of said transport packet containing video data; in the reproduction apparatus according to the twenty-sixth invention of the present invention.

Further, the present invention may be a computer processable medium carrying the program according to the above-mentioned invention.

The present invention may be a program of causing a computer to serve as all or part of:

outputting means of outputting AV data as an MPEG transport stream;

DIT packet inserting means of inserting a transport packet containing a DIT provided with a flag indicating whether the displaying of said AV data is to be muted or not, when said AV data outputted is switched; and object managing means of recording and managing the AV data on an object basis; wherein when said object managing means performs reproduction with switching an object, said DIT packet inserting means sets said flag such that the displaying of said AV data is muted when said object is switched; in the output apparatus according to the thirty-second aspect of the present invention.

Further, the present invention may be a computer processable medium carrying the program according to the above-mentioned invention.

The present invention may be a program of causing a computer to serve as all or part of:

outputting means of outputting a data broadcasting stream as an MPEG transport stream; and DIT packet inserting means of inserting a transport packet containing a DIT provided with a flag indicating whether a browser for the data broadcasting is to be restarted or not, when said data broadcasting stream is switched; in the output apparatus according to the thirty-sixth aspect of the present invention.

Further, the present invention may be a computer processable medium carrying the program according to the above-mentioned invention.

The present invention may be a program of causing a computer to serve as all or part of:

inputting means of inputting the stream data outputted from the output apparatus according to the thirty-sixth aspect of the present invention; and determining means of determining whether said browser for the data broadcasting is to be restarted or not, on the basis of said flag provided in said DIT packet; in the input apparatus according to the thirty-ninth aspect of the present invention.

Further, the present invention may be a computer processable medium carrying the program according to the above-mentioned invention.

BRIEF DESCRIPTION OF DRAWINGS

FIG. 5(a) is a diagram illustrating the operation of searching for the end of reproduction and the beginning of reproduction in case of jumping reproduction according to Embodiment 1 of the invention.

FIG. 5(b) is a diagram showing transport packets outputted during a jumping reproduction according to Embodiment 1 of the invention.

FIG. 6(a) is a diagram showing an example of disk access units in which AV data recorded with a temporary stop during a recording is recorded according to Embodiment 1 of the invention.

FIG. 6(b) is a diagram illustrating the operation of searching for the end of reproduction and the beginning of reproduction during a jumping reproduction according to Embodiment 1 of the invention.

FIG. 6(c) is a diagram showing transport packets outputted during a jumping reproduction according to Embodiment 1 of the invention.

FIG. 8(a) is a diagram illustrating the insertion of a dummy packet during a jumping reproduction according to Embodiment 2 of the invention.

FIG. 8(b) is a diagram showing transport packets outputted during a jumping reproduction according to Embodiment 2 of the invention.

FIG. 9(a) is a diagram illustrating the insertion of a dummy packet during a jumping reproduction according to Embodiment 2 of the invention.

FIG. 9(b) is a diagram showing transport packets outputted during a jumping reproduction according to Embodiment 2 of the invention.

FIG. 11(a) is a diagram showing transport packets to which a time stamp is added during a recording according to Embodiment 6 of the invention.

FIG. 11(b) is a diagram showing the configuration of a disk access unit according to Embodiment 6 of the invention.

FIG. 11(c) is a diagram showing transport packets during a transition from special reproduction to normal reproduction according to Embodiment 6 of the invention.

FIG. 22(a) is a diagram showing the recording scheme of a hard disk drive according to a third prior art.

FIG. 22(b) is a diagram showing the reproduction scheme of a hard disk drive according to a third prior art.

FIG. 23(a) is a diagram showing a transport packet containing a PCR according to a fourth prior art.

FIG. 23(b) is a diagram showing a transport stream for special reproduction according to a fourth prior art.

FIG. 24(a) is a diagram showing an example of an MPEG transport stream during a channel switching according to a fourth prior art.

FIG. 24(b) is a diagram showing an example of an edited MPEG transport stream according to a fourth prior art.

FIG. 24(c) is a diagram showing an example of an edited MPEG transport stream according to a fourth prior art.

FIG. 24(d) is a diagram showing an example of an MPEG transport stream generated by encoding an analogue signal which is received and demodulated by an analogue tuner according to a fourth prior art.

FIG. 27 is a block diagram showing the configuration of an output apparatus and an input apparatus according to Embodiment 10 of the invention.

| | |
|---|---|
| 24 | Difference calculating means |
| 26 | PCR packet generating means |
| 101 | Byte counter |
| 201 | HDD recorder |
| 202 | STB |
| 203 | Television receiver |
| 204 | Power supply |
| 205 | AV hard disk |
| 207 | AV processing section |
| 208 | Hard disk section |
| 209 | HDD I/F |
| 210 | 1394PHY/LINK |
| 211 | AV transfer control block |
| 212 | Buffer memory |
| 213 | HDD controller |
| 214 | Actuator |
| 215 | Magnetic disk medium |
| 216 | Time stamp adding means |
| 217 | Picture position information and size information extraction |
| 222 | Normal/special reproduction switching means |
| 223 | Time stamp reproducing means |
| 224 | Frame send-out managing means |
| 225 | PID-filter means |
| 226 | PAT/PMT/SIT-adding/PCR-adding means |
| 227 | Buffer controlling means |
| 228 | HDD controlling means |
| 250 | STB |
| 251 | Tuner section |
| 252 | Transport decoder |
| 253 | I/F control block |
| 254 | MPEG decoder |
| 1035 | Reproduction apparatus |
| 1036 | Disk medium |
| 1037 | I frame cutting-out |
| 1038 | PID filter |
| 1039 | PCR masking |
| 1040 | Transport stream restoration |
| 1050 | Output apparatus |
| 1051 | DIT packet inserting means |
| 1052 | Outputting means |
| 1053 | Input apparatus |
| 1054 | Determining means |
| 1055 | Inputting means |
| 1056 | Displaying means |
| 1057 | Joint portion detecting means |
| 1058 | Joint portion managing means |
| 1059 | Object managing means |
| 1060 | Output apparatus |
| 1061 | Output apparatus |
| 1062 | Switch |
| 1063 | MPEG encoder section |
| 1064 | Analogue tuner section |
| 1065 | Digital tuner section |
| 1066 | Antenna |

BEST MODE FOR CARRYING OUT THE INVENTION

The embodiments of the invention are described below with reference to the drawings.

The embodiments of group A are described first, and then the embodiments of group B are described.

EMBODIMENT 1

Embodiment 1 is described first.

In Embodiment 1, described is an HDD recorder capable of performing jumping reproduction.

Figure 1:
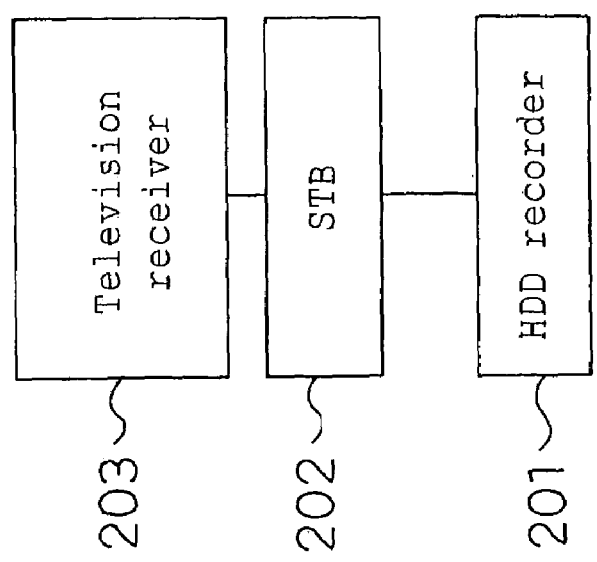
FIG. 1 is a diagram showing the overall configuration of a system according to Embodiments 1-3 of the invention.

FIG. 1 shows an exemplary configuration of a system according to the present embodiment. That is, the system according to the present embodiment comprises a HDD 2, an STB 202, and a television receiver 203.

The HDD recorder 201 and the STB 202 are interconnected through an IEEE1394 bus. The STB 202 and the television receiver 203 are interconnected through a D terminal.

Figure 2:
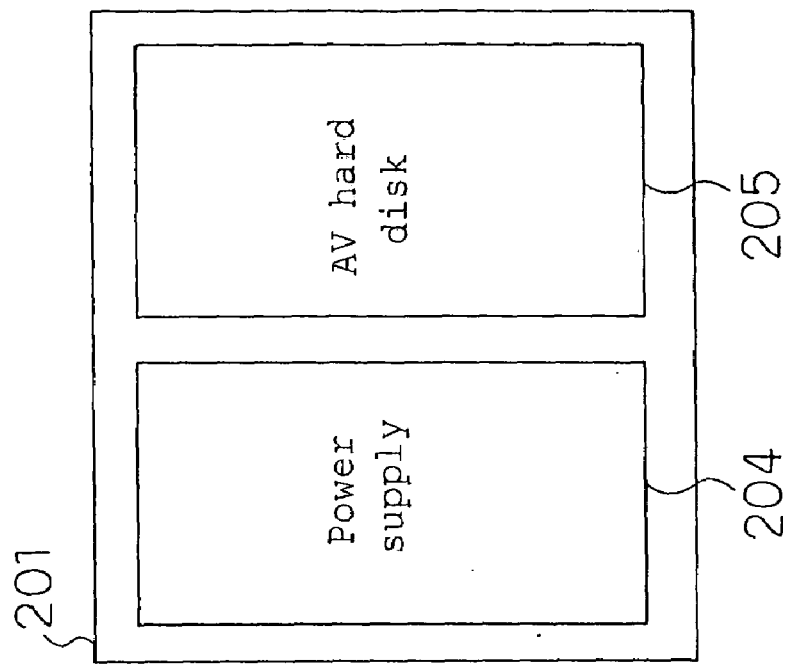
FIG. 2 is a diagram showing the configuration of an HDD recorder according to Embodiments 1-3 of the invention.

FIG. 2 shows the configuration of the HDD recorder 201. The HDD recorder 201 comprises a power supply 204 and an AV hard disk 205.

The power supply 204 is means of supplying electric power to the AV hard disk 205. The AV hard disk 205 is a hard disk which operates with receiving the electric power from the power supply 204 and which thereby records and reproduces AV data.

Figure 3:
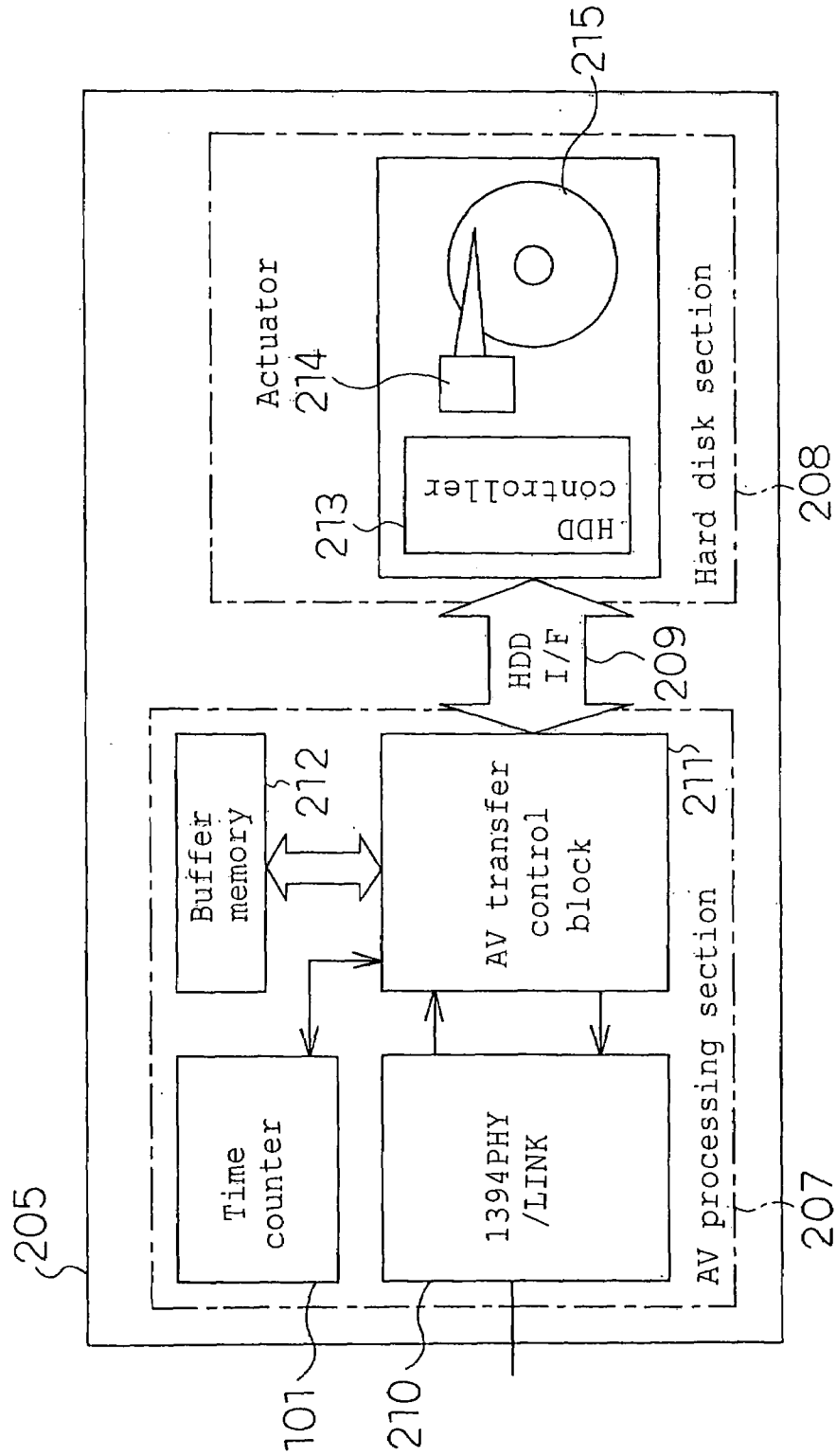
FIG. 3 is a diagram showing the configuration of an AV hard disk according to Embodiments 1-3 of the invention.

FIG. 3 shows the configuration of the AV hard disk 205.

The AV hard disk 205 comprises an AV processing section 207, an HDD I/F 209, a hard disk section 208, and a byte counter 101.

The AV processing section 207 controls the hard disk section 208 such as to record inputted AV data and which, in reproduction, outputs AV data read from the hard disk section 208 with restoring the time interval of the transport packets.

The HDD I/F 209 is an interface of relaying: control commands with which the AV processing section 207 controls the hard disk section 208; and AV data. More specifically, the HDD I/F 209 is a SCSI interface in accordance with SCSI standard or an IDE interface in accordance with IDE standard.

The hard disk section 208, in response to the control from the AV processing section 207, in recording, writes AV data into a magnetic disk medium 215 and which, in reproduction, reads the AV data recorded in the magnetic disk medium 215.

The AV processing section 207 comprises a byte counter 101, a 1394PHY/LINK 210, an AV transfer control block 211, and a buffer memory 212.

The byte counter 101 is a counter of performing the byte counting of the position of AV data outputted as an MPEG transport stream by the AV transfer control block 211.

The 1394PHY/LINK 210 is an IEEE1394 interface of exchanging AV data and commands with the STB 202 shown in FIG. 1.

The buffer memory 212 is a memory which, in recording, stores temporarily AV data transmitted from the 1394PHY/LINK 210 and which, in reproduction, stores temporarily AV data read and transmitted from the hard disk section 208.

The AV transfer control block 211, in recording, adds a recording time stamp to transport packets constituting the AV data, generates special reproduction data and the like, thereby converts the data into a format for recording, and then transfers the data to the hard disk section 208 and which, in reproduction, performs the format conversion of the AV data read from the hard disk section 208, thereby restores the data into an MPEG transport stream, restores the time interval of the transport packets, and then outputs the data to the 1394PHY/LINK 210.

The hard disk section 208 comprises an HDD controller 213, an actuator 214, and a magnetic disk medium 215.

The HDD controller 213 is means of controlling the actuator 214 and thereby recording or reproducing data into or from the magnetic disk medium 215.

The actuator 214 comprises a magnetic head at the tip thereof. In response to the control by the HDD controller 213, positioned at an arbitrary position in the radial direction of the magnetic disk medium 215 and further which, in recording, records a recording signal into the magnetic disk medium 215 and, in reproduction, reproduces the signal recorded in the magnetic disk medium 215.

The magnetic disk medium 215 is the magnetic disk medium of recording AV data.

Figure 4:
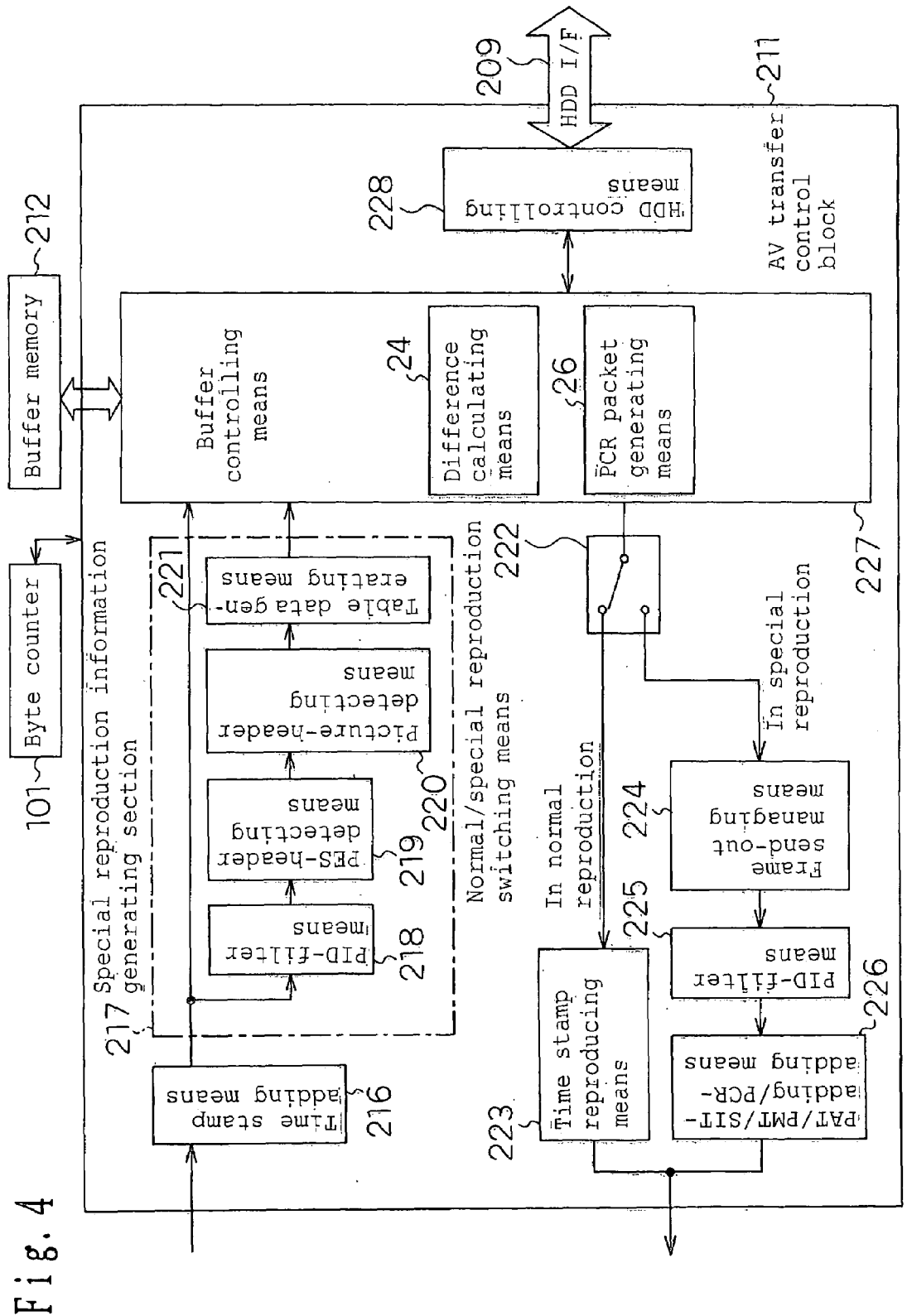
FIG. 4 is a diagram showing the configuration of an AV transfer control block according to Embodiments 1-3 of the invention.

FIG. 4 shows the configuration of the AV transfer control block 211.

The AV transfer control block 211 comprises time stamp adding means 216, a special reproduction information generating section 217, normal reproduction/special reproduction switching means 222, time stamp reproducing means 223, frame send-out managing means 224, PID-filter means 225, PAT/PMT/SIT-adding/PCR-adding means 226, buffer controlling means 227, and HDD controlling means 228.

The time stamp adding means 216 receives a transport packet of the MPEG transport stream outputted from the 1394PHY/LINK 210 and adds a recording time stamp to the inputted transport packet in the timing of the reception.

The special reproduction information generating section 217 extracting information regarding the type, the beginning position, and the size of each frame constituting the MPEG transport stream, and thereby generating special reproduction table data from the extracted information. The special reproduction table data describes the type, the beginning record position, the size, and the like of each frame, and is used, for example, in order to identify a frame used in special reproduction and the record position of the frame.

The special reproduction information generating section 217 is described in detail in Embodiment 6.

The normal reproduction/special reproduction switching means 222 is used when a user of the HDD recorder 201 issues an instruction by pressing a button of a remote controller or an operation panel or the like of the STB, in response to this instruction, switches whether special reproduction is to be performed or normal reproduction is to be performed.

The time stamp reproducing means 223, in normal reproduction, compares the value of a counter (not shown) provided in the AV transfer control block and performs the count in the frequency of 27 MHz with the value of a time stamp added to each transport packet during the recording, and which thereby removes the time stamp and then outputs the transport packet in the timing indicated by the time stamp.

The buffer controlling means 227 manages the input and output of the AV data stored in the buffer memory 212.

The HDD controlling means 228 controls the hard disk section 208 via the HDD I/F 209.

Difference calculating means 24, PCR packet generating means 26, the frame send-out managing means 224, the PID-filter means 225, and the PAT/PMT/SIT-adding/PCR-adding means 226 are described in Embodiment 6.

Described next is the operation according to the present embodiment.

Jumping reproduction according to the present embodiment indicates that the reproduction is performed with skipping a predetermined portion of AV data. That is, as described above in the prior art, jumping reproduction includes the case (1) that the reproduction is performed with skipping a predetermined portion of AV data (2) that the reproduction is performed intact on AV data which has been recorded with skipping a predetermined portion during the recording.

The hard disk section 208 and the AV transfer control block 211 according to the present embodiment are an example of reading means according to the invention. The byte counter 101 and the AV transfer control block 211 according to the present embodiment are an example of controlling means according to the invention. The MPEG transport stream according to the present embodiment is an example of a compression encoded stream processed by inter-frame compression and intra-frame compression according to the invention. The transport packet according to the present embodiment is an example of a packet of a compression encoded stream according to the invention.

Described next is the operation of this HDD recorder 201.

There will be first described the operation of the jumping reproduction in which the reproduction is performed with skipping a predetermined portion of AV data.

At the start of reproduction, a microprocessor (not shown) built in the AV transfer control block 211 notifies the start of reproduction to the byte counter 101. On receiving the notice of the start of normal reproduction, the normal reproduction/special reproduction switching means 222 switches the circuit such that the AV data outputted from the buffer controlling means 227 is inputted to the time stamp reproducing means 223.

On receiving the notice of the start of reproduction from the microprocessor of the AV transfer control block 211, the byte counter 101 counts the reproduction position information of the AV data as the byte count from the beginning.

The buffer controlling means 227 requests the HDD controlling means 228 to transfer the AV data.

In response to this, the HDD controlling means 228 issues a read command specifying a start LBA (logical block address) for reading and a read size, to the HDD controller 213 of the hard disk section 208 via the HDD I/F 209. The HDD controlling means 228 issues this read command such that the AV data is read on a disk access unit basis which is a minimum unit for the continuous transfer of the AV data.

On the other hand, the HDD controller 213 controls the positioning of the actuator 214.

On receiving the read command from the HDD controlling means 228, AV data of the specified size is read from the location corresponding to the specified LBA in the magnetic disk medium 215.

On receiving the AV data read from the HDD 2, the HDD controlling means 228 outputs the data to the buffer controlling means 227.

On receiving the AV data outputted from the HDD controlling means 228, the buffer controlling means 227 stores the data into the buffer memory 212.

Then, in response to the request from the time stamp reproducing means 223, the buffer controlling means 227 outputs the AV data stored in the buffer memory 212 to the time stamp reproducing means 223.

On receiving the AV data outputted from the buffer controlling means 227, the time stamp reproducing means 223 outputs sequentially the transport packets to the 1394PHY/LINK 210 in the timing indicated by the value of the time stamp added to each transport packet with referring to a counter which counts at an oscillation frequency of 27 MHz. At this time of outputting the transport packet, the time stamp reproducing means 223 removes the time stamp, and thereby outputs the transport packet solely.

The 1394PHY/LINK 210 outputs the MPEG transport stream outputted from the time stamp reproducing means 223, to the IEEE1394 bus in the form of isochronous packets.

The STB 202 receives the isochronous packets outputted from the HDD recorder 201, thereby decodes and converts the packets into an audio visual signal, and then outputs the signal through the D terminal to the television receiver 203.

On receiving the audio visual signal outputted from the STB via the D terminal, the television receiver 203 displays the video on a monitor, and outputs the audio through a speaker.

As such, the HDD recorder 201 reproduces the AV data.

On the other hand, the byte counter 101 receives the present reproduction position from the AV transfer control block 211, and thereby counts the byte count counted from the record beginning position.

The present value of the byte counter 101 is assumed to be m bytes (m is a positive integer). That is, the AV data in the amount of m bytes has been reproduced already since the start of the reproduction of the AV data.

At that time, it is assumed that the HDD recorder 201 receives a jumping reproduction instruction, and thereby that the count value of the byte counter 101 is changed from m to n. Then, the byte counter 101 notifies that the count value has been changed from m to n, to the AV transfer control block.

On receiving the jumping reproduction instruction, the buffer controlling means 227 of the AV transfer control block 211 performs search based on the counter value notified from the byte counter 101, and thereby identifies the reproduction interruption position and the reproduction restart position.

That is, first, using the special reproduction table which has been stored together with the AV data during the recording in the magnetic disk medium 215, searched for is a position of the buffer memory 212 which covers the last transport packet among those constituting the frame which is being outputted to the time stamp reproducing means 223 at the time of receiving the jumping reproduction instruction. This position is set to be the reproduction interruption position.

That is, searched for is the position of the beginning packet of a picture frame located next to the presently outputted picture frame, whereby the packets before that position are outputted, and then the position is set to be the reproduction interruption position.

Here, in order that the reproduction position does not exceed the search position during the search process, a picture frame which is a few frames ahead of the presently outputted picture frame may be searched.

Then, the buffer controlling means 227 searches for the beginning position of the first frame of the video data where the reproduction is to be restarted after the jumping, which corresponds to the count value after the change of the byte counter 101. This beginning position of the first frame is defined as the beginning position of the beginning transport packet of the first I frame among the frames following the jumped and skipped portion.

To do this, first, the buffer controlling means 227 instructs the HDD controlling means 228 to acquire the number of the disk access unit corresponding to the count value after the change. Next, the buffer controlling means reads solely the special reproduction table corresponding to the disk access unit from the magnetic disk medium 215. Then, using the read-out special reproduction table, the buffer controlling means searches for the first I frame appearing after the position corresponding to the count value after the change.

That is, when no I frame is present in the disk access unit, the next I frame is searched. As such, the search is continued until a disk access unit containing the next I frame is found. When a disk access unit containing an I frame is found, the beginning position of the I frame is searched for. Then, the entirety of the disk access unit is read from the magnetic disk medium 215 into the buffer controlling means 227.

As such, the beginning position of the I frame to be reproduced is used as the reproduction start position, whereby the buffer controlling means 227 reproduces the data starting from the disk access unit containing the I frame.

Before the jumping, at each time of receiving a request from the time stamp reproducing means 223, the buffer controlling means 227 outputs sequentially the transport packets up to the final record position of the buffer memory 212, to the time stamp reproducing means 223.

When the transport packets stored in the buffer memory 212 are outputted to the time stamp reproducing means 223, and thereby when the blank area of the buffer memory 212 increases, the buffer controlling means 227 controls the HDD controlling means 228 to read the disk access unit at the above-mentioned reproduction restart position and to store the data into the buffer memory 212.

With receiving further requests from the time stamp reproducing means 223, when the buffer controlling means 227 has completed the output of the transport packets up to the final record position of the buffer memory 212, the buffer controlling means then outputs the AV data stored in the buffer memory 212 starting from the transport packet corresponding to the reproduction restart position, to the time stamp reproducing means 223.

The time stamp reproducing means 223 outputs sequentially the transport packets outputted as described above from the buffer controlling means 227, to the 1394PHY/LINK 210.

The 1394PHY/LINK 210 generates isochronous packets from the transport packets outputted from the time stamp reproducing means 223, and then outputs the packets to the IEEE1394 bus.

As described above, on receiving a jumping reproduction instruction, the HDD recorder 201 outputs the transport packets up to the last one among those constituting the presently outputted frame, and after the jumping, outputs the transport packets starting from the beginning one of the first-appearing I frame among the frames after the jumping.

FIG. 5(a) shows transport packets of a MPEG transport stream during a jumping reproduction.

A, B, X, Y, and the like in FIG. 5(a) indicate transport packets.

A jump 5 indicates that in the jumping reproduction, the buffer controlling means 227 outputs the transport packets to the time stamp reproducing means 223 with skipping this portion. That is, as indicated by the jump 5, the buffer controlling means 227 skips the AV data from the point where A, B, and C have been outputted, that is, from the end 6 of reproduction. At that time, by virtue of the above-mentioned operation, the end 6 of reproduction is necessarily the position of outputting the last transport packet among those constituting the frame which is presently outputted at the time of receiving the jumping reproduction instruction. Then, after the transport packet C, the transport packets X, Y, and Z in this order are outputted to the time stamp reproducing means 223 as indicated by the beginning 7 of the next reproduction. At that time, by virtue of the above-mentioned operation, the beginning 7 of the next reproduction is necessarily the beginning transport packet of the first-appearing I frame in the AV data reproduced after the jumping.

FIG. 5(b) shows a MPEG transport stream outputted from the time stamp reproducing means 223 as a result of the jumping reproduction.

That is, the time stamp reproducing means 223 outputs the transport packets in the order of A, B, C, X, Y, and Z.

As such, in the jumping reproduction, the AV transfer control block 211 outputs the transport packets up to the last one among those constituting a frame, before skipping the portion indicated by the jump 5, and then after skipping the portion indicated by the jump 5, outputs the transport packets starting from the beginning one of the next I frame.

As such, in jumping reproduction, the HDD recorder 201 according to the present embodiment outputs AV data up to the boundary of a frame, and then outputs the AV data starting from the beginning of an I frame. This suppresses the occurrence of noise in the joint portion, as shown in FIG. 5(b).

The above-mentioned description has been made for the case of a jumping reproduction in which the reproduction is performed with skipping a predetermined portion of AV data. Described below next is the case that the recording is performed with skipping a predetermined portion during the recording into the magnetic disk medium 215 and that the recorded AV data is then reproduced intact.

Among the disk access units in the magnetic disk medium 215, FIG. 6(a) shows: a DAU 230 which is a disk access unit containing the AV data at the time of the temporary stop of recording and which hence has a temporary recording stop point; and a DAU 231 which is a disk access unit containing the AV data at the time of the restart of recording and which hence has a recording restart point.

In the DAU 230 having the temporary recording stop point, the packets up to the last packet 233 are written in. The last packet 232 of the preceding frame is the last transport packet which is contained in the frame preceding the frame containing the last packet 233.

The DAU 231 having the recording restart point records the packets starting from the beginning packet 234 which is recorded at first after the restart of recording. The beginning packet 240 of an I frame is the beginning transport packet among those constituting the I frame appearing at first after the restart of recording.

When the HDD recorder 201 reproduces the AV data recorded as shown in FIG. 6(a), first, the buffer controlling means 227 requests the HDD controlling means 228 to read the AV data. The HDD controlling means 228 controls the hard disk section 208 such as to read the AV data from the magnetic disk medium 215 on a disk access unit basis which is defined in the magnetic disk medium 215.

The HDD controlling means 228 performs the control such as to read sequentially starting from the beginning disk access unit recording the AV data, and then transfers the AV data of the read-out disk access unit, to the buffer controlling means 227.

The buffer controlling means 227 successively stores the AV data in the size of the disk access unit transferred from the HDD controlling means 228, into the buffer memory 212.

FIG. 6(b) shows the state that the DAU 230 having the temporary recording stop point is read, and that the DAU 231 having the recording restart point is then read, and further that these are stored in the buffer memory 212.

That is, a buffer memory S1 (235) portion of the buffer memory 212 stores the AV data recorded in the DAU 230 having the temporary recording stop point, while a buffer memory S2 (236) portion stores the AV data recorded in the DAU 231 having the recording restart point.

When storing the DAU 230 having the temporary recording stop point into the buffer memory 212, the buffer controlling means 227 searches for and identifies the position of the last packet 232 of the preceding frame, using the special reproduction table similarly to the above-mentioned case. This searches the special reproduction table in the direction ascending from the last packet 233, and thereby finds the beginning packet of the last picture frame in the DAU 230. Then, found is the packet preceding it, that is, the last packet 232 of the frame.

That is, searched for is the record position of the frame preceding the last frame which was being recorded at the temporary stop of the recording. Then, identified is the position indicated by the end 237 of reproduction in the buffer memory 212.

Further, when storing the AV data recorded in the DAU 231 having the recording restart point into the buffer memory 212, the buffer controlling means 227 searches for the beginning packet 240 of the I frame, using the special reproduction table similarly to the above-mentioned case. That is, identified is the record position in the buffer memory 212 of the beginning transport packet of the I frame appearing at first after the restart of recording. As such, the beginning 238 of the next reproduction is identified.

On the other hand, in response to the request from the time stamp reproducing means 223, the buffer controlling means 227 reads sequentially the transport packet from the buffer memory 212, and then outputs the packets to the time stamp reproducing means 223.

When outputting the AV data stored in the buffer memory S1 (235), the buffer controlling means 227 outputs the transport packets up to the end 237 of reproduction, and then outputs the transport packets starting from the beginning 238 of reproduction to the time stamp reproducing means 223.

Thus, the transport packets outputted from the time stamp reproducing means 223 are as shown in FIG. 6(c). That is, the time stamp reproducing means 223 outputs the last transport packet C of the frame containing the last packet 233 located at the temporary recording stop point, and then outputs the beginning transport packet X of the I frame appearing at first after the restart of recording.

As described above, in both cases of jumping reproduction, the HDD recorder 201 according to the present embodiment outputs AV data up to the boundary of a frame, and then outputs the AV data starting from the beginning of an I frame. This suppresses the occurrence of noise in the joint portion.

In the present embodiment, the HDD I/F 209 is an interface of relaying: control commands with which the AV processing section 207 controls the hard disk section 208; and AV data. More specifically, it has been assumed that the HDD I/F 209 is a SCSI interface in accordance with SCSI standard or an IDE interface in accordance with IDE standard. However, an interface in accordance with another standard may be used. In other words, it is sufficient that the HDD I/F 209 is any interface of relaying: control commands with which the AV processing section 207 controls the hard disk section 208; and AV data.

EMBODIMENT 2

Embodiment 2 is described next.

In the present embodiment, similarly to Embodiment 1, described is an HDD recorder capable of performing jumping reproduction.

Similarly to Embodiment 1, FIG. 1 shows the configuration of the system. FIG. 2 shows the configuration of an HDD recorder 201. FIG. 3 shows the configuration of an AV hard disk 205. FIG. 4 shows the configuration of an AV transfer control block 211. These are the same as these of Embodiment 1.

Described next is the operation in the present embodiment.

In jumping reproduction in Embodiment 1, as shown in FIG. 5, the end 6 of reproduction has been defined as the time of outputting the last transport packet among those constituting a frame, while the beginning 7 of the next reproduction has been defined as the time of outputting the beginning transport packet of the I frame appearing at first.

FIG. 7 shows an example of transport packets of an MPEG transport stream slightly different from these of FIG. 5(a).

Described below first is that the MPEG transport stream of FIG. 7 causes a problem. After that, described is the HDD recorder according to the present embodiment which resolves the problem.

Figure 7A:
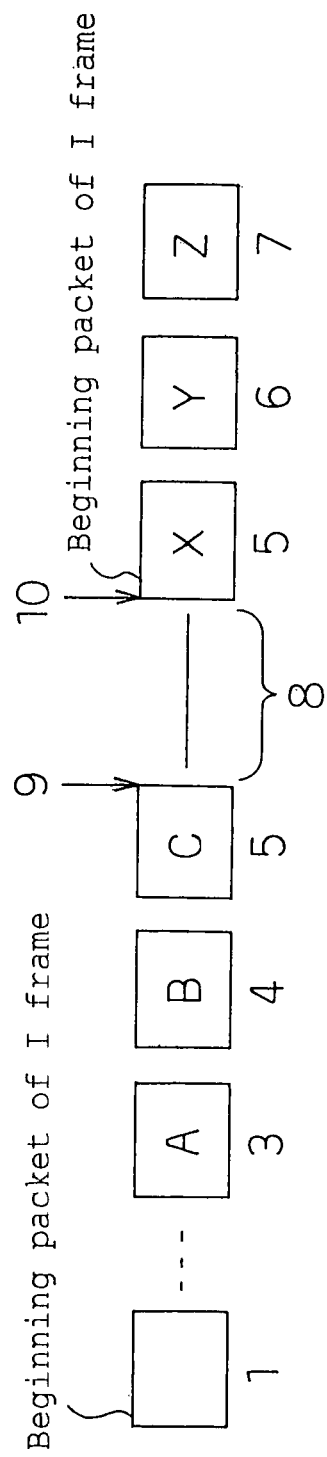
FIG. 7(a) is a diagram illustrating a problem in jumping reproduction according to Embodiment 1 of the invention.

In the MPEG transport stream shown in FIG. 7(a), similarly to Embodiment 1, the end 9 of reproduction is the last transport packet among those constituting the frame which is being outputted from the time stamp reproducing means 223 at the time of receiving a jumping reproduction instruction. The beginning 10 of the next reproduction is the position of the beginning transport packet of the first-appearing I frame among the frames after the jumping.

The number shown under each of the transport packets A, B, C, . . . indicates the value of a continuity counter of each transport packet.

The continuity counter indicates the 4-bit value described in the last 4 bits of the header of each transport packet.

In an MPEG transport stream, in order that an important transport packet is prevented from dropping during the transmission, the transport packet can be inserted twice in a successive manner.

Such duplicated transport packets have the same value in the continuity counters. Thus, when transport packets have the same value in the continuity counters, they are identical transport packets.

Thus, when transport packets having the same value in the continuity counters are received, before the decoding, the STB 202 or the like removes the latter one so as to eliminate the duplication.

In FIG. 3, the value of the continuity counter of the C is 5, while the value of the continuity counter of the X is also 5.

In this case, when jumping reproduction is performed in a manner similar to Embodiment 1, since the value of the continuity counter is the same in the C and the X, the C and the X are determined as identical transport packets during the decoding, whereby the X is removed.

Figure 7B:
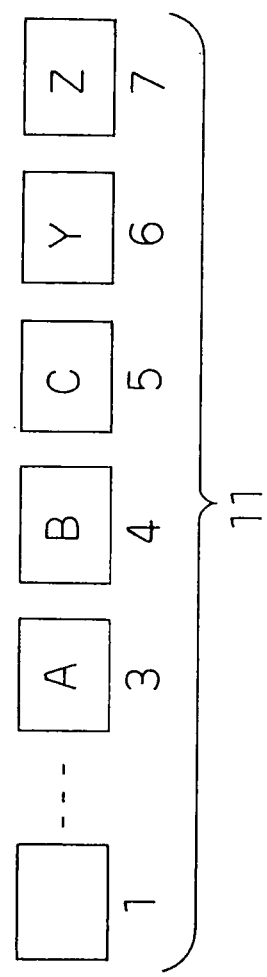
FIG. 7(b) is a diagram illustrating a problem in jumping reproduction according to Embodiment 1 of the invention.

Nevertheless, the X is the beginning transport packet of the I frame, and hence contains data such as a sequence header and a GOP header which is important in the expansion process of the MPEG. Thus, when the X is removed, the sequence header and the GOP header are lost. As a result, as shown in FIG. 7(b), transport packets intrinsically belonging to distinct GOPs are joined into a single GOP as indicated by a 1GOP 11. This causes noise in jumping reproduction.

In the present embodiment, the problem is resolved in a manner shown in FIG. 8.

That is, as shown in FIG. 8(a), the end 9 of reproduction is the last transport packet among those constituting the frame which is being outputted from the AV transfer control block 211 at the time of receiving a jumping reproduction instruction similar to Embodiment 1.

The beginning 10 of the next reproduction is, similarly to Embodiment 1, the beginning transport packet of the first-appearing I frame in the AV data after the jumping.

Further, in the present embodiment, the buffer controlling means 227 inserts a dummy transport packet having invalid data, before the X. At that time, the value of the continuity counter of the dummy transport packet is set smaller than the value of the X by unity.

As a result, the time stamp reproducing means 223 outputs an MPEG transport stream shown in FIG. 8(b). That is, the time stamp reproducing means outputs a transport stream composed of a 1GOP 15 and a 1GOP 16.

The dummy transport packet and the X have different values in the continuity counters. This avoids the removal of the X before the decoding. As such, since the X is not removed, avoided is the loss of the sequence header. Further, since the inserted dummy transport packet has invalid data, the decoding process is not affected. This avoids the occurrence of a problem, for example, that the two GOPs are joined. Thus, in jumping reproduction, even a noise which has been impossible to be suppressed in Embodiment 1 can be suppressed.

FIG. 9 shows an MPEG transport stream slightly different from that of FIG. 8. The difference of the transport stream of FIG. 9(a) from the transport stream of FIG. 8(a) is that the values of the continuity counters of the C and the X are not the same but successive values.

Even in this case, a dummy transport packet is inserted similarly to the above-mentioned case. That is, the value of the continuity counter of the dummy transport packet is set to be a value smaller than the value of the continuity counter of the X by unity.

In this case, the value of the continuity counter of the dummy transport packet is the same as the value of the continuity counter of the C. Accordingly, as shown in FIG. 9(b), the dummy transport packet is removed before the decoding. However, the X containing the sequence header is not removed. This avoids the occurrence of the situation that the two GOPs are joined as in Embodiment 1.

As such, even in the case of FIG. 9 that the values of the continuity counters are successive in the transport packet outputted at the end 9 of reproduction and in the transport packet outputted at first at the beginning 10 of the next reproduction, no problem is caused by the insertion of the dummy packet.

Described below last is a detailed example of the dummy transport packet described above.

Figure 10C:
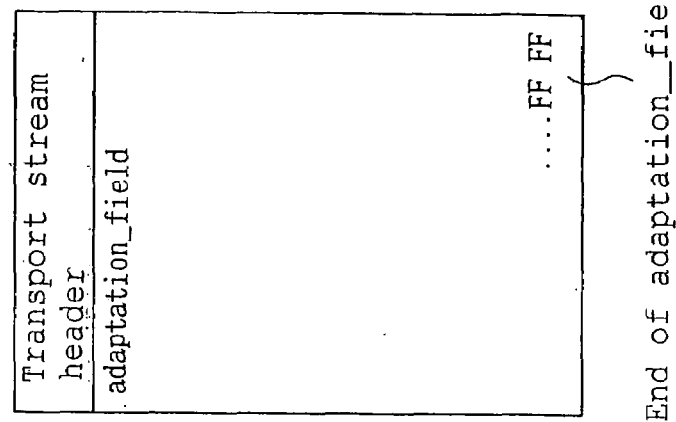
FIG. 10(c) is a diagram showing another exemplary configuration of a dummy packet according to Embodiment 2 of the invention.
Figure 10B:
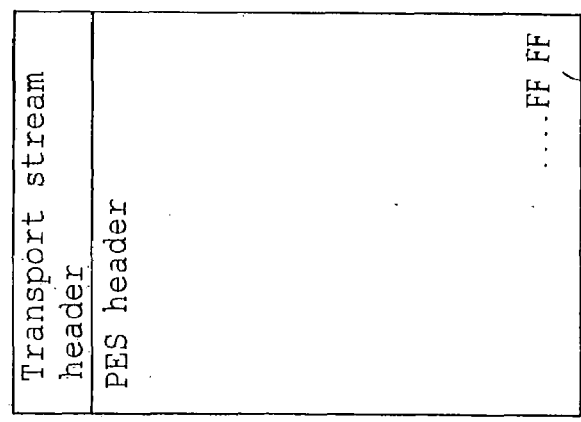
FIG. 10(b) is a diagram showing another exemplary configuration of a dummy packet according to Embodiment 2 of the invention.
Figure 10A:
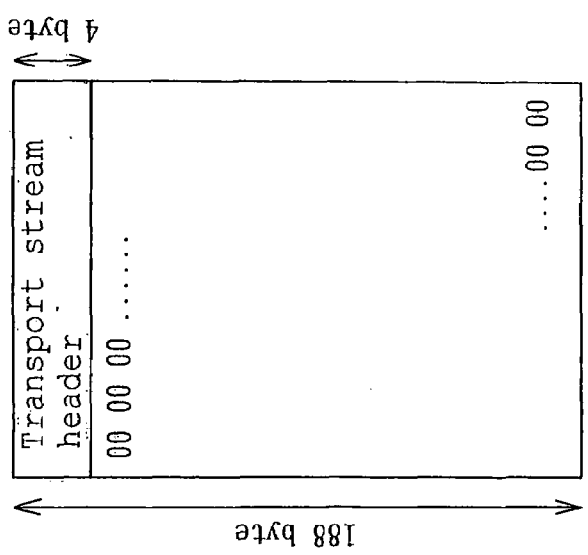
FIG. 10(a) is a diagram showing an exemplary configuration of a dummy packet according to Embodiment 2 of the invention.

FIG. 10(a) shows an example of a dummy transport packet. In this dummy transport packet, its payload is filled with zero which is the padding value of an elementary stream.

FIG. 10(b) shows another example of a dummy transport packet. In this dummy transport packet, a PES header is embedded in the payload section. In order that the size of the embedded PES header becomes 184 bytes, a PES_header_data_length is set to be 175, while all flags of the PES header section are set to be zero, and while the padding value to the rest of the PES header is set to be FF.

FIG. 10(c) shows another example of a dummy transport packet. In this dummy transport packet, an adaptation_field is provided in the header of the transport packet. In order that the size of the adaptation_field becomes 184 bytes, an adaptation_field_length is set to be 183. Further, all flags of the adaptation_field are set to be zero. As an exception, a discontinuity_indicator flag may be set to be unity. The padding value to the rest of the adaptation_field is set to be FF.

Here, the dummy transport packet may be a combination of the packets of FIGS. 10(a), 10(b), and 10(c). For example, the dummy transport packet may be a packet which has an adaptation field and a PES header, and the last portion of which is filled with zero which is the padding value of an elementary stream. Obviously, the packet may be a combination of any two from (a), (b), and (c), such as a combination of (a) and (b).

The present embodiment has been described for the case of jumping reproduction that the reproduction is performed with skipping a predetermined portion and that a dummy transport packet is inserted. However, the invention is not limited to this. Even in the case of jumping reproduction that the reproduction is performed on AV data having been recorded with skipping a predetermined portion, effects similar to those of the above-mentioned case are obtained by inserting a dummy transport packet similarly.

The present embodiment has been described for the case that the value of the continuity counter of the dummy transport packet is a value smaller by unity than the value of the continuity counter of the beginning transport packet X of the first-appearing I frame. However, the invention is not limited to this. The value of the continuity counter of the dummy transport packet may be any value as long as it is different from the value of the continuity counter of the beginning transport packet X of the first-appearing I frame.

In Embodiment 2, the continuity counters of adjacent frames have been overlapped using a dummy transport packet. However, the continuity counter of the beginning packet of an I frame may be set to be a value different from the value of the continuity counter of the preceding frame. Further, in such a manner that the continuity counters following the I frame become successive, the values of the subsequent continuity counters may be changed during the reproduction.

The compression encoded stream processed by inter-frame compression and intra-frame compression according to the invention is not limited to the MPEG transport stream according to the present embodiment, and may be an MPEG transport stream, a DV-formatted stream, and the like, as long as a part of video data frames are processed by intra-frame compression while the other video data frames are processed by inter-frame compression and while the stream is a transmitted encoded stream.

The packet in the compression encoded stream according to the invention is not limited to the transport packet according to the present embodiment, and may be a DSS packet, a PES (packetized elementary stream), and the like in case that the compression encoded stream is an MPEG transport stream. In other words, it is sufficient that the packet is one used when the compression encoded stream processed by inter-frame compression and intra-frame compression according to the invention is transmitted on a packet basis.

EMBODIMENT 3

Embodiment 3 is described next.

In the present embodiment, described are a reproduction apparatus and an STB capable of performing jumping reproduction with suppressed noise.

Figure 12:
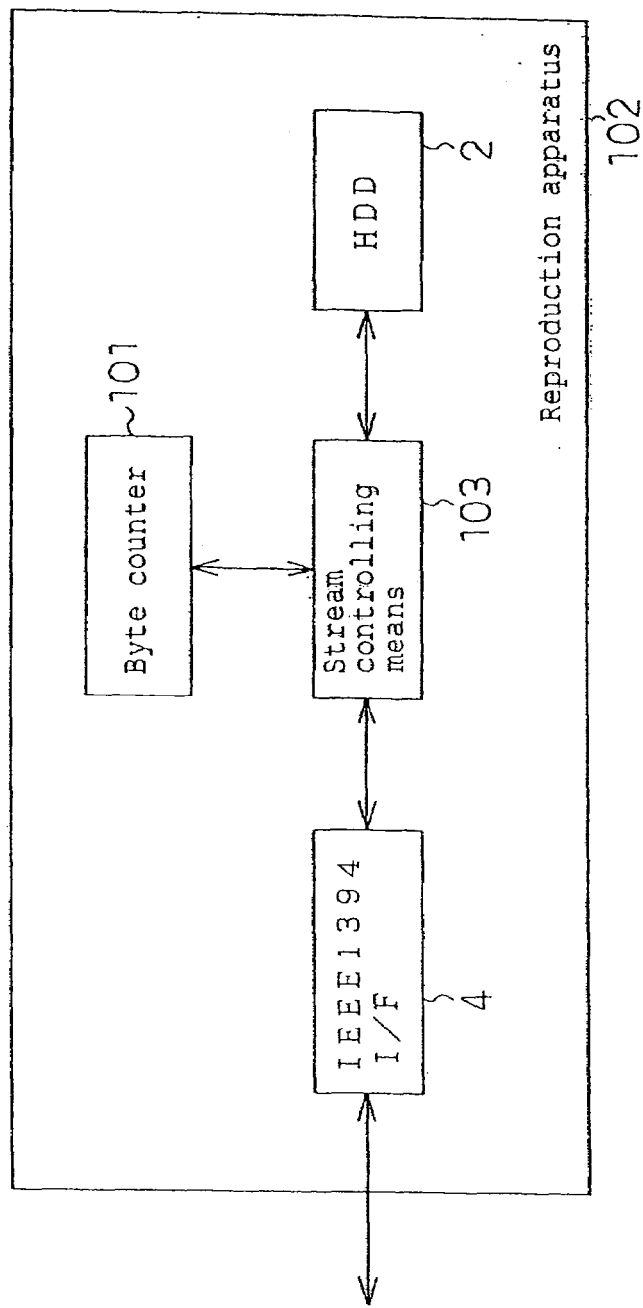
FIG. 12 is a block diagram showing the configuration of a reproduction apparatus according to a first prior art.

FIG. 12 shows a reproduction apparatus 102 according to the present embodiment. The reproduction apparatus 102 is the same as that described in the prior art. Thus, in the reproduction apparatus 102, the last packet outputted before the jumping is not necessarily the last packet among those constituting a frame, while the first packet outputted after the jumping is not necessarily the beginning packet of an I frame.

Figure 14:
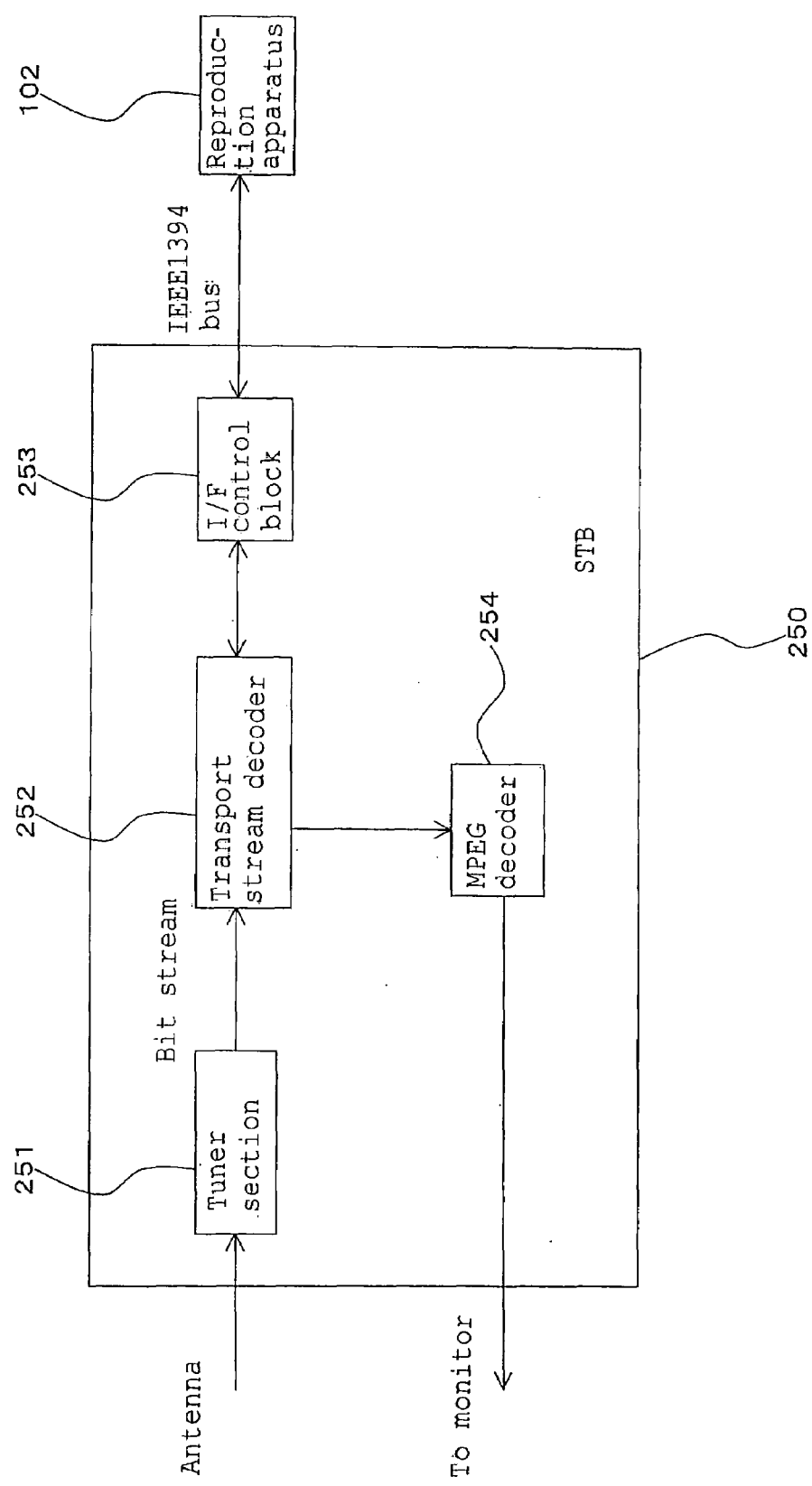
FIG. 14 is a diagram showing the configuration of an STB according to Embodiments 3-5 of the invention.

FIG. 14 shows an STB 250 according to the present embodiment.

The reproduction apparatus 102 and the STB 250 are interconnected through an IEEE1394 bus.

The STB 250 comprises a tuner section 251, a transport stream decoder 252, an I/F control block 253, and an MPEG decoder 254.

The tuner section 251 is means of converting a broadcasting wave received through an antenna into a digital bit stream or MPEG transport stream.

The transport stream decoder 252 is means of converting the MPEG transport stream outputted from the tuner section 251, into a PES (packetized elementary stream). The transport stream decoder is means provided also with the function of outputting the MPEG transport stream outputted from the tuner section 251, to the I/F control block 253. Further, the transport stream decoder is also means of converting an MPEG transport stream received from I/F control block 253, into a PES (packetized elementary stream).

The I/F control block 253 is means of partializing the MPEG transport stream outputted from the transport stream decoder 252, and then outputting the data to an IEEE1394 interface port.

The partialization indicates that the packets relevant to desired contents (a program) are solely filtered from a multiplexed MPEG transport stream, that the packets having PSI information are rewritten with PSI information corresponding to the filtered MPEG transport stream, and that the data is outputted. The PSI information indicates PAT/PMS/SIT and the like.

The I/F control block 253 is also means of outputting the MPEG transport stream received from the IEEE1394 interface port, to the transport stream decoder 252.

The MPEG decoder 254 is means of converting a PES into an ES (elementary stream), then decoding the ES thereby to expand the compressed MPEG data, then converting the expanded video and audio data into an analogue signal, and then outputting the signal to a monitor (not shown).

The monitor (not shown) is means of displaying the video and outputting the audio.

The reproduction apparatus 102 and the STB 250 according to the present embodiment are an example of a reproduction system according to the invention. The STB 250 according to the present embodiment is an example of a decoding apparatus according to the invention. The HDD 2, the stream controlling means 103, and the byte counter 101 according to the present embodiment are an example of reading means according to the invention. The MPEG decoder 254 according to the present embodiment is an example of decoding means according to the invention. Further, the MPEG decoder 254 according to the present embodiment is an example of controlling means according to the invention.

Described next is the operation according to the present embodiment.

At the start of reproduction, the stream controlling means 103 of the reproduction apparatus 102 notifies the start of reproduction to the byte counter 101.

On receiving the notice of the start of reproduction from the stream controlling means 103, the byte counter 101 counts reproduction position information as the number of bytes counted from the beginning.

On receiving a reproduction command from the stream controlling means 103, the HDD 2 reads AV data from a location of the hard disk medium corresponding to an LBA specified by the stream controlling means 103, and thereby outputs the data to the stream controlling means 103.

On receiving the AV data from the HDD 2, the stream controlling means 103 restores the time interval of the transport packets of the AV data, and then outputs the data to the IEEE1394 I/F 4.

The IEEE1394 I/F 4 provides the MPEG transport stream outputted from the stream controlling means 103, to the IEEE1394 bus.

On the other hand, after receiving the notice of the start of reproduction from the stream controlling means 103, the byte counter 101 continues the byte counting of the position of the AV data outputted from the stream controlling means 103 to the IEEE1394 I/F 4.

The present value of the byte counter is assumed to be m bytes (m is a positive integer). That is, the AV data in the amount of m bytes has been reproduced already since the start of the reproduction of the AV data.

At that time, it is assumed that the byte counter 101 receives a jumping reproduction command from the STB 250 shown in FIG. 14 or alternatively that an operation command instructing the reproduction apparatus to perform jumping reproduction is received from a remote controller or the like of the reproduction apparatus 102. Then, the byte counter 101 notifies, to the stream controlling means 103, that the count value has been changed from m to n.

In response to this, the stream controlling means 103 outputs a transport packet of the time immediately before the notice from the byte counter 101, to the IEEE1394 I/F 4, then reads the AV data corresponding to the n bytes counted from the start of reproduction, from the HDD 2, and then outputs the beginning transport packet of this AV data corresponding to the n bytes counted from the start of reproduction, to the IEEE1394 I/F 4 immediately after the output of the preceding transport packet.

As such, when the value of the byte counter 101 is changed discretely, the stream controlling means 103 performs jumping reproduction.

On the other hand, described below is the operation of the above-mentioned jumping reproduction for the case that the STB 250 shown in FIG. 14 issues a jumping reproduction command to the reproduction apparatus 102.

In the STB 250, first, AV data received from the reproduction apparatus 102 is inputted through the I/F control block 253 to the transport stream decoder 252.

The transport stream decoder 252 converts the received transport stream into a PES, and then outputs it to the MPEG decoder 254.

The MPEG decoder 254 expands the compressed data of MPEG into analogue data of video and audio, and then outputs the data to the monitor.

The STB 250 causes the MPEG decoder 254 to stop the presently displayed frame, and with holding this stopped state, waits until the transport stream decoder 252 receives m bytes. When the data is converted into a PES and then inputted to the MPEG decoder 254, the MPEG decoder 254 disposes the PES data after this, holding of the stopped state.

Then, a jumping command is issued to the reproduction apparatus 102.

At this time, AV data starting from the n-th byte is inputted through the I/F control block 253 to the transport stream decoder 252. The data is converted into a PES, and then inputted to the MPEG decoder 254.

With holding the stopped state, the MPEG decoder 254 still continues to dispose the PES data until an I frame is detected in the received PES data. When an I frame is detected, the MPEG decoder begins to expand the MPEG compression. Such a method avoids the occurrence of MPEG block noise. In the present embodiment, DIT packets are unnecessary.

EMBODIMENT 4

Embodiment 4 is described next.

Embodiment 3 has been described for the case that the STB 250 issues a jumping reproduction command. In contrast, in the present embodiment, described is the case that the STB 250 does not issue a jumping reproduction command to the reproduction apparatus 102, that is, the case that a remote controller or the like issues a jumping reproduction command to the reproduction apparatus 102 and the case that the reproduction is performed on AV data containing the interruption of the AV data due to a temporarily stop of the recording.

FIG. 12 shows a reproduction apparatus 102 according to the present embodiment. The reproduction apparatus 102 is the same as that described in the prior art.

However, the stream controlling means 103 has also a function specific to the present embodiment. That is, in addition to the function described in the prior art and as the function specific to the present embodiment, the stream controlling means 103 has the function of inserting, in jumping reproduction, a DIT packet at the beginning of the stream following the jumping or at the end of the stream preceding the jumping.

The DIT packet indicates a packet that indicates an interruption of a stream, and may be any packet provided with a field having a flag capable of such notification in the stream.

The configuration of the STB 250 is the same as that of Embodiment 3, and hence the description is omitted.

Described next is the operation according to the present embodiment.

At the start of reproduction, the stream controlling means 103 notifies the start of reproduction to the byte counter 101.

The present value of the byte counter is assumed to be m bytes (m is a positive integer). That is, the AV data in the amount of m bytes has been reproduced already since the start of the reproduction of the AV data.

At that time, it is assumed that an operation command instructing the reproduction apparatus 102 to perform jumping reproduction is received from a remote controller or the like of the reproduction apparatus 102. Further, it is assumed that the reproduction apparatus 102 has reached a temporary recording stop position and thereby operates itself such as to perform jumping reproduction.

Then, the byte counter 101 notifies that the count value has been changed from m to n.

In response to this, the stream controlling means 103 outputs a transport packet of the time immediately before the notice from the byte counter 101, to the IEEE1394 I/F 4, then reads the AV data corresponding to the n bytes counted from the start of reproduction, from the HDD 2, then inserts a DIT packet after the preceding outputted transport packet, and then outputs the beginning transport packet of the AV data corresponding to the n bytes counted from the start of reproduction, to the IEEE1394 I/F 4.

On the other hand, in the STB 250, first, AV data received from the reproduction apparatus 102 is inputted through the I/F control block 253 and the transport stream decoder 252 to the MPEG decoder 254.

The MPEG decoder 254 expands the compressed data of MPEG into analogue data of video and audio, and then outputs the data to the monitor.

At that time, on receiving the DIT packet, the transport stream decoder 252 causes the MPEG decoder 254 to stop the presently displayed frame and to hold the stopped state.

Then, AV data starting from the n-th byte is inputted through the I/F control block 253 to the transport stream decoder 252. The data is converted into a PES, and then inputted to the MPEG decoder 254.

With holding the stopped state, the MPEG decoder 254 still continues to dispose the PES data until an I frame is detected in the received PES data. When an I frame is detected, the MPEG decoder begins to expand the MPEG compression. Such a method avoids the occurrence of MPEG block noise.

EMBODIMENT 5

Embodiment 5 is described next.

In the present embodiment, similarly to Embodiment 4, described is the case that the STB 250 does not issue a command to the reproduction apparatus 102, that is, the case that a remote controller or the like issues a jumping reproduction command to the reproduction apparatus 102 and the case that the reproduction is performed on AV data containing the interruption of the AV data due to a temporarily stop of the recording.

FIG. 14 shows an STB 250 according to the present embodiment. The STB 250 according to the present embodiment is the same as that of Embodiment 4.

FIG. 12 shows a reproduction apparatus 102 according to the present embodiment. The reproduction apparatus 102 is the same as that described in the prior art. However, the stream controlling means 103 has means which in jumping reproduction, before the execution of jumping, notifies that the jumping is to be executed, to the STB 250 by means of a command. This notification is an operation specific to the present embodiment.

Described next is the operation according to the present embodiment.

At the start of reproduction, the stream controlling means 103 notifies the start of reproduction to the byte counter 101.

The present value of the byte counter 101 is assumed to be m bytes. That is, the AV data in the amount of m bytes has been reproduced already since the start of the reproduction of the AV data.

At that time, it is assumed that an operation command instructing the reproduction apparatus 102 to perform jumping reproduction is received from a remote controller or the like of the reproduction apparatus 102. Further, it is assumed that the reproduction apparatus 102 has reached a temporary recording stop position and thereby operates itself such as to perform jumping reproduction.

At this time, the reproduction apparatus 102 issues a command notifying that the jumping is to be executed, to the STB 250

Then, the byte counter 101 notifies that the count value has been changed from m to n.

In response to this, the stream controlling means 103 outputs a transport packet of the time immediately before the notice from the byte counter 101, to the IEEE1394 I/F 4, then reads the AV data corresponding to the n bytes counted from the start of reproduction, from the HDD 2, and then outputs the beginning transport packet of this AV data corresponding to the n bytes counted from the start of reproduction, to the IEEE1394 I/F 4 immediately after the output of the preceding transport packet.

On the other hand, in the STB 250, first, AV data received from the reproduction apparatus 102 is inputted through the I/F control block 253 and the transport stream decoder 252 to the MPEG decoder 254.

The MPEG decoder 254 expands the compressed data of MPEG into analogue data of video and audio, and then outputs the data to the monitor.

At that time, on receiving the command notifying that the jumping is to be executed in the reproduction apparatus 102, the I/F control block 253 causes the MPEG decoder 254 to stop the presently displayed frame and to hold the stopped state.

Then, AV data starting from the n-th byte is inputted through the I/F control block 253 to the transport stream decoder 252. The data is converted into a PES, and then inputted to the MPEG decoder 254.

With holding the stopped state, the MPEG decoder 254 still continues to dispose the PES data until an I frame is detected in the received PES data. When an I frame is detected, the MPEG decoder begins to expand the MPEG compression. Such a method avoids the occurrence of MPEG block noise.

As described above, according to Embodiments 3, 4, and 5, even in case that the reproduction apparatus 102 does not output up to the end of a video frame before the jumping or does not output starting from the beginning of an I frame after the jumping, the operation of the MPEG decoder 254 suppresses the occurrence of noise.

EMBODIMENT 6

Embodiment 6 is described next.

There is now described a reproduction apparatus capable of rapidly transiting from special reproduction to normal reproduction.

The reproduction apparatus performs the special reproduction and the normal reproduction of AV data recorded as an MPEG transport stream in a hard disk medium.

Figure 13:
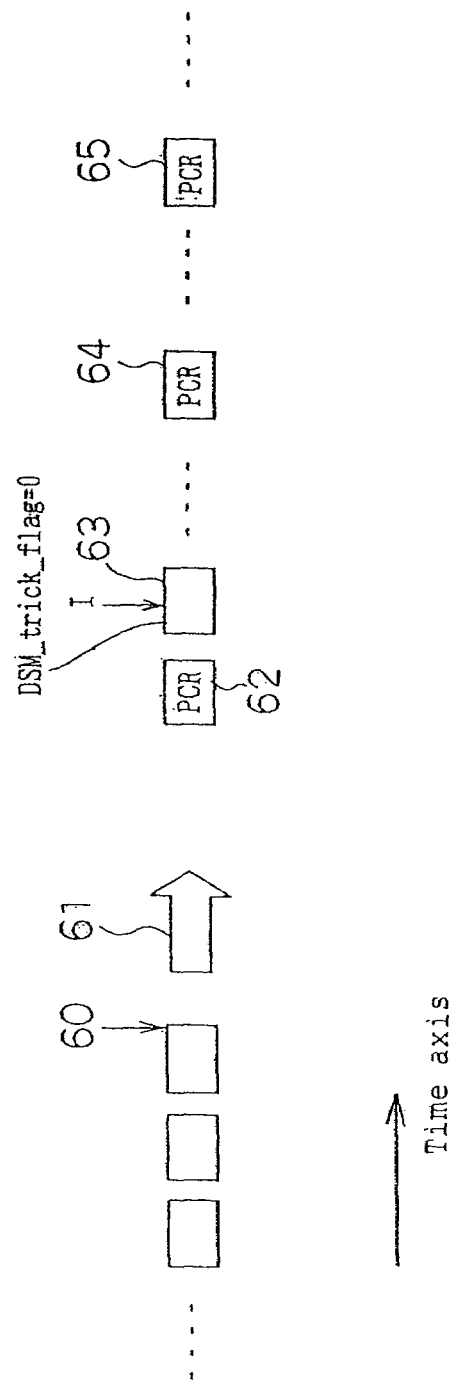
FIG. 13 is a diagram illustrating the operation of a transition from special reproduction to normal reproduction.

FIG. 13 shows transport packets outputted from the reproduction apparatus. That is, in the transition from special reproduction to normal reproduction 61, the reproduction transits to normal reproduction after the last transport packet among those constituting an I frame is outputted as indicated by the end 60 of an I. Then, when the reproduction has transited to normal reproduction, first of all, a transport packet additionally provided with a PCR is outputted as indicated by a PCR 62. Then, in transport packets already provided with PCRs as indicated by a PCR 64 and a PCR 65, the values of the PCRs are rewritten such as not to conflict with the value of the PCR outputted as the PCR 62, and then the transport packets are outputted.

Accordingly, after the transition to normal reproduction, a decoder built in an STB (set-top box) or the like of receiving an MPEG transport stream outputted from such a reproduction apparatus receives first a transport packet provided with a PCR. This permits rapid establishment of PLL synchronization in comparison with the case that the PCR is not outputted first. Further permitted is rapid establishment of the synchronized processing of video and audio. This permits rapid transition from special reproduction to normal reproduction.

Further, in the present embodiment, described is an HDD recorder capable of performing rapid transition from special reproduction to normal reproduction.

Similarly to Embodiment 1, FIG. 1 shows the configuration of the system. FIG. 2 shows the configuration of a HDD recorder 201. FIG. 3 shows the configuration of an AV hard disk 205. FIG. 4 shows an AV transfer control block 211. These are similarly to those of Embodiment 1.

As described above in Embodiment 1, the special reproduction information generating section 217 comprises PID filter means 218, PES-header detecting means 219, picture-header detecting means 220, and table data generating means 221.

The PID filter means 218 is means of detecting the PID of a transport packet provided with a time stamp, and thereby selecting a transport packet the PID of which indicates video data.

The PES-header detecting means 219 is means of detecting a transport packet containing a PES-header among the selected transport packets, and then generating the position information thereof.

The picture-header detecting means 220 is means of detecting a transport packet containing a picture-header among the transport packets, and then generating information indicating that a picture-coding-type is any one of I, B, and P.

The table data generating means 221 is means of: extracting information regarding the type, the beginning position, and the size of each frame constituting the MPEG transport stream, on the basis of the generated position information of the PES header and the picture-coding-type; and thereby generating special reproduction table data from the extracted information. The size information is calculated, for example, as the length from a PES to the next PES on the basis of the position information of the PESs.

The buffer controlling means 227 comprises difference calculating means 24 and PCR packet generating means 26.

The difference calculating means 24 is means of calculating the difference which is the PCR value of a transport packet containing a PCR minus the value of a time stamp added to the transport packet.

The PCR packet generating means 26 is means in which at a transition from special reproduction to normal reproduction, the value which is the value of the time stamp added to the transport packet preceding the beginning transport packet of an I frame processed by normal reproduction plus the difference calculated by the difference calculating means 24 at the recording is used as a PCR value, and in which a packet containing a PCR having this PCR value is generated.

The frame send-out managing means 224 is means of performing, in special reproduction, the send-out management of outputted transport packets and the management of the interval between an outputted I frame and the next outputted I frame.

The PID-filter means 225 is means of detecting, in special reproduction, the PID of an inputted transport packet, thereby removing the transport packet when the detected PID indicates data other than video data, and thereby outputting solely the transport packet the detected PID of which is video data.

The PAT/PMT/SIT-adding/PCR-adding means 226 is means of adding a transport packet containing a PAT, a PMT, and an SIT, then adding a transport packet containing a PCR, then rewriting the continuity counter of each transport packet appropriately, and thereby restoring and outputting an MPEG transport stream which is correct grammatically.

The AV transfer control block 211 and the hard disk section 208 according to the present embodiment are an example of writing means according to the invention. The HDD recorder 201 according to the present embodiment is an example of a recording apparatus according to the invention. The AV transfer control block 211 and the hard disk section 208 according to the present embodiment serve also as an example of reading means according to the invention. The HDD recorder 201 according to the present embodiment serves also as an example of a reproduction apparatus according to the invention.

Described next is the operation according to the present embodiment.

Described below first is the operation of recording AV data.

In the recording of AV data, on receiving AV data transmitted as isochronous packets from the STB 202 via the IEEE1394 bus, the 1394PHY/LINK 210 restores the time interval of the transport packets, and then outputs the packets as an MPEG transport stream to the AV transfer control block 211.

The AV transfer control block 211 comprises an oscillator having an oscillation frequency of 27 MHz, and thereby establishes PLL synchronization at the oscillation frequency of the oscillator on the basis of the values of the PCRs contained in the transport packets. The AV transfer control block 211 further comprises a counter (not shown) of counting up at the oscillation frequency of the oscillator.

On receiving a transport packet from the 1394PHY/LINK 210, in the timing of the reception, the time stamp adding means 216 of the AV transfer control block 211 reads the value of the counter counting up at the oscillation frequency of 27 MHz, and then adds the read-out value as a time stamp to the transport packet.

FIG. 11(*a*) shows transport packets provided with time stamps as described above.

Each transport packet is provided with a single time stamp as indicated by time stamps 28, 29, and 30.

The time stamp adding means 216 outputs the transport packets provided with the time stamps as shown in FIG. 11(*a*), to the special reproduction information generating section 217.

The special reproduction information generating section 217 analyzes the transport packets provided with the time stamps, and thereby generates a special reproduction table used in special reproduction.

That is, the PID filter means 218 detects the PID of the transport packet provided with a time stamp, and thereby selects a transport packet the PID of which indicates video data.

The PES-header detecting means 219 detects a transport packet containing a PES-header among the selected transport packets containing video data, and then generating the position information thereof.

Then, the picture-header detecting means 220 detects a transport packet containing a picture-header among the transport packets, and then generates a picture-coding-type, that is, information wherein any one of I, B, and P.

The table data generating means 221 extracts information regarding the type, the beginning position, and the size of each frame constituting the MPEG transport stream, on the basis of the generated position information of the PES header and the picture-coding-type, and thereby generates special reproduction table data from the extracted information. The size information is calculated, for example, as the length from a PES to the next PES on the basis of the position information of the PESs. Then, the table data generating means generates a special reproduction table describing the extracted information such as the type, the recording position of the beginning, and the size of each frame.

On receiving the transport packet outputted from the time stamp adding means 216, and on receiving the special reproduction data generated by the table data generating means 221, the buffer controlling means 227 converts these data into the recording format of the disk access unit, and then stores temporarily the data into the buffer memory 212.

When the buffer controlling means 227 converts the transport packet and the special reproduction table into the recording format, the difference calculating means 24 calculates the difference between the PCR and the time stamp. At that time, for example, the difference calculating means acquires the value of the PCR of the first transport packet containing a PCR among the transport packets stored in a disk access unit, and then acquires the value of the time stamp added to the transport packet. Here, the transport packet provided with a PCR from which the difference is calculated does not need to be the first transport packet containing a PCR among the transport packets stored in a disk access unit.

Then, calculated is the difference which is the acquired value of the PCR minus the acquired value of the time stamp. The calculated difference is stored in the header section of the disk access unit.

As such, the buffer controlling means 227 converts the MPEG transport stream in the amount of a disk access unit into the recording format of the disk access unit.

FIG. 11(*b*) shows this recording format of the disk access unit. The recording format of the disk access unit comprises a header section and a data section. The header section stores: the special reproduction table data which is special reproduction information of specifying an I frame used in special reproduction; chain information of specifying the preceding and the following disk access units; and the like. The data section stores the transport packets provided with the time stamps.

As described above, the header section of the disk access unit further stores the difference calculated by the difference calculating means 24.

Then, the buffer controlling means 227 stores temporarily the AV data converted into the recording format, into the buffer memory 212, and transfers the AV data in the amount of a disk access unit stored in the buffer memory 212, into the HDD controlling means 228, and further issues a write command to the HDD controlling means 228.

On receiving the write command from the buffer controlling means 227, the HDD controlling means 228 controls the hard disk section 208 such as to record the AV data in the amount of a disk access unit transferred from the stream controlling means 25, at a position of the hard disk medium correspond to the LBA specified in the record command.

As such, in the recording of AV data, the HDD recorder 201 stores, on a disk access unit basis, the difference which is the value of the PCR of the beginning transport packet containing a PCR among the transport packets recorded in a disk access unit minus the value of the time stamp added to the transport packet, into the header section of the disk access unit.

Described next is the operation of reproduction.

It is assumed that the HDD recorder 201 is performing the special reproduction of the AV data recorded in a manner described above.

That is, the HDD controlling means 228 issues a read command to the hard disk section 208. In response to the read command received from the HDD controlling means 228, the hard disk section 208 reads solely the header section stored in the specified disk access unit. Then, the hard disk section 208 transfers the read-out header section of the disk access unit to the HDD controlling means 228.

On receiving the header section of the disk access unit from the HDD controlling means 228, the buffer controlling means 227 extracts the position information of an I frame used in special reproduction, using the special reproduction information stored in the header section. On the basis of the extracted position information, the HDD controlling means 228 issues a command instructing the hard disk section 208 to read the AV data of the I frame. Then, the hard disk section 208 transfers the data to the HDD controlling means 228. The buffer controlling means 227 receives the AV data of the I frame from the HDD controlling means 228, and then stores temporarily the transport packets constituting the extracted I frame into the buffer memory 212.

Because the AV data constituting the I frame is not an integer multiple of 512 bytes, the amount of an integer multiple of 512 bytes is read out from the hard disk section 208. Further, the position of the end transport packet of the I frame is not necessarily an integer multiple of 512 bytes. However, the position of the end transport packet of the I frame is notified to the frame send-out managing means 224. This permits the sending of the sole I frame section.

In special reproduction, the normal reproduction/special reproduction switching means 222 is set such that the transport packet outputted from the buffer controlling means 227 is inputted to the frame send-out managing means 224.

In response to the request from the frame send-out managing means 224, the buffer controlling means 227 outputs sequentially the transport packets constituting the I frame used in the special reproduction stored in the buffer memory 212.

On receiving the transport packets outputted from the buffer controlling means 227, the frame send-out managing means 224 adjusts the send-out rate of the received transport packets, and then outputs the received transport packets to the PID-filter means 225.

When the send-out of an I frame is completed and when a frame send-out time interval has been elapsed, the frame send-out managing means 224 requests the transfer of the next I frame, to the buffer controlling means 227.

The PID-filter means 225 detects the PID of the transport packet received from the frame send-out managing means 224, thereby selects solely a transport packet the value of the PID of which indicates video data, and then outputs the packet to the PAT/PMT/SIT-adding/PCR-adding means 226.

Thus, the PID-filter means 225 disposes transport packets containing audio and packets containing PCRs used in normal reproduction.

On receiving a transport packet containing video data, the PAT/PMT/SIT-adding/PCR-adding means 226 adds a transport packet containing a PAT, a PMT, and an SIT used in special reproduction, then adds a transport packet containing a PCR used in special reproduction, then rewrites appropriately the continuity counters of the PAT, the PMT, the SIT, the PCR, and the video data, and thereby generates a grammatically correct MPEG transport stream for special reproduction.

On receiving the MPEG transport stream for special reproduction, the 1394PHY/LINK 210 transmits the stream to the IEEE1394 bus in the form of isochronous packets.

Then, on receiving the MPEG transport stream for special reproduction via the IEEE1394 bus, the STB 202 decodes the stream into a video signal, and then outputs the signal through the D terminal to the television receiver 203. The television receiver 203 displays the video on the monitor.

In the above-mentioned case that the HDD recorder 201 performs transition to normal reproduction during the special reproduction, the buffer controlling means 227 outputs first the last transport packet among those constituting the I frame presently outputted as the MPEG transport stream for special reproduction, to the frame send-out managing means 224, and then outputs an MPEG transport stream for normal reproduction.

The transport packet outputted to the frame send-out managing means 224 is transmitted through the 1394PHY/LINK 210 to the IEEE1394 bus similarly to the above-mentioned case.

At the start of normal reproduction, the PCR packet generating means 26 adds a PCR to the transport packet preceding the beginning transport packet of the I frame appearing at first after the transition to normal reproduction.

That is, the difference contained in the header section of the disk access unit having stored the transport packet is referred to.

Then, the PCR packet generating means acquires the value of the time stamp added to the transport packet, then adds the referred difference to (the value of) the acquired time stamp, and then adds a PCR having the added value, to the transport packet. The PCR packet generating means then fills the payload of the transport packet with invalid data, or alternatively eliminates the payload.

The PCR packet generating means 26 then outputs the transport packet to the time stamp reproducing means 223.

Then, the buffer controlling means 227 outputs the beginning transport packet of the I frame appearing at first after the transition to normal reproduction, to the time stamp reproducing means 223.

At each time of receiving a request from the time stamp reproducing means 223, the buffer controlling means 227 reads sequentially the transport packet from the buffer memory 212, and then outputs the packet to the time stamp reproducing means 223.

FIG. 11(c) shows a transport packet outputted from the buffer controlling means 227 as described above.

At the transition from special reproduction to normal reproduction, the buffer controlling means 227 outputs the last transport packet among those constituting the last I frame to the frame send-out managing means 224 as indicated by the end 32 of the I, and then outputs first a transport packet containing a PCR as indicated by a PCR 33 to the time stamp reproducing means 223. The value of this PCR is the value which is the time stamp plus the difference stored in the header section of the disk access unit.

Then, as shown in the transport packet 34, following to the PCR 33, transport packets are sequentially outputted to the IEEE1394 interface 27 starting from the beginning transport packet of the I frame appearing at first after the transition to normal reproduction. The value of the PCR of the transport packet containing a PCR among the transport packets outputted from the buffer controlling means 227 to the time stamp reproducing means 223 is still intact at the value set at the recording. In this state, the transport packet is outputted to the time stamp reproducing means 223.

The 1394PHY/LINK 210 transmits the received transport stream in the form of isochronous packets to the IEEE1394 bus.

As such, in recording, the HDD recorder 201 calculates the difference which is the value of the PCR minus the value of the time stamp, and thereby stores also the difference. In reproduction, the HDD recorder calculates the value of the PCR outputted first by adding the difference to the value of the time stamp. Accordingly, the value is consistent with the value of the PCR contained in the transport packets processed by normal reproduction. Thus, it is unnecessary to rewrite the value of the PCR contained in the transport packets processed by normal reproduction.

As such, in the HDD recorder 201 according to the present embodiment, its fabrication cost is not expensive, while the load on the hardware and the software of the HDD recorder 201 is small. In spite of this, achieved is rapid transition from special reproduction to normal reproduction.

The present embodiment has been described for the case that the difference calculating means 24 acquires the value of the PCR of the first transport packet containing a PCR among the transport packets stored in a disk access unit, and then acquires the value of the time stamp added to the transport packet. However, the invention is not limited to this. The difference may be calculated between the value of the PCR of any transport packet containing a PCR among the transport packets stored in a disk access unit and the value of the time stamp contained in the transport packet.

Further, the present embodiment has been described for the case that the time stamp is added in such a manner that the time stamp and the PCR have a predetermined difference value. However, the time stamp may be added such that the difference value is approximately zero. In this case, the value of the PCR of the transport packet outputted first as a packet containing a PCR can be set at the value itself of the time stamp of the transport packet. Further, the value of the PCR of the transport packets containing a PCR outputted subsequently can also be set at the value itself of the time stamp.

Further, the present embodiment has been described for the case that at the transition from special reproduction to normal reproduction, the last transport packet among those constituting the last I frame processed by special reproduction is outputted to the frame send-out managing means 224 as indicated by the end 32 of the I, and that the transport packet preceding the beginning transport packet of the I frame appearing at first in the normal reproduction is then provided with a PCR and outputted at first. However, the invention is not limited to this. A transport packet before the beginning transport packet of the I frame appearing at first in the normal reproduction may be provided with a PCR. In other words, it is sufficient that after the transition from special reproduction to normal reproduction, any transport packet before the beginning transport packet of the I frame appearing at first in the normal reproduction is provided with a PCR and then outputted.

Further, the present embodiment has been described for the case that separate devices such as an STB and an HDD recorder, or alternatively such as an STB and a reproduction apparatus, are interconnected through an IEEE1394 bus. However, the invention is not limited to this. That is, a bus of transferring stream data and an I/F of transmitting and receiving a control signal of controlling the devices may be used. Further, the devices may be non-separated and integrated into one piece. Further, the HDD recorder may comprise a decoder of expanding a compression encoded stream similar to that provided in the STB.

Further, the present embodiment has been described for the case that the recording and the reproduction are performed on the magnetic disk 215. However, the invention is not limited to this. An optical disk, a magneto-optical disk, and a tape medium may be used.

The embodiments of group A have been described above in detail.

The embodiments of group B are described below.

EMBODIMENT 7

Embodiment 7 is described next.

In the present embodiment, described is a reproduction apparatus capable of performing special reproduction.

Figure 15:
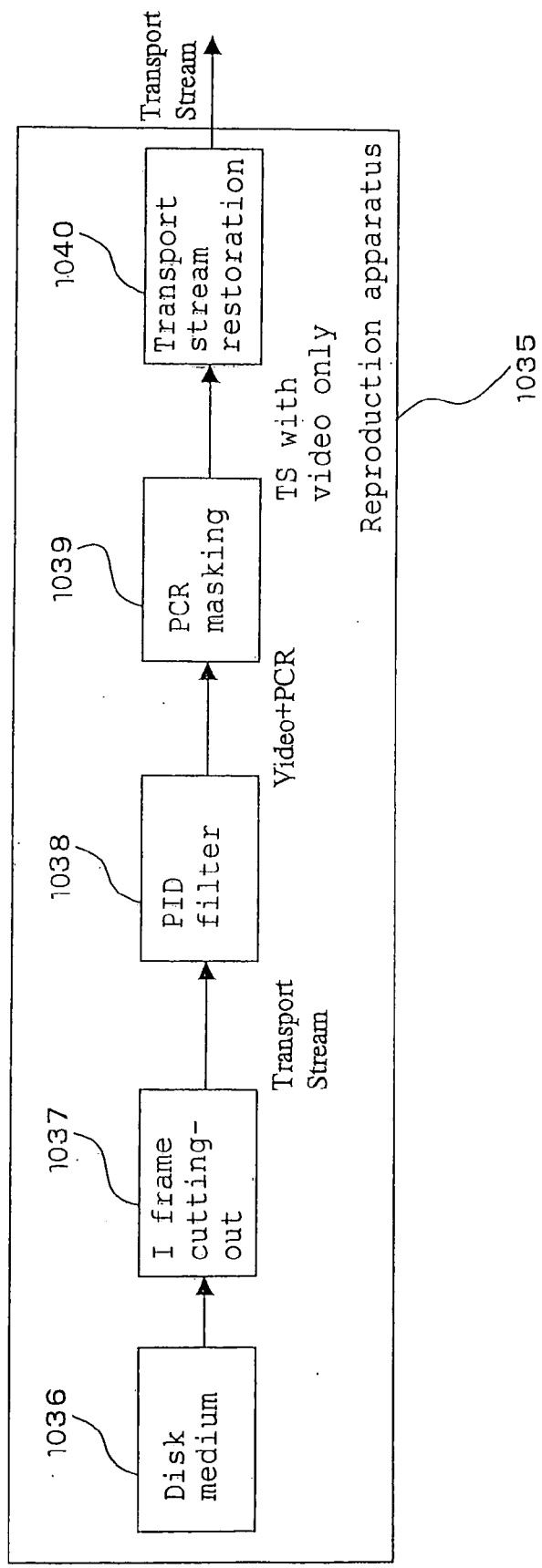
FIG. 15 is a block diagram showing the configuration of a reproduction apparatus according to Embodiment 7 of the invention.

FIG. 15 shows a reproduction apparatus 1035 according to the present embodiment.

The reproduction apparatus 1035 according to the present embodiment is an apparatus of performing the special reproduction and the normal reproduction of AV data recorded by a recording apparatus shown in FIG. 22(*a*).

The reproduction apparatus 1035 comprises a disk medium 1036, an I frame cutting-out 1037, a PID filter 1038, a PCR masking 1039, and a transport stream restoration 1040.

The disk medium 1036 is a magnetic disk medium of recording AV data, in which AV data is recorded by the recording apparatus shown in FIG. 22(*a*).

The I frame cutting-out 1037 is means of cutting out the I frames used in special reproduction among the data of each disk access unit read from the disk medium 1036.

The disk access unit indicates a minimum unit for continuous transfer used when the AV data is written into the disk medium 1036 and when the AV data is read from the disk medium 1036.

The PID filter 1038 is means of removing, on the basis of the PID of the transport packet, transport packets other than video packets among the transport packets of the MPEG transport stream composed of the I frames cut out by the I frame cutting-out 1037, and thereby outputting a transport stream composed solely of the video data.

The PCR masking 1039 is means of masking the PCR used in normal reproduction.

The transport stream restoration 1040 is means of adding a PAT, a PMT, and an SIT for special reproduction to the transport stream composed solely of the video data outputted from the PID filter 1038, then adding a special reproduction PCR, then rewriting the continuity counter in the 4-byte header section of each transport packet such that the packets become successive within each class of PID, and thereby restoring a complete MPEG transport stream for special reproduction.

The I frame cutting-out 1037 according to the present embodiment is an example of special-reproducing means according to the invention. The PID filter 1038 and the PID masking 1039 according to the present embodiment are an example of PCR masking means according to the invention. The transport stream restoration 1040 according to the present embodiment is an example of special reproduction PCR generating means according to the invention.

Described next is the operation according to the present embodiment.

The present embodiment is described for the case that a special reproduction is performed on AV data recorded as an MPEG transport stream in the disk medium 1036 by recording apparatus shown in FIG. 22(*a*).

Further, in the AV data processed by special reproduction in the reproduction apparatus 1035 according to the present embodiment, the PID of the transport packet containing video data is assumed to be the same as the PID of the transport packet containing an PCR.

Figure 16:
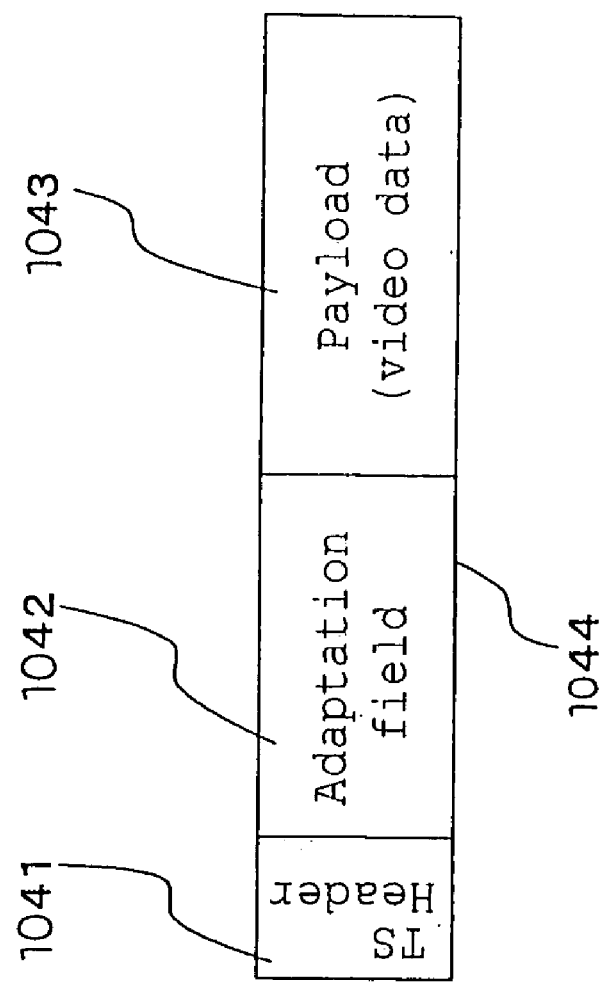
FIG. 16 is a diagram showing an example of a transport packet containing a PCR according to Embodiment 7 of the invention.

FIG. 16 shows an example of a transport packet to be processed by special reproduction in the reproduction apparatus 1035. The transport packet 1044 comprises: a TS header 1041 serving as the header of the transport packet; an adaptation field 1042; and a payload 1043. The adaptation field 1042 describes a PCR, while the payload 1043 stores video data. As such, a single transport packet stores both the PCR and the video data.

Among the data of each disk access unit read from the disk medium 1036, on the basis of the special reproduction information stored in the header section of the disk access unit, the I frame cutting-out 1037 cuts out the I frames used in special reproduction from the MPEG transport stream stored in the data section of the disk access unit.

The I frame cutting-out 1037 then outputs the cut-out I frames as an MPEG transport stream.

On the basis of the PIDs of the transport packets, the PID filter 1038 removes audio packets, PMT packets, and the like among the transport packets of the MPEG transport stream received from the I frame cutting-out 1037, and thereby outputs a transport stream composed solely of the video data and PCRs. That is, since the PID of the video packet is the same as the PID of the PCR packet, the PID filter 1038 does not remove the PCR packets.

The PCR masking 1039 then checks whether the transport packet outputted from the PID filter 1038 is provided with an adaptation field 1042 or not. Then, for the transport packet provided with an adaptation field 1042, it is further checked whether the adaptation field 1042 stores a PCR or not.

When the adaptation field stores a PCR, the PCR is masked. Here, the masking indicates that at least a PCR-flag of the adaptation field is set to be zero, and that when possible, a 48-bit field describing the PCR value is entirely padded with 0xff.

On receiving the transport packets outputted from the PID masking 1039, the transport stream restoration 1040 inserts a transport packet containing a PAT, a PMT, an SIT, and the like, then inserts also a transport packet which has the same PID as that of the transport packet containing video data and which contains a special reproduction PCR, then rewrites the continuity counter in each transport packet, and thereby restores a complete transport stream for special reproduction.

Figure 17:
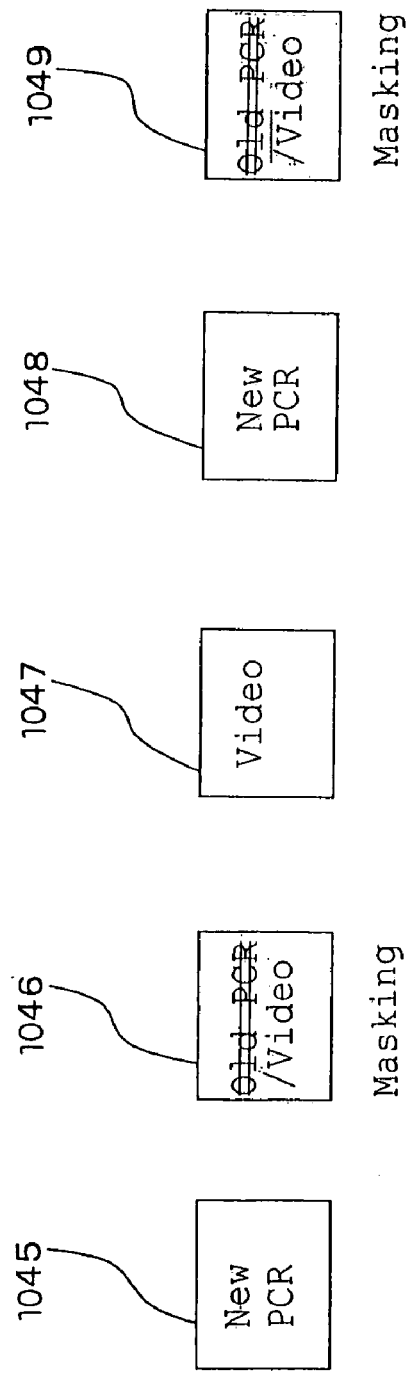
FIG. 17 is a diagram showing an example of transport packets of an MPEG transport stream for special reproduction according to Embodiment 7 of the invention.

FIG. 17 shows an example of a transport packet outputted from the transport stream restoration 1040.

The normal reproduction PCRs in the transport packets 1046 and 1049 are masked, while transport packets 1045 and 1048 containing special reproduction PCRs are inserted as shown in the figure.

As such, when an AV device such as a television receiver decodes and displays the transport stream outputted from the transport stream restoration 1040, the originally added PCRs are masked, whereby the special reproduction is performed without the problem which would occurs when the PCRs are added in two series.

As such, the reproduction apparatus 1035 according to the present embodiment masks the PCRs of the transport packets containing normal reproduction PCRs among the transport packets, and thereby generates a consistent MPEG transport stream for special reproduction.

The present embodiment has been described for the case that the PID masking 1039 masks normal reproduction PCRs. However, the invention is not limited to this. The PID masking 1039 may be omitted.

That is, a transport packet which has a PID different from the PID of the transport packet containing video data or a PCR and which contains a special reproduction PCR is further inserted to the transport packets outputted from the PID filter 1038.

Further, among the PMTs, the PID of the transport packet containing a PCR is changed from the PID of the transport packet containing video data into the PID of the transport packet containing a special reproduction PCR.

Figure 18:
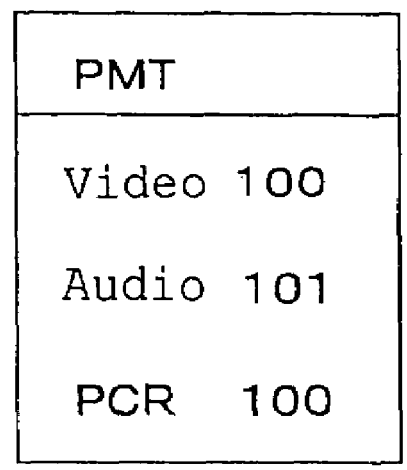
FIG. 18(a) is a diagram showing an example of a PMT of an MPEG transport stream used in normal reproduction according to Embodiment 7 of the invention.
FIG. 18(b) is a diagram showing an example of a PMT of an MPEG transport stream for special reproduction according to Embodiment 7 of the invention.
Figure 18:
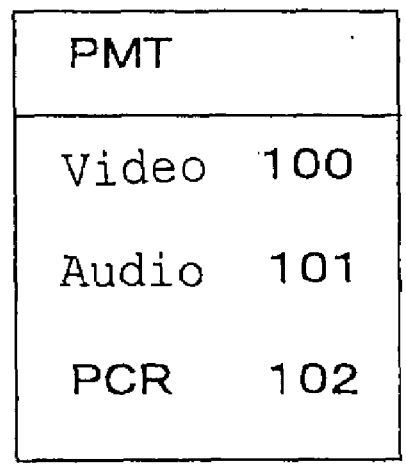

FIG. 18 shows an example of PMTs. FIG. 18(a) shows PMTs for normal reproduction. The PID of the transport packet containing video data is 100, while the PID of the transport packet containing audio data is 101, and while the PID of the transport packet containing a PCR is 100 similarly to the PID of the transport packet containing video data.

FIG. 18(b) shows PMTs used in special reproduction. The PID the transport packet containing a PCR is changed from 100 into 102.

As such, in place of the masking of the PCR of the transport packet containing a normal reproduction PCR, it is possible that the PID of the transport packet containing a special reproduction PCR is set to be a value different from the value of the PID of the transport packet containing video data, and that among the PMTs as shown in FIG. 18, the PID of the transport packet containing a PCR is rewritten into the PID of the transport packet containing a special reproduction PCR.

Nevertheless, in this case, at the transition from special reproduction to normal reproduction, a change occurs in the PID of the transport packet containing a PCR. This causes the problem that the AV device such as a television receiver decoding and displaying the data for special reproduction determines as if a channel change is performed, and thereby mutes the video and the audio similarly to the case of a channel change. However, apart from this problem, effects similar to those of the above-mentioned case are obtained.

Further, the present embodiment has been described for the case that the disk medium 1036 is composed of a magnetic disk medium. However, the invention is not limited to this. A magneto-optical disk medium and an optical disk medium may be used. Further, a tape medium used in D-VHS and the like may be used.

EMBODIMENT 8

Embodiment 8 is described next.

In the present embodiment, described are an output apparatus and an input apparatus in which when an edited MPEG transport stream is reproduced and when the portion joining two MPEG transport streams is decoded and displayed, the video and the audio can be muted depending on the intention of a person having edited the stream.

Figure 19:
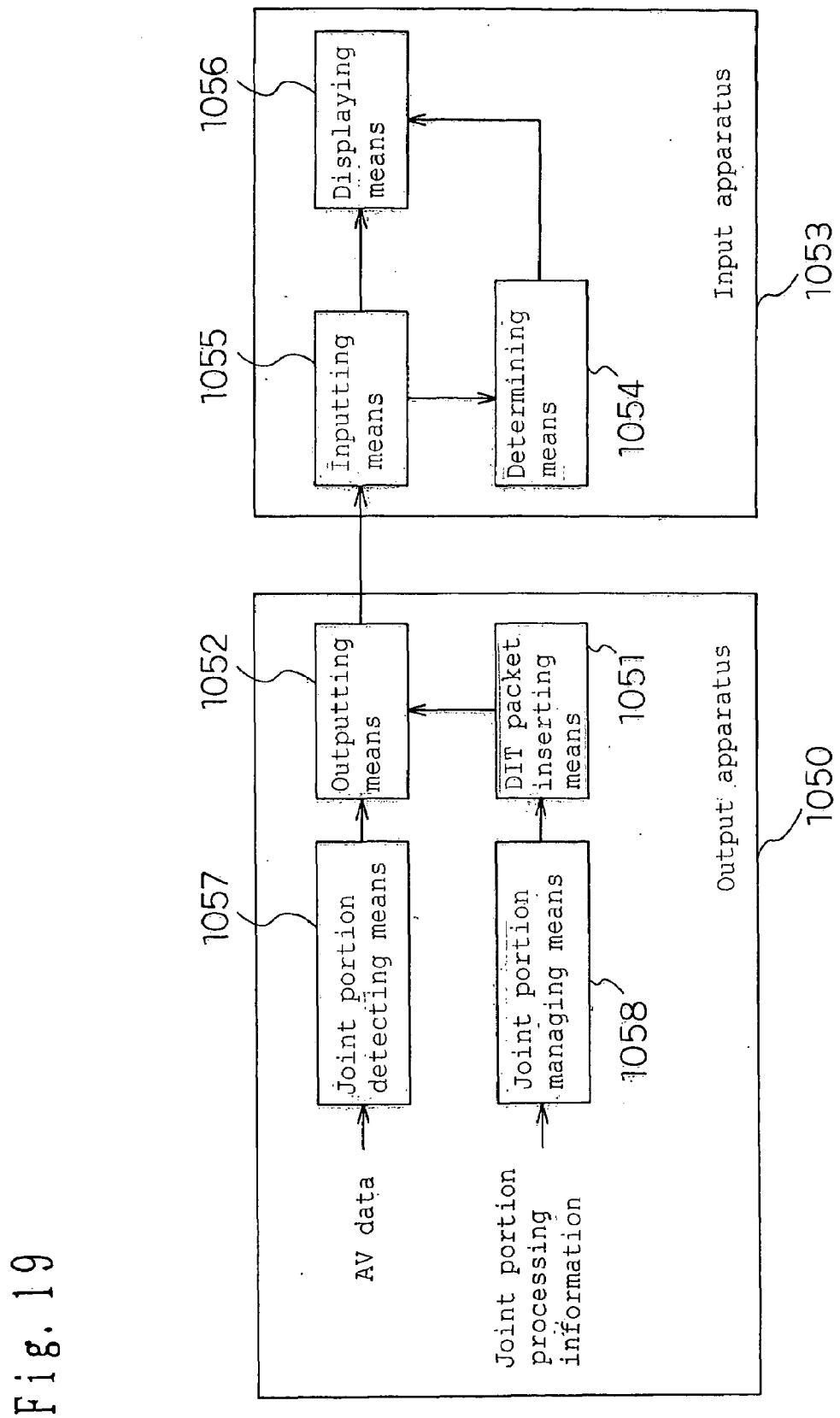
FIG. 19 is a block diagram showing the configuration of an output apparatus and an input apparatus according to Embodiments 8-10 of the invention.
Figure 20A:
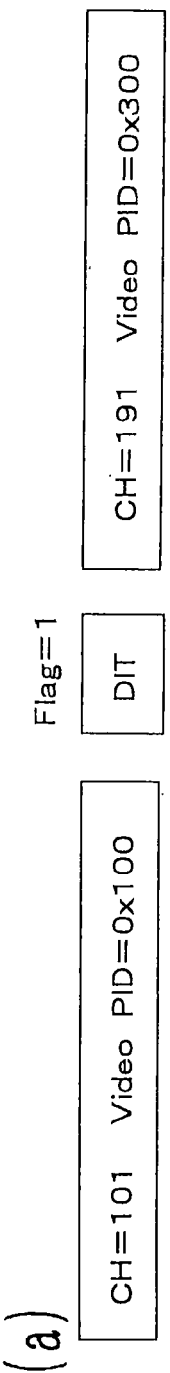
FIG. 20(a) is a diagram showing an example of an MPEG transport stream according to Embodiment 10 of the invention.
Figure 20B:
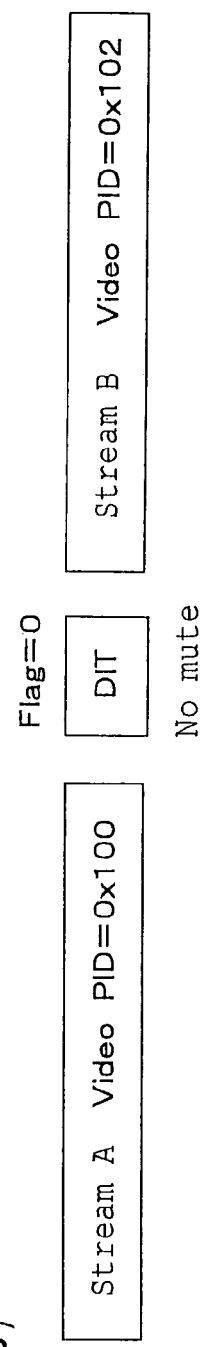
FIG. 20(b) is a diagram showing an example of an MPEG transport stream according to Embodiments 8 and 9 of the invention.
Figure 20C:
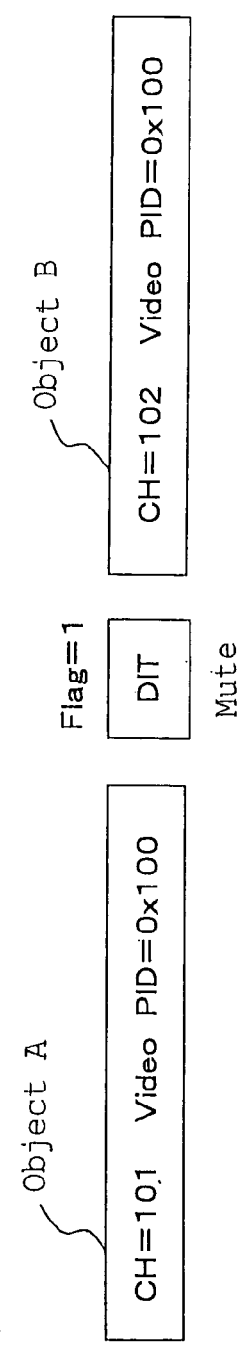
FIG. 20(c) is a diagram showing an example of an MPEG transport stream according to Embodiment 9 of the invention.
Figure 20D:
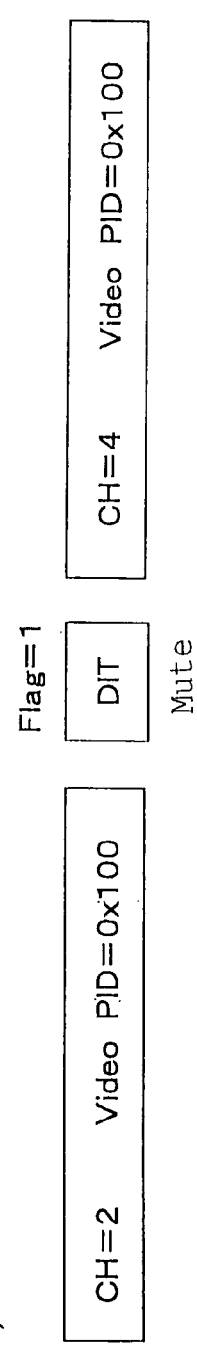
FIG. 20(d) is a diagram showing an example of an MPEG transport stream according to Embodiment 10 of the invention.
Figure 21:
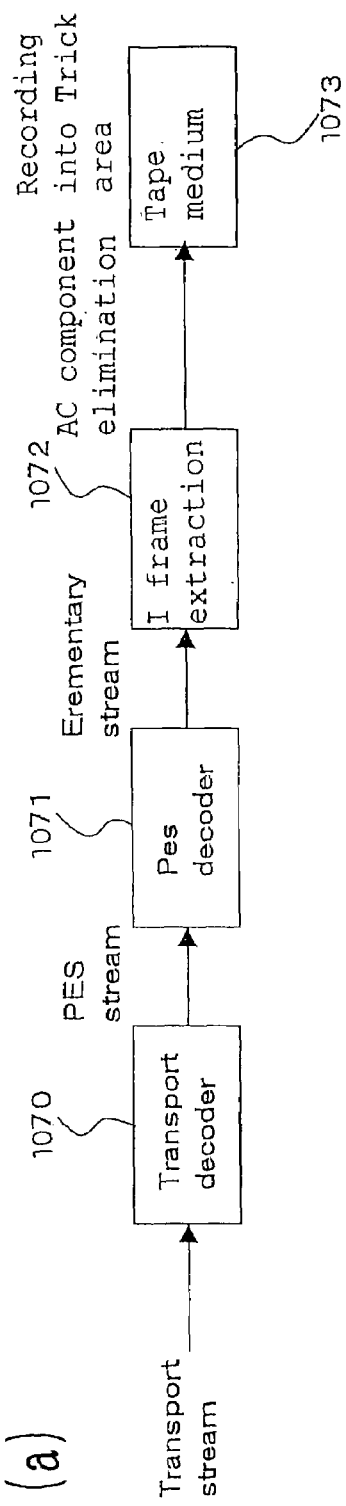
FIG. 21(a) is a diagram showing the recording scheme of a D-VHS according to a third prior art.
FIG. 21(b) is a diagram showing the reproduction scheme of a D-VHS according to a third prior art.
Figure 21:
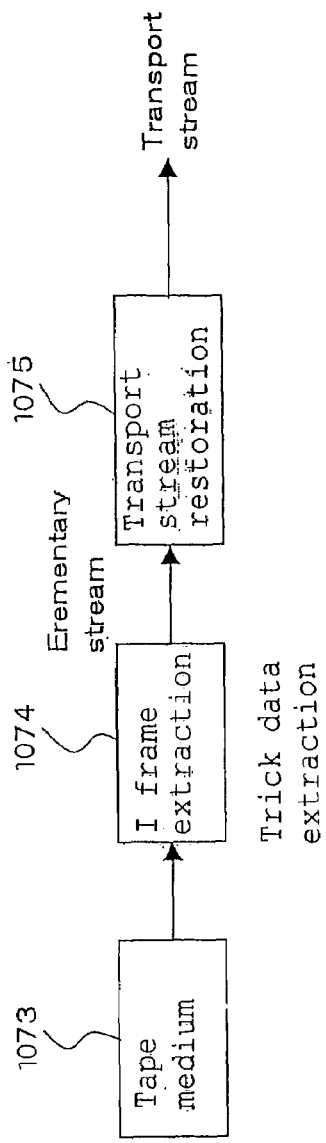

FIG. 19 shows the configuration of an output apparatus 1050 and an input apparatus 1053 according to the present embodiment. The output apparatus 1050 is a hard disk drive of reading AV data recorded as an MPEG transport stream in a hard disk medium and thereby outputting the data as an MPEG transport stream.

The input apparatus 1053 is a television receiver of receiving and decoding the MPEG transport stream outputted from the output apparatus 1050, and thereby displaying the data on a monitor.

The output apparatus 1050 and the input apparatus 1053 are interconnected through an IEEE1394 bus.

The output apparatus 1050 comprises joint portion detecting means 1057, joint portion managing means 1058, outputting means 1052, and DIT packet inserting means 1051. The output apparatus further comprises reading means (not shown) of reading the AV data recorded as an MPEG transport stream in the hard disk medium and thereby outputting the data to the joint portion detecting means 1057.

The joint portion detecting means 1057 detects a joint portion of the AV data outputted from the reading means, in case that the AV data outputted from the reading means has been generated by editing and joining distinct pieces of AV data.

The joint portion managing means 1058 manages the intention of a user for the joint portion detected by the joint portion detecting means 1057.

The outputting means 1052 controls the stream of the AV data outputted from the reading means, and thereby outputting the controlled stream as isochronous packets.

The DIT packet inserting means 1051 inserts a transport packet containing a DIT (discontinuity indicator table) in the joint portion where the AV data changes into another one, in case that the AV data outputted from the reading means has been generated by editing and joining distinct pieces of AV data.

In the present embodiment, a transport packet containing a DIT is referred to as an DIT packet.

The input apparatus 1053 comprises inputting means 1055, determining means 1054, and displaying means 1056.

The inputting means 1055 receives isochronous packets outputted from the output apparatus 1050 via the IEEE1394 bus, thereby restoring the packets into an MPEG transport stream, and then outputting the data on the displaying means 1056.

The determining means 1054 detects a DIT packet from the MPEG transport stream restored by the inputting means 1055, and thereby determining whether the video and the audio are to be muted or not, depending on the setting value of the flag added to the DIT packet.

The displaying means 1056 decodes the MPEG transport stream outputted from the inputting means 1055, thereby converting the stream into an analogue signal, then displaying the signal on the television monitor, and then muting the video and the audio displayed on the television monitor, depending on the determination result of the determining means 1054.

The joint portion detecting means 1057, the joint portion managing means 1058, and the DIT packet inserting means 1051 according to the present embodiment are an example of the DIT packet inserting means according to the invention.

Described next is the operation according to the present embodiment.

FIG. 20(*b*) shows the MPEG transport stream with which the output apparatus 1050 outputs the AV data read from the hard disk medium.

FIG. 20(*b*) shows a stream generated by editing and joining MPEG transport streams recorded in two D-VHSs.

That is, in the state recorded in the hard disk media, they are a stream A which is an MPEG transport stream copied from one D-VHS (A) of the two D-VHSs and a stream B which is an MPEG transport stream copied from the other D-VHS (B) of the two D-VHSs. These streams are joined into the single stream.

In the stream A, the PID of the transport packet containing video data is 0x100. In the stream B, the PID of the transport packet containing video data is 0x102.

That is, the PID of the transport packet containing video data is different in the stream A and in the stream B.

In the editing and joining of the stream A and the stream B, it is assumed that the person editing the streams has the intention that the video and the audio are not to be muted in the joint portion. Information indicating this intention is described as joint portion processing information in the header section of the disk access unit. Information indicating the position of the joint portion is described also in this joint portion processing information.

On reading the AV data from the hard disk medium, the reading means outputs the data to the joint portion detecting means 1057. At that time, the reading means outputs the AV data from the hard disk medium on a disk access unit basis.

The joint portion detecting means 1057 detects the joint position among the joint portion processing information in the header section from the reading means, and then notifies the detected joint portion to the joint portion managing means 1058.

The joint portion managing means 1058 refers to the joint portion processing information for the joint portion described in the header section of the disk access unit, thereby determines whether the video and the audio are to be muted or not in the joint portion detected by the joint portion detecting means 1057, and then notifies to the DIT packet inserting means whether the video and the audio are to be muted or not.

The outputting means 1052 converts the recording format of the AV data outputted from the joint portion detecting means 1057, and thereby restores into an MPEG transport stream.

On receiving, from the joint portion managing means 1058, the notification of the joint portion and whether the video and the audio are to be muted or not in the joint portion, the DIT packet inserting means 1051 generates a DIT packet, and then adds to the DIT thereof an object switching flag indicating whether the video and the audio are to be muted or not in the joint portion.

That is, the object switching flag is a flag having a value of 0 or 1. When the object switching flag is 0, it is indicated that the video and the audio are not to be muted in the joint portion. When the object switching flag is 1, it is indicated that the video and the audio are to be muted in the joint portion.

In the present embodiment, on the basis of the joint portion processing information described in the header section of the disk access unit, the joint portion managing means 1058 notifies, the DIT packet inserting means 1051, that the video and the audio are not to be muted in the joint portion. Thus, the DIT packet inserting means 1051 sets the object switching flag to be 0.

Then, the DIT packet inserting means 1051 outputs the DIT packet the DIT of which is provided with the object switching flag, to the outputting means 1052.

On receiving, from the DIT packet inserting means 1051, the DIT packet the DIT of which is provided with the object switching flag, the outputting means 1052 inserts the received DIT packet into the joint portion of the restored MPEG transport stream.

The outputting means 1052 then generates isochronous packets from the MPEG transport stream, and then transmits the generated isochronous packets to the IEEE1394 bus.

On the other hand, on receiving the isochronous packets transmitted from the output apparatus 1050 via the IEEE1394 bus, the inputting means 1055 of the input apparatus 1053 restores the packets into an MPEG transport stream.

Then, on detecting the DIT packet the DIT of which is provided with the object switching flag, the inputting means notifies the packet to the determining means 1054.

On receiving the DIT packet the DIT of which is provided with the object switching flag, the determining means 1054 refers to the value of the object switching flag, and then depending on the value of the object switching flag, instructs the displaying means 1056 whether the video and the audio displayed on the television monitor are to be muted or not.

That is, when the object switching flag is 0, the determining means 1054 instructs the displaying means 1056 not to mute the video and the audio in the portion where the DIT packet is inserted.

When the object switching flag is 1, the determining means instructs the displaying means 1056 to mute the video and the audio in the portion where the DIT packet is inserted.

On the other hand, the inputting means 1055 outputs the MPEG transport stream to the displaying means 1056.

The displaying means 1056 separates the MPEG transport stream outputted from the inputting means 1055 into the video and the audio, thereby converts the data into an elementary stream, and then AV-decodes and converts the elementary stream into analogue signals. Then, the video signal is displayed on the monitor, while the audio signal is outputted through a speaker.

At that time, the displaying means 1056 mutes the video and the audio depending on the instruction from the determining means 1054.

That is, when receiving an instruction of muting the video and the audio from the determining means 1054, the displaying means 1056 mutes the video displayed on the monitor and the audio outputted through the speaker.

In contrast, when receiving an instruction of not muting the video and the audio from the determining means 1054, the displaying means 1056 does not mute the video displayed on the monitor and the audio outputted through the speaker.

Thus, when the value of the object switching flag in the DIT of the DIT packet provided with an object switching flag is 0, the determining means 1054 issues an instruction of not muting the video and the audio in the portion where the stream A changes into the stream B, whereby in response to this instruction, the displaying means 1056 does not the video and the audio.

As such, according to the present embodiment, the video and the audio can be muted in the joint portion depending on the joint portion processing information which is described in the header section of the disk access unit and in which indicates whether the video and the audio are to be muted or not.

Described next is which section of the DIT the above-mentioned object switching flag is added to.

Figure 25:
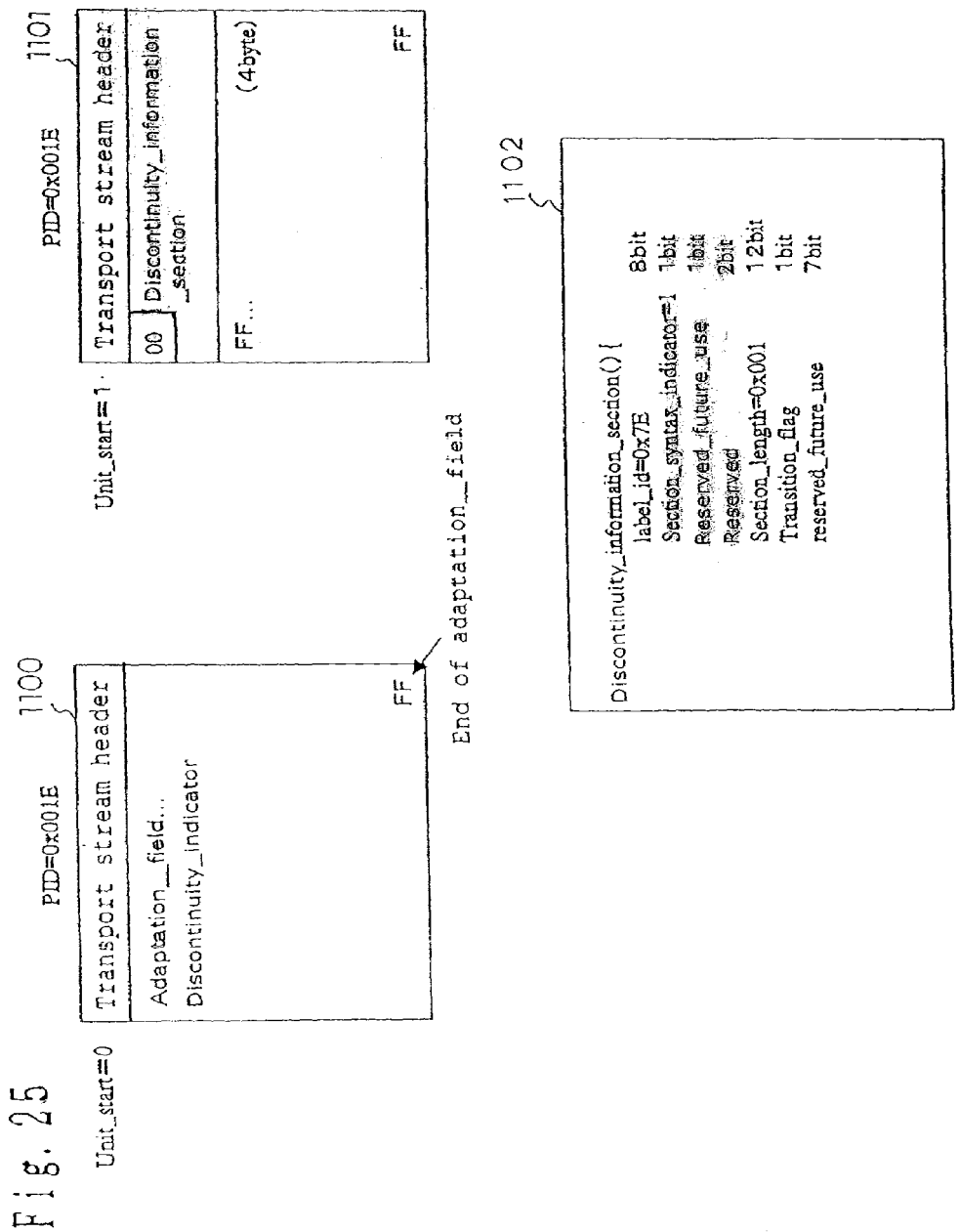
FIG. 25 is a diagram illustrating a method of adding an object switching flag to a DIT according to Embodiment 8 of the invention.

FIG. 25 shows the structure of the DIT. The first packet 1100 is a transport packet indicating the transmission of a DIT. The second packet 1101 is a transport packet containing the DIT.

That is, in the first transport packet 1100, a discontinuity_indicator bit is set to be ON.

Further, a discontinuity_information_section is inserted in the second transport packet 1101. Numeral 1102 shows the configuration of the discontinuity_information_section.

In the present embodiment, the object switching flag is expressed by a 1-bit Transition_flag. That is, the value of the object switching flag is set in the Transition_flag.

As such, by setting the object switching flag, the output apparatus 1050 according to the present embodiment can arbitrarily specify whether the video and the audio are to be muted or not, whereby depending on the value of the object switching flag, the input apparatus 1053 can mute the video and the audio as is specified.

The present embodiment has been described for the case that the object switching flag is set in the Transition_flag. However, the invention is not limited to this. The object switching flag may be expressed by a 1-bit Reserved_future_use following a Section_syntax_indicator, a 2-bit Reserved, or any one bit in a 7-bit reserved_future_use following a Transition_flag.

Further, the present embodiment has been described for the case that in the editing and joining of the stream A and the stream B, the information indicating the intention whether the video and the audio are to be muted in the joint portion or not is described as joint portion processing information in the header section of the disk access unit. However, the invention is not limited to this. The information may be described in a portion of the hard disk medium other than the header section of the disk access unit, or alternatively may be contained in a memory built in the output apparatus 1050.

EMBODIMENT 9

Embodiment 9 is described next.

In the present embodiment, described are an output apparatus and an input apparatus in which one recorded program is managed as one object on an each-recording basis, and in which when reproduction is performed with switching the objects, the video and the audio can be muted explicitly, and further in which when a joint portion of an edited MPEG transport stream is reproduced, it can be set such that the video and the audio are always not muted.

Figure 26:
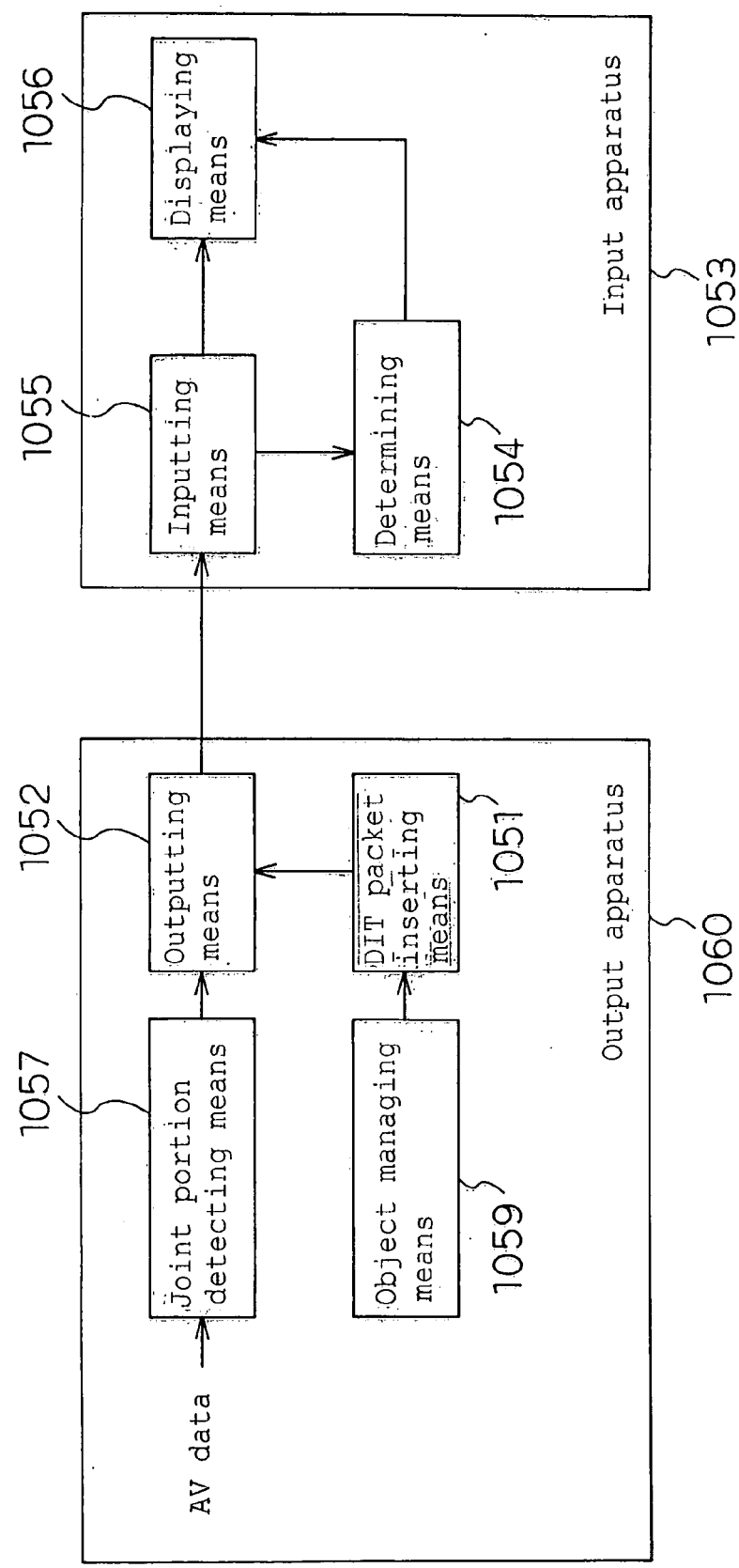
FIG. 26 is a block diagram showing the configuration of an output apparatus and an input apparatus according to Embodiment 9 of the invention.

FIG. 26 shows the configuration of an output apparatus 1060 and an input apparatus 1053 according to the present embodiment.

The output apparatus 1060 is a hard disk drive of reading AV data recorded as an MPEG transport stream in a hard disk medium and thereby outputting the data as an MPEG transport stream.

The input apparatus 1053 is a television receiver of receiving and decoding the MPEG transport stream outputted from the output apparatus 1060, and thereby displaying the data on a monitor.

The output apparatus 1060 and the input apparatus 1053 are interconnected through an IEEE1394 bus.

The output apparatus 1060 comprises object managing means 1059.

The object managing means 1059 is means of managing one recording, which is from a recording start to a recording stop, as one object.

Here, even in case that the AV data has interruption due to a temporary recording stop, the data is treated not as a plurality of objects but as a single object. Further, even in case that the AV data has a joint portion due to edition in the stream, the data is also treated as a single object. Furthermore, when a plurality of objects are edited and joined, the data is treated as a single object. Such a object-based treatment of recorded programs and contents permits, for example, the zapping of the beginning portions of recordings. For example, another object is specified during the reproduction of an object, the object is switched immediately.

That is, the object managing means 1059 is means of managing such object switching, object head searching, and object generation/deletion.

The portion of the output apparatus 1060 other than the object managing means 1059 is similar to that of Embodiment 8.

The input apparatus 1053 is similar to that of Embodiment 8.

The joint portion detecting means 1057 and the DIT packet inserting means 1051 according to the present embodiment are an example of DIT packet inserting means according to the invention.

Described next is the operation according to the present embodiment.

FIG. 20(*b*) shows an MPEG transport stream with which the output apparatus 1060 outputs the AV data read from the hard disk medium.

FIG. 20(*b*) shows a stream generated by editing and joining MPEG transport streams recorded in two D-VHSs, which is similar to that described above in Embodiment 8.

However, the joint portion processing information in the header section of the disk access unit contains solely the position information of the joint portion, and does not contain information indicating the intention of a person having edited the stream whether the video and the audio are to be muted in the joint portion or not.

On reading the AV data from the hard disk medium, the reading means outputs the data to the joint portion detecting means 1057. At that time, the reading means outputs the AV data from the hard disk medium on a disk access unit basis.

The joint portion detecting means 1057 detects the joint position among the joint portion processing information in the header section of the disk access unit read from the reading means. The DIT packet inserting means 1051 insert a DIT packet into the joint portion.

At that time, since this joint portion is not an interruption between objects, the object managing means 1059 notifies nothing to the DIT packet inserting means 1051.

At that time, without receiving any notice from the object managing means 1059, the DIT packet inserting means 1051 sets the object switching flag to be 0 in the above-mentioned DIT packet inserted into the joint portion.

As such, in contrast to Embodiment 8, the DIT packet is inserted in the joint portion so as not to cause mute.

The outputting means 1052 converts the recording format of the AV data outputted from the joint portion detecting means 1057, and thereby restores into an MPEG transport stream.

Without receiving a notice of object switching from the object managing means 1059, the DIT packet inserting means 1051 generates a DIT packet not muting the video and the audio, and hence adds an object switching flag having a value of 0.

Then, the DIT packet inserting means 1051 outputs the DIT packet the DIT of which is provided with the object switching flag, to the outputting means 1052.

The subsequent operation is similar to that of Embodiment 8, and hence the description is omitted.

As such, according to the present embodiment, even in case that the PID is different before and after the joint portion of the edited and joined AV data, it is possible to cause the video and the audio not to be muted.

The case that reproduction is performed with switching the objects, and that the video and the audio are muted explicitly is described below with reference to FIG. 20(*c*).

It is assumed that in the object A and the object B, the PID of video is accidentally the same, and that the PID is actually the same in both objects.

At the start of the reproduction of the object A, the output apparatus 1060 acquires the position on the hard disk medium where the object A is recorded, from the object managing means 1059. The output apparatus 1060 then reads the AV data of the object A from the hard disk medium, and then outputs the data as an MPEG transport stream to the outputting means 1052.

Then, it is assumed that a user issues an instruction of reproducing the object B, to the output apparatus 1060. Then, the output apparatus 1060 acquires the recording position of the object B from the object managing means 1059. The output apparatus 1060 then reads the AV data of the object B from the hard disk medium.

At that time, the object managing means 1059 specifies the switching position of the switching from the object A to the object B, to the joint portion detecting means 1057. The joint portion detecting means 1057 then acquires the position of the switching from the object A to the object B.

The object managing means 1059 notifies the object switching to the DIT packet inserting means 1051. The DIT packet inserting means 1051 adds an object switching flag having a value of 1, to the DIT packet inserted into the portion of the switching from the object A to the object B.

As such, after inserting the DIT packet, the output apparatus 1060 outputs the MPEG transport stream of the object B to the outputting means 1052. The output stream outputted from the output apparatus 1060 is as shown in FIG. 20(*c*).

Thus, the input apparatus 1053 detects the DIT packet, and then detects that the value of the object switching flag thereof is 1. Accordingly, the determining means 1054 determines instructs the displaying means 1056 to mute the video and the audio. In response to this instruction, the displaying means 1056 mutes the video and the audio.

As such, according to the present embodiment, when reproduction is performed with switching the objects from A to B, a DIT is inserted, and the object switching flag of the inserted DIT is set to be 1. Accordingly, even when the PID of video is the same in the object A and in the object B, it is possible to cause mute always.

According to Embodiment 9 described above, a stream generated by joining two streams each having a distinct PID can be reproduced without mute. Further, a stream generated by joining two streams having the same PID can be reproduced with mute always in the joint portion.

EMBODIMENT 10

Embodiment 10 is described next.

In the present embodiment, described are an output apparatus and an input apparatus in which the video and the audio can be muted temporarily at channel selection in an analogue tuner or a digital tuner.

FIG. 27 shows the configuration of an output apparatus 1061 and an input apparatus 1053 according to the present embodiment.

The output apparatus 1061 is an STB (set-top box) or the like having the functions of: receiving and outputting an MPEG transport stream broadcasted on a broadcasting wave by digital broadcasting from a broadcast station; and receiving and MPEG-encoding an analogue signal (such as NTSC and PAL) broadcasted on a broadcasting wave by analogue broadcasting, and thereby outputting the MPEG transport stream.

A digital tuner section 1065 is means of converting a digital broadcasting wave received through an antenna 1066, into an MPEG transport stream.

A analogue tuner section 1064 is means of converting an analogue broadcasting wave received through the antenna 1066, into an analogue signal such as NTSC and PAL.

An MPEG encoder section 1063 is means of converting the analogue signal into a digital signal, then MPEG-compressing the signal into an MPEG transport stream, and then outputting the stream.

A switch 1062 is means of selecting either the MPEG transport stream of the digital broadcasting or the MPEG transport stream generated by the digital conversion of the analogue broadcasting, and then outputting it to the outputting means 1052. The outputting means 1052 and the DIT packet inserting means 1051 are similar to those of Embodiment 9. Further, the input apparatus 1053 is similar to that of Embodiment 8.

Described next is the operation according to the present embodiment.

Described first is the operation when a channel is selected in the digital tuner section 1065. At that time, it is assumed that the switch 1062 is connecting the output of the digital tuner section 1065 to the outputting means 1052.

The digital tuner section 1065 of the output apparatus 1061 outputs an MPEG transport stream containing the AV data of the selected channel to the outputting means 1052.

Further, when the channel is changed, the digital tuner section 1065 notifies to the DIT packet inserting means 1051 so that the video and the audio are to be muted in the channel change portion. The DIT packet inserting means 1051 inserts a DIT packet the object switching flag of which is set to be 1, at the change point. In the subsequent operation similar to that of Embodiments 8 and 9, the video and the audio are muted at the channel change in the displaying means 1056 of the input apparatus 1053.

FIG. 20(*a*) shows the output stream of the output apparatus 1061 when the channel is changed in the digital tuner section 1065. That is, originally, the channel number is Channel 101, while the video PID is 100 in hexadecimal notation. After the channel change, the channel number becomes Channel 191, while the video PID becomes 300 in hexadecimal notation.

At that time, a DIT packet is inserted between the two states, while the object switching flag thereof is 1.

When such a stream is inputted to the input apparatus 1053, mute is performed at the channel change by virtue of the operation of the input apparatus 1053 similar to that of Embodiment 8.

As such, when the channel is changed in the digital tuner section 1065, the channel change is indicated explicitly by the muted output.

Described next is the operation when a channel is selected in the analogue tuner section 1064.

At that time, it is assumed that the switch 1062 is connecting the output of the MPEG encoder section 1063 to the outputting means 1052.

The analogue tuner section 1064 of the outputting means 1052 outputs the analogue signal of the selected channel to the MPEG encoder section 1063.

The MPEG encoder section 1063 converts the analogue signal inputted from the analogue tuner section 1064 into a digital signal and into an MPEG transport stream, and then outputs the stream to the outputting means 1052.

Further, when the channel is changed, the analogue tuner section 1064 notifies to the DIT packet inserting means 1051 so that the video and the audio are to be muted in the channel change portion. The DIT packet inserting means 1051 inserts a DIT packet the object switching flag of which is set to be 1, at the change point.

In the subsequent operation similar to that of Embodiments 8 and 9, the video and the audio are muted at the channel change in the displaying means 1056 of the input apparatus 1053.

FIG. 20(*d*) shows the output stream of the output apparatus 1061 when the channel is changed in the analogue tuner section 1064.

That is, the channel number is originally Channel 2, and becomes Channel 4 after the channel change.

In contrast, the PID of video is always the same value by virtue of the encoding in the MPEG encoder section 1063.

At that time, a DIT packet is inserted between before and after the channel changes, while the object switching flag thereof is 1.

When such a stream is inputted to the input apparatus 1053, mute is performed at the channel change even in case of the same PID.

According to Embodiment 10 described above, mute is performed at the channel change regardless of whether the stream is an MPEG transport stream of digital broadcasting or an MPEG transport stream of analogue broadcasting and whether the PID is the same or not.

In Embodiments 8-10 described above, in the input apparatus 1053, the displaying means 1056 may be provided with a browser function for data broadcasting, such as a BML browser function. In this case, in Embodiments 8-10, an object switching flag has been added to the DIT packet in the output apparatus. Similarly to this, a BML browser restart flag may be added, whereby in response to this flag, the input apparatus 1053 may control the ON/OFF of the restart of the BML browser in the displaying means 1056. This permits immediate renewal of the browser screen at object switching points and channel change points.

The position where the BML browser restart flag is added may be similar to that of the object switching flag. Further, when both the object switching flag and the BML browser restart flag are added, the two effects of the ON/OFF of screen mute and the BML browser restart described above are obtained simultaneously. In the embodiment, the browser for data broadcasting has been assumed to be an BML browser. However, the invention is not limited to this. Further, the name of the BML browser restart flag is not limited to this as long as the BML browser restart flag can restart the browser for data broadcasting. That is, the BML browser restart flag in the embodiment is merely an example of the BML browser restart flag for data broadcasting.

Further, the embodiments have been described for the case that an IEEE1394 bus is used as the data bus of transferring the stream data between the devices such as the output apparatus, the input apparatus, and reproduction apparatus according to the invention. However, the invention is not limited to this. The bus used may be a serial bus, a parallel bus, or any other bus as long as the bus is capable of transferring the stream. Further, the devices may be in a separated form, in an integrated from into one piece, or in any other form as long as the apparatus configuration according to the invention is implemented.

The invention is a program which causes a computer to execute the function of all or part of the means (or apparatuses, devices, circuits, sections, and the like) of the reproduction apparatus, the recording apparatus, the output apparatus, and the input apparatus described above according to the invention, and works in cooperation with the computer.

The invention is a medium which carries a program of causing a computer to execute all or part of the function of all or part of the means of the reproduction apparatus, the recording apparatus, the output apparatus, and the input apparatus described above according to the invention, wherein: the medium is read out by a computer; and the read-out program carries out the above-mentioned function in cooperation with the computer.

Part of the means (or apparatuses, devices, circuits, sections, and the like) according the invention and part of the steps (or processes, operations, effects, and the like) according the invention indicate: a piece or pieces of means among a plurality of pieces of said means and a step or steps among a plurality of said steps; or alternatively, part of function or part of operation in a piece of means and a step, respectively.

The scope of the invention includes also a computer-readable recording medium in which a program according to the invention is recorded.

A mode of use of a program according to the invention may be that the program is recorded in a computer-readable recording medium and works in cooperation with a computer.

A mode of use of a program according to the invention may be that the program is transmitted through a transmitting medium, read out by a computer, and works in cooperation with the computer.

Data structure according to the invention includes a database, a data format, a data table, a data list, and a data type.

The scope of recording media according to the invention includes a ROM and the like, while the scope of transmitting media according to the invention includes a transmitting medium such as the Internet, as well as light, radio waves, acoustic waves, and the like.

A computer according to the invention is not limited to genuine hardware such as a CPU, and may be firmware, an OS, and a peripheral device.

Further, as described above, the configuration of the invention may be implemented by software or hardware.

As seen from the above-mentioned description, the invention provides a reproduction apparatus and a reproduction method in which in jumping reproduction, when an MPEG transport stream processed by the jumping reproduction is decoded and displayed, no noise occurs in the video and the audio in the vicinity of the jumping.

Further, the invention provides a reproduction apparatus, a recording apparatus, a reproduction method, and a recording method which permit rapid transition from special reproduction to normal reproduction at a low price.

Further, the invention provides a reproduction apparatus, a recording apparatus, a reproduction method, and a recording method which permit rapid transition from special reproduction to normal reproduction without a heavy load on the hardware and the software.

Further, the invention provides a recording method and a reproduction method in which in an MPEG transport stream processed by special reproduction, even when the PID of a transport packet containing an PCR and the PID of a transport packet containing video data are the same, the MPEG transport stream for special reproduction is reproduced appropriately.

Further, the invention provides an output apparatus, and an input apparatus in which when an edited MPEG transport stream is reproduced and when the portion joining two MPEG transport streams is decoded and displayed, in case that the person having edited the stream intends not to mute the video and the audio, the video and the audio are, in accordance with the person's intention, not muted.

Further, the invention provides an output apparatus, and an input apparatus in which when reproduction is performed with switching the object, the video and the audio are explicitly muted at the switching point between the two objects.

Further, the invention provides an output apparatus and an input apparatus in which when reproduction is performed with switching the object, a browser for data broadcasting is restarted always at the time of switching the object so that the screen is renewed immediately.

Further, the invention provides an output apparatus, and an input apparatus in which in case that an analogue signal received by an analogue tuner is converted into an MPEG transport stream and then the converted MPEG transport stream is decoded and displayed, when the channel is changed in the analogue tuner, the displayed video and audio are muted in response to the channel change.

The invention claimed is:

1. A reproduction apparatus comprising:
reading means of reading AV data recorded in a recording medium as a compression encoded stream processed by inter-frame compression and intra-frame compression; and
controlling means of controlling said reading means in such a manner that during the reproduction of said AV data by said reading means, when the reproduction is performed with skipping a predetermined portion of said AV data, after the skipping of said predetermined portion, said reading means outputs a dummy packet and then outputs transport packets starting from one located at the beginning of the next intra-frame compressed frame among the frames of the video data following the skipping of said predetermined portion; wherein
a continuity counter of said dummy packet is set to be a value different from that of a continuity counter of said transport packet located at the beginning of the next intra-frame compressed frame.

2. A reproduction apparatus comprising:
reading means of reading AV data recorded in a recording medium as a compression encoded stream processed by inter-frame compression and intra-frame compression; and
controlling means or controlling said reading means in such a manner that during the reproduction of said AV data by said reading means, when the reproduction is performed with skipping a predetermined portion of said AV data, before the skipping of said predetermined portion, said reading means outputs transport packets until the last one among those constituting a frame of the video data presently outputted by said reading means, and that after the skipping of said predetermined portion, said reading means outputs a dummy packet and then outputs transport packets starting from one located at the beginning of the next intra-frame compressed frame among the frames of the video data following the skipping of said predetermined portion; wherein
a continuity counter of said dummy packet is set to be a value different from that of a continuity counter of said transport packet located at the beginning of the next intra-frame compressed frame.

3. A reproduction apparatus according to claim 1 or 2, wherein:
said intra-frame compressed frame is an I frame.

4. A reproduction apparatus according to claim 1 or 2, wherein said "having a different value" indicates that the value of the continuity counter of said dummy packet is smaller by unity than the value of the continuity counter of said transport packet located at the beginning of the next I frame.

5. A reproduction apparatus according to claim 1 or 2, wherein said dummy packet indicates a transport packet a payload of which is filled with a padding value of an elementary stream.

6. A reproduction apparatus according to claim 1 or 2, wherein:
said dummy packet indicates a transport packet in a payload of which a PES header is embedded; and
the embedded PES header has invalid data.

7. A reproduction apparatus according to claim 1 or 2, wherein said dummy packet indicates a transport packet a header of which is tilled with invalid data.

8. A reproduction apparatus according to claim 1 or 2, wherein: a transport packet a payload of which is filled with a padding value of an elementary stream is referred to as a first transport packet; a transport packet in a payload or which a PES header is embedded and in which the embedded PES header has invalid data is referred to as a second transport packet; and a transport packet a header of which is filled with invalid data is referred to as a third transport packet; and wherein said dummy packet corresponds to at least two or more of said first transport packet, said second transport packet, and said third transport packet.

9. A reproduction apparatus according to claim 1 or 2, wherein after the skipping of said predetermined portion, said reading means sets the value of a continuity counter of said transport packet of the compression encoded stream located at the beginning of the next intra-frame compressed frame, to be different from the value of a continuity counter of a transport packet of the compression encoded stream located at the last of a frame outputted immediately before the output of the transport packet.

10. A reproduction apparatus according to claim 9, wherein:
said "setting the value to be a different value" indicates that said reading means sets the value of the continuity counter of said transport packet of the compression encoded stream located at the beginning of the next intra-frame compressed frame, to be a value generated by adding unity to the value of the continuity counter of the transport packet of the compression encoded stream located at the last of the frame outputted immediately before the output of the transport packet; and as for the frames of the video data after said transport packet of the compression encoded stream located at the beginning of the next intra-frame compressed frame, said reproducing means rewrites the values of the continuity counters in such a manner that the values of the continuity counters of the transport packets of the compression encoded stream become successive.

11. A reproduction method comprising:

a reading step of reading AV data recorded in a recording medium as a compression encoded stream processed by inter-frame compression and intra-frame compression; and a controlling step of controlling said reading step in such a manner that during the reproduction of said AV data by said reading step, when the reproduction is performed with skipping a predetermined portion of said AV data, after the skipping of said predetermined portion, said reading step outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

12. A reproduction method comprising:

a reading step of reading AV data recorded in a recording medium as a compression encoded stream processed by inter-frame compression and intra-frame compression; and a controlling step of controlling said reading step in such a manner that during the reproduction of said AV data by said reading step, when the reproduction is performed with skipping a predetermined portion of said AV data, before the skipping of said predetermined portion, said reading step outputs transport packets until the last one among those constituting a frame of the video data presently outputted by said reading step, and that after the skipping of said predetermined portion, said reading step outputs a dummy packet and then outputs transport packets starting from one located at the beginning of the next intra-frame compressed frame among the frames of the video data following the skipping of said predetermined portion; wherein a continuity counter of said dummy packet is set to be a value different from that of a continuity counter of said transport packet located at the beginning of the next intra-frame compressed frame.

* * * * *